(12) United States Patent
Abe

(10) Patent No.: US 11,060,804 B2
(45) Date of Patent: Jul. 13, 2021

(54) THERMAL RECTIFIER AND THERMAL RECTIFICATION UNIT

(71) Applicant: PANASONIC INTELLECTUAL PROPERTY MANAGEMENT CO., LTD., Osaka (JP)

(72) Inventor: Hiroyuki Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 46 days.

(21) Appl. No.: 16/486,466

(22) PCT Filed: Feb. 15, 2018

(86) PCT No.: PCT/JP2018/005210
§ 371 (c)(1),
(2) Date: Aug. 15, 2019

(87) PCT Pub. No.: WO2018/151198
PCT Pub. Date: Aug. 23, 2018

(65) Prior Publication Data
US 2020/0232725 A1    Jul. 23, 2020

(30) Foreign Application Priority Data

Feb. 15, 2017 (JP) .............................. JP2017-026473

(51) Int. Cl.
*F28F 27/00* (2006.01)
*F28F 13/00* (2006.01)

(52) U.S. Cl.
CPC ........ *F28F 13/00* (2013.01); *F28F 2013/008* (2013.01); *F28F 2255/04* (2013.01); *F28F 2270/00* (2013.01)

(58) Field of Classification Search
CPC .. F28F 13/00; F28F 2013/008; F28F 2255/04; F28F 2270/00
(Continued)

(56) References Cited

U.S. PATENT DOCUMENTS 8,336,822 B2    12/2012   MacGregor et al.
2009/0218087 A1  9/2009   Oshima
(Continued)

FOREIGN PATENT DOCUMENTS

JP    S60-029812 U    2/1985
JP    2009-207336 A   9/2009
(Continued)

OTHER PUBLICATIONS

International Search Report and Written Opinion issued in International Patent Application No. PCT/JP2018/005210, dated Apr. 17, 2018; with partial English translation.

*Primary Examiner* — Davis D Hwu
(74) *Attorney, Agent, or Firm* — McDermott Will and Emery LLP

(57) ABSTRACT

A thermal rectifier includes a first panel, a second panel, and a switching mechanism. The switching mechanism includes a first thermally conductive portion thermally connected to the first panel and a second thermally conductive portion thermally connected to the second panel. The switching mechanism switches, as at least one of the first thermally conductive portion or the second thermally conductive portion changes their shape or dimensions, from a heat radiation state to a heat insulation state, or vice versa. The heat radiation state is a state where the first thermally conductive portion and the second thermally conductive portion are thermally coupled together. The heat insulation state is a
(Continued)

state where the first thermally conductive portion and the second thermally conductive portion are thermally isolated from each other.

12 Claims, 23 Drawing Sheets

(58) Field of Classification Search
USPC .......................................................... 165/96
See application file for complete search history.

(56) References Cited

U.S. PATENT DOCUMENTS

| | | |
|---|---|---|
| 2010/0251653 A1 | 10/2010 | Mills |
| 2012/0079833 A1* | 4/2012 | Rowe ..................... F28F 13/00 |
| | | 62/3.1 |
| 2013/0277439 A1 | 10/2013 | Kwak et al. |
| 2015/0082810 A1 | 3/2015 | Iizuka et al. |
| 2015/0152635 A1 | 6/2015 | Duforestel et al. |
| 2017/0284096 A1 | 10/2017 | Abe |
| 2018/0073814 A1* | 3/2018 | Zhou .................. F28D 15/0233 |

FOREIGN PATENT DOCUMENTS

| | | |
|---|---|---|
| JP | 2013-224781 A | 10/2013 |
| JP | 2015-528863 A | 10/2015 |
| WO | 2016/051786 A1 | 4/2016 |

* cited by examiner

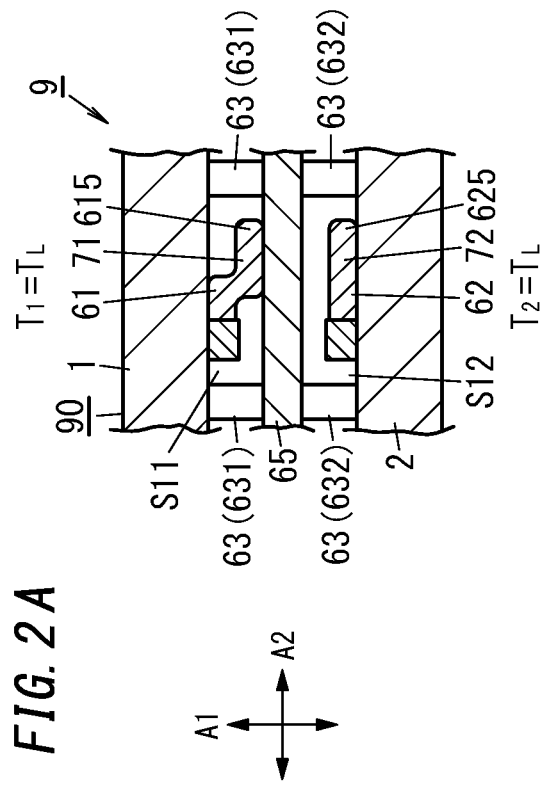
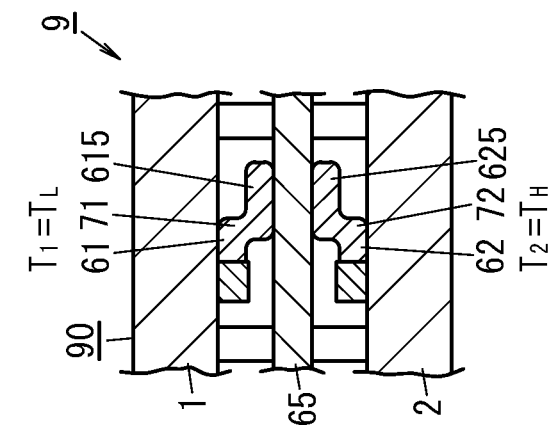
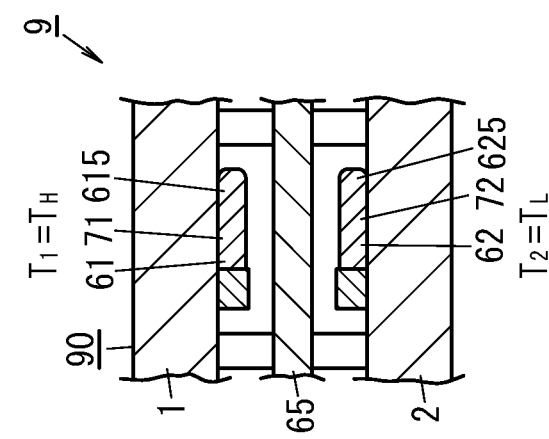

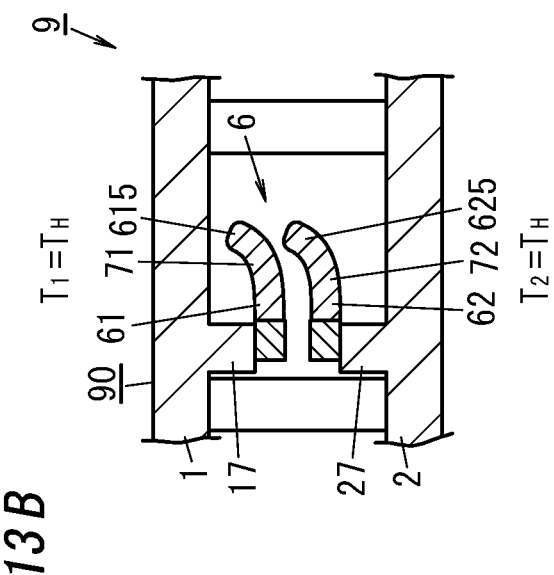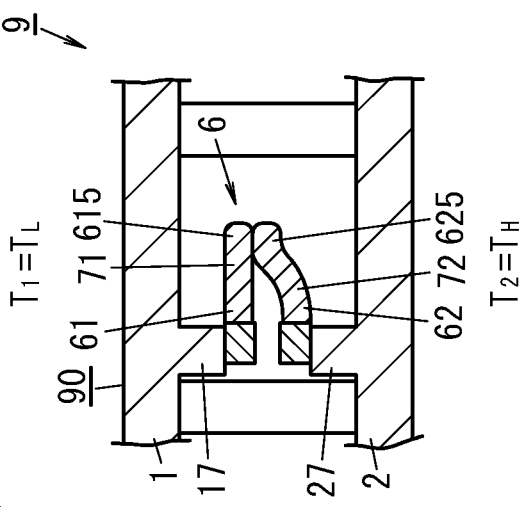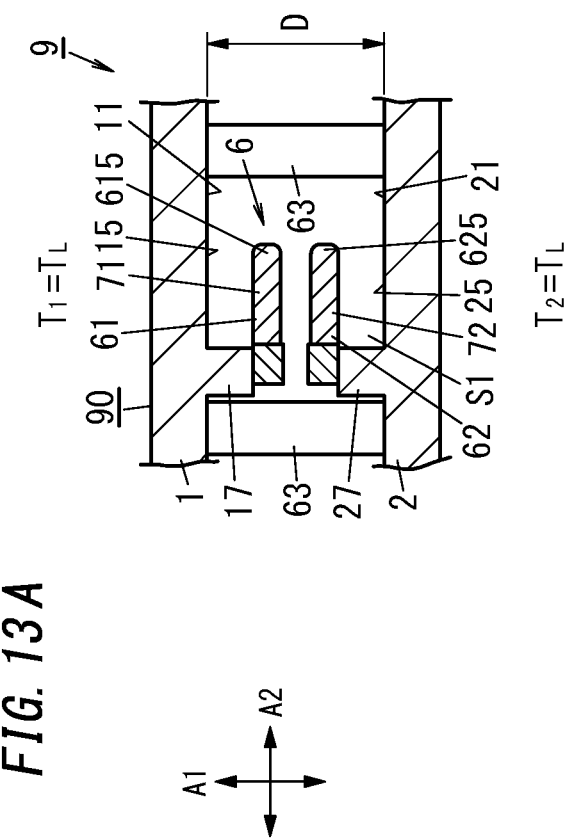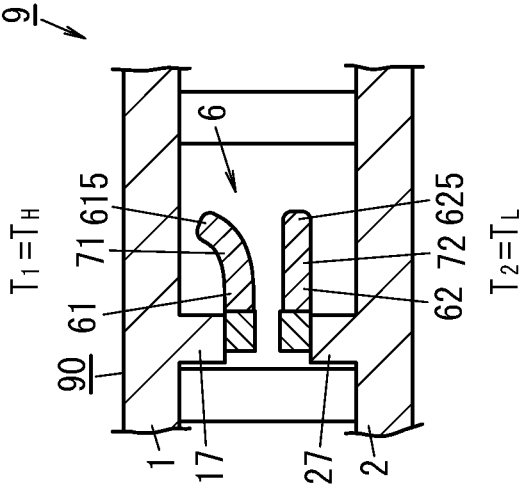

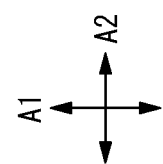
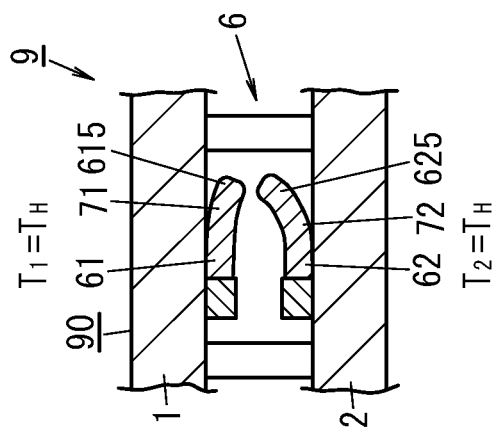
FIG. 14A
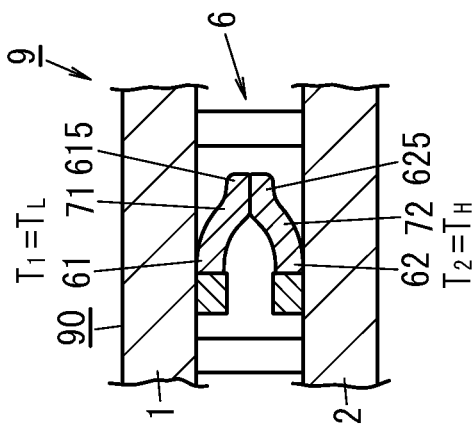
FIG. 14B
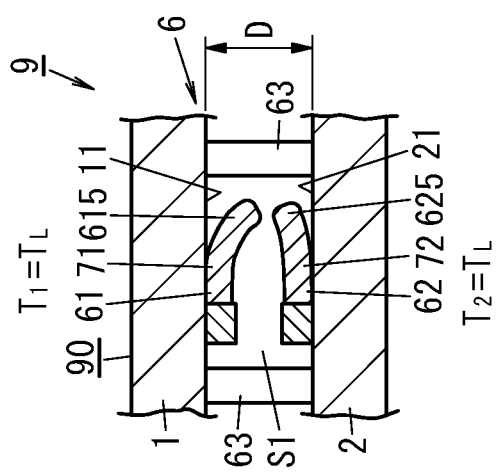
FIG. 14C
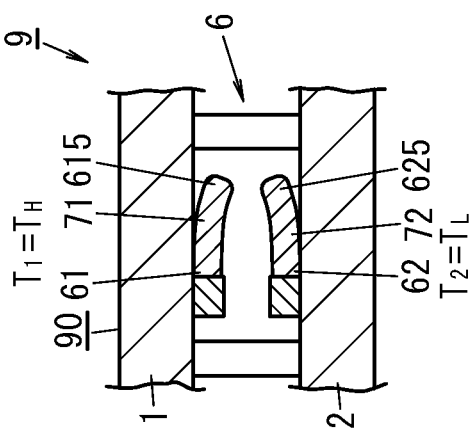
FIG. 14D

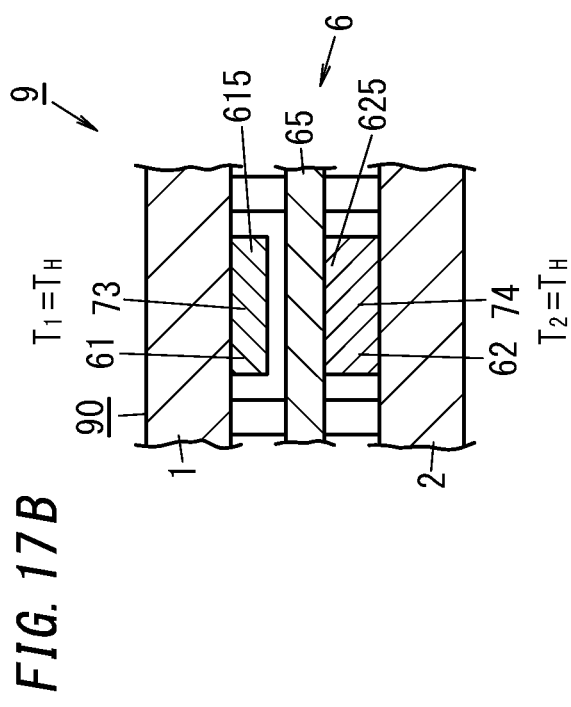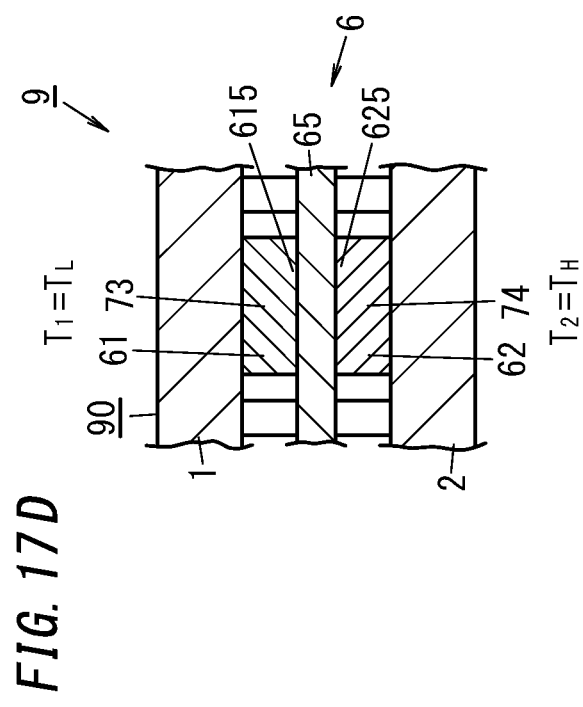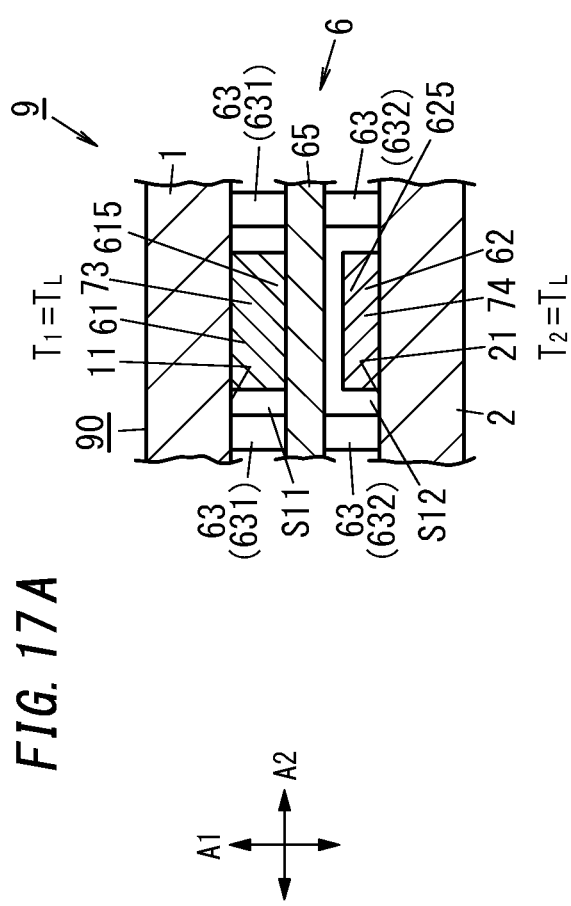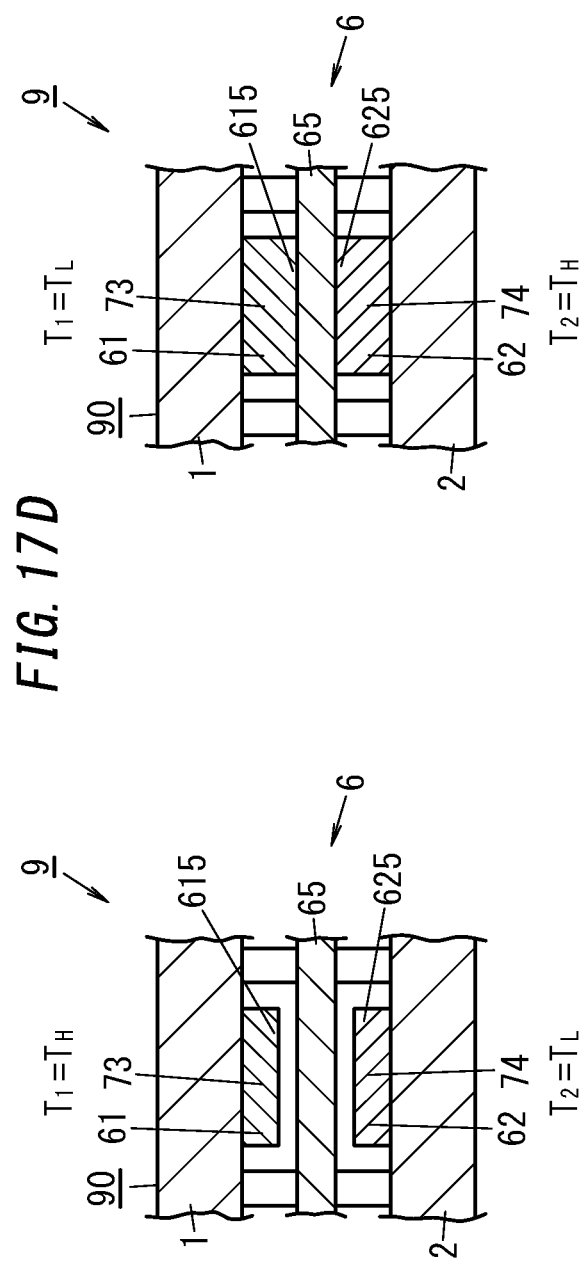

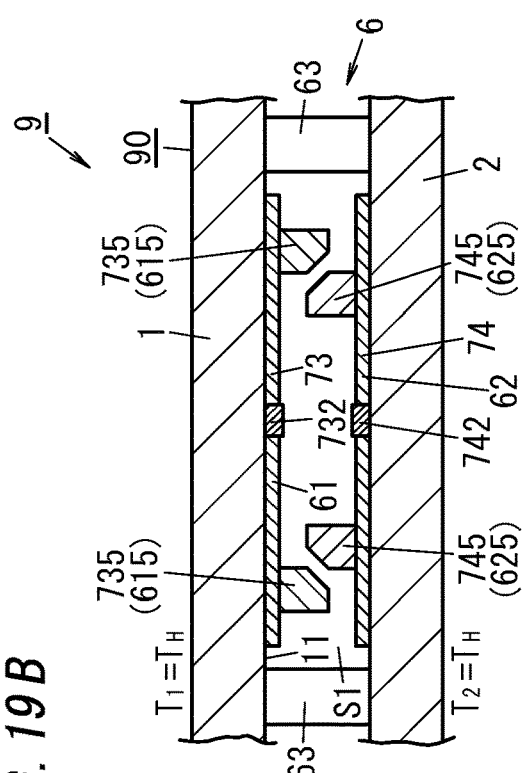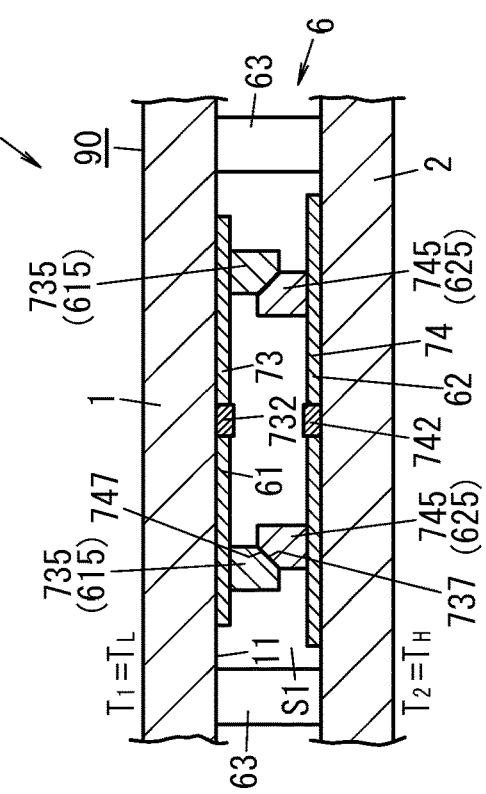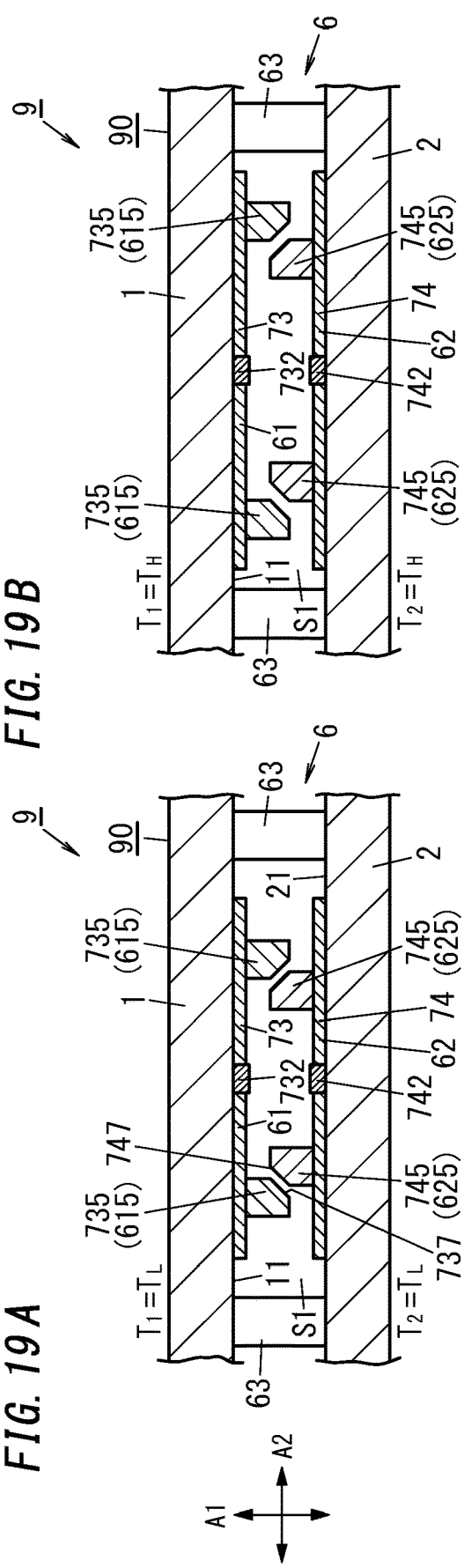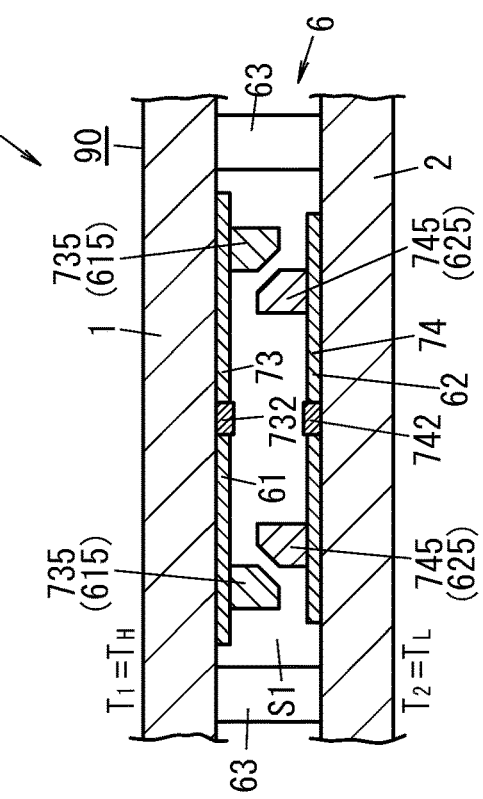

THERMAL RECTIFIER AND THERMAL RECTIFICATION UNIT

CROSS-REFERENCE OF RELATED APPLICATIONS

This application is the U.S. National Phase under 35 U.S.C. § 371 of International Patent Application No. PCT/JP2018/005210, filed on Feb. 15, 2018, which in turn claims the benefit of Japanese Application No. 2017-026473, filed on Feb. 15, 2017, the entire disclosures of which Applications are incorporated by reference herein.

TECHNICAL FIELD

The present invention relates to a thermal rectifier configured to rectify a heat flow and a thermal rectification unit including such a thermal rectifier.

BACKGROUND ART

A thermal rectifier with the ability to rectify a heat flow has been known in the art (see, for example, Patent Literature 1). This thermal rectifier includes a combination of two solid materials with mutually different thermal conductivity characteristics.

In general, it is only in a limited temperature range (such as a temperature range much lower than an ordinary temperature) that the thermal conductivity of a solid material exhibits significant temperature dependence.

Therefore, known thermal rectifiers are able to set, only within such a limited temperature range, a temperature at which heat insulation changes into heat radiation, or vice versa.

CITATION LIST

Patent Literature

Patent Literature 1: JP 2013-224781 A

SUMMARY OF INVENTION

It is therefore an object of the present invention to provide a thermal rectifier with the ability to set the heat insulation/radiation state switching temperature freely within a broad temperature range and a thermal rectification unit including such a thermal rectifier.

A thermal rectifier according to a first aspect of the present invention includes: a first panel; a second panel arranged to face the first panel; and a switching mechanism provided between the first panel and the second panel and configured to switch, according to respective temperatures of the first panel and the second panel, thermal conductivity between the first panel and the second panel.

The switching mechanism includes: a first thermally conductive portion thermally connected to the first panel; and a second thermally conductive portion thermally connected to the second panel. At least one of the first thermally conductive portion or the second thermally conductive portion has a property of changing their shape or dimensions as their own temperature varies. The switching mechanism is configured to, as at least one of the first thermally conductive portion or the second thermally conductive portion changes their shape or dimensions, switch from a heat radiation state where the first thermally conductive portion and the second thermally conductive portion are thermally coupled together to a heat insulation state where the first thermally conductive portion and the second thermally conductive portion are thermally isolated from each other, or vice versa.

A thermal rectification unit according to the first aspect of the present invention includes the thermal rectifier according to the first aspect. In the thermal rectifier, the switching mechanism further includes an intermediate panel having thermal conductivity and located between the first thermally conductive portion and the second thermally conductive portion. The heat radiation state is a state where the first thermally conductive portion and the second thermally conductive portion are both thermally connected to the intermediate panel. The heat insulation state is a state where at least one of the first thermally conductive portion or the second thermally conductive portion is thermally isolated from the intermediate panel.

The thermal rectification unit further includes a first gas barrier film with thermal conductivity; and a second gas barrier film with thermal conductivity. The intermediate panel of the thermal rectifier includes a third panel with thermal conductivity and a fourth panel with thermal conductivity. The third panel is arranged to face the first panel. The fourth panel is arranged to face the second panel. The first gas barrier film is configured to hermetically enclose the first panel, the first thermally conductive portion, and the third panel. The second gas barrier film is configured to hermetically enclose the second panel, the second thermally conductive portion, and the fourth panel. The third panel and the fourth panel are thermally coupled together via a portion of the first gas barrier film and a portion of the second gas barrier film.

A thermal rectification unit according to a second aspect of the present invention includes a plurality of the thermal rectifiers according to the first aspect. At least one of the plurality of the thermal rectifiers is arranged upside down alongside of the other thermal rectifiers.

A thermal rectification unit according to a third aspect of the present invention includes a plurality of the thermal rectifiers according to the first aspect. In the thermal rectifier, the switching mechanism further includes an intermediate panel with thermal conductivity located between the first thermally conductive portion and the second thermally conductive portion. The heat radiation state is a state where the first thermally conductive portion and the second thermally conductive portion are both thermally connected to the intermediate panel. The heat insulation state is a state where at least one of the first thermally conductive portion or the second thermally conductive portion is thermally isolated from the intermediate panel.

At least one of the plurality of the thermal rectifiers is arranged upside down alongside of the other thermal rectifiers. When each of the thermal rectifiers is viewed in any of facing directions of the first panel and the second panel, a profile of the intermediate panel is located inside of respective profiles of the first and second panels.

BRIEF DESCRIPTION OF DRAWINGS

FIGS. 2A-2D are cross-sectional views of a principal part schematically illustrating changes depending on the temperature of a switching mechanism included in the thermal rectification unit;

FIGS. 13A-13D are cross-sectional views of a principal part schematically illustrating changes depending on the temperature variation of a switching mechanism included in an eighth variation of the thermal rectification unit;

FIGS. 14A-14D are cross-sectional views of a principal part schematically illustrating changes depending on the temperature variation of a switching mechanism included in a ninth variation of the thermal rectification unit;

FIGS. 17A-17D are cross-sectional views of a principal part schematically illustrating changes depending on the temperature of a switching mechanism included in an eleventh variation of the thermal rectification unit;

FIGS. 19A-19D are cross-sectional views of a principal part schematically illustrating changes depending on the temperature of a switching mechanism included in a thirteenth variation of the thermal rectification unit;

DESCRIPTION OF EMBODIMENTS

Exemplary Embodiment

Figure 1:
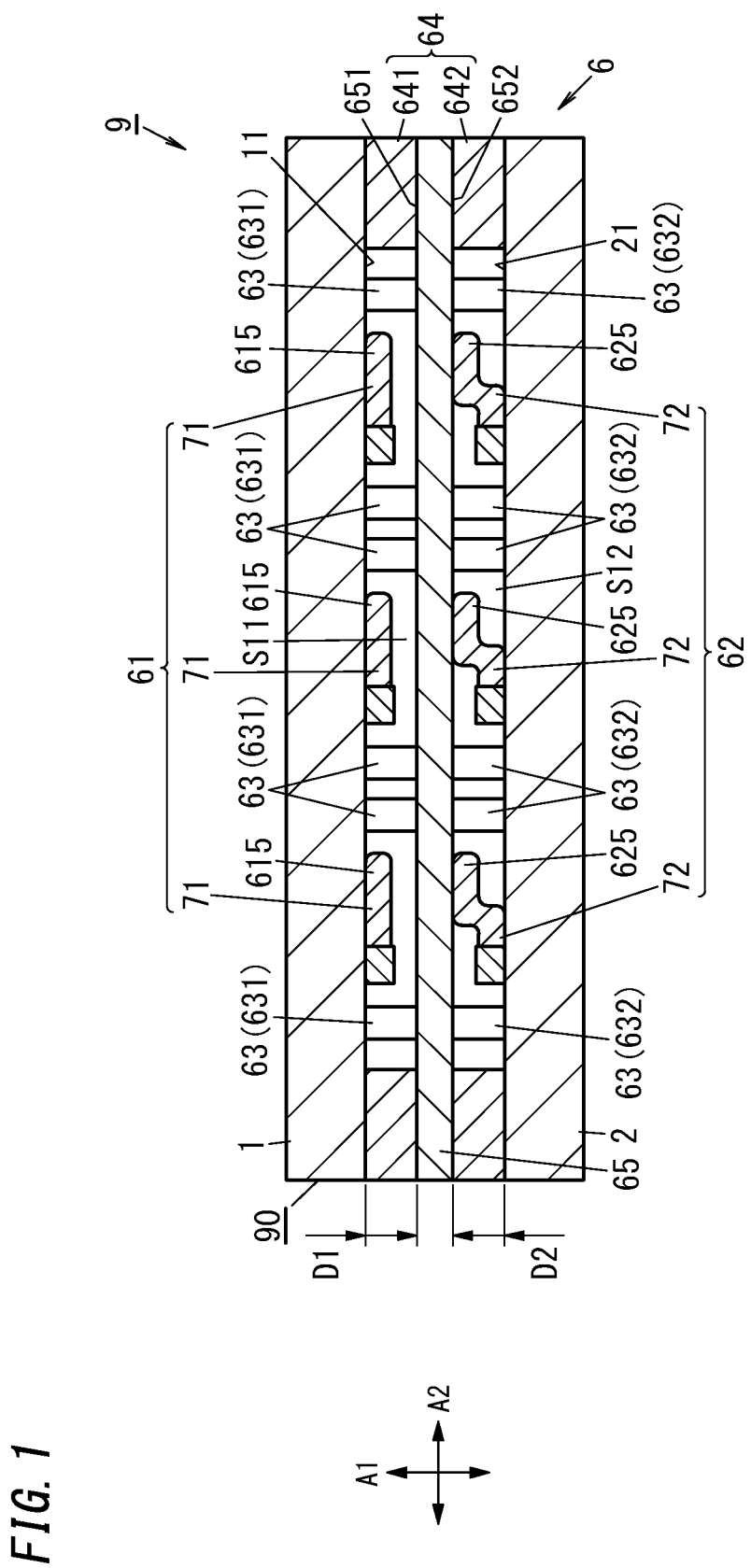
FIG. 1 is a cross-sectional view schematically illustrating a thermal rectification unit according to an exemplary embodiment.

FIG. 1 schematically illustrates the structure of a thermal rectification unit 9 according to an exemplary embodiment. In this exemplary embodiment, the thermal rectification unit 9 includes a single thermal rectifier 90. However, this is only an example and should not be construed as limiting. As will be described later for numerous variations, the thermal rectification unit 9 may also include a plurality of thermal rectifiers 90.

The thermal rectifier 90 according to this exemplary embodiment includes a first panel 1, a second panel 2, and a switching mechanism 6.

The first panel 1 and the second panel 2 are flat-plate panels, which are arranged to face each other.

The first panel 1 and the second panel 2 may have any profile selected from the group consisting of polygonal, circular, and elliptical shapes and appropriate combinations thereof. The first panel 1 and the second panel 2 may have any surface shape selected from the group consisting of flat, uneven, and curved surface shapes and appropriate combinations thereof. The thickness of the first panel 1 and the second panel 2 is not particularly limited but may be on the order of a few mm, 10 mm or more, or 1 mm or less.

The first panel 1 and the second panel 2 may be made of any material selected from the group consisting of metallic, alloy, glass, and resin materials, and appropriate combinations thereof. The first panel 1 and the second panel 2 suitably have high thermal conductivity and rigidity and suitably have low thermal expansion properties.

Examples of metallic materials for the first panel 1 and the second panel 2 include aluminum, copper, and stainless steel. Examples of alloys for use as a material for the first panel 1 and the second panel 2 include invar alloys such as Fe—Ni based alloys and Kovar alloys such as Fe—Ni—Co based alloys.

The first panel 1 and the second panel 2 suitably have a thermal expansion coefficient of 5 ppm/° C. or less, more suitably 2 ppm/° C. or less, and even more suitably 0.5 ppm/° C. or less.

Forming the first panel 1 and the second panel 2 of a material with low thermal expansion properties reduces the warp of the overall thermal rectifier 90 to be caused due to a temperature difference between the first panel 1 and the second panel 2, thus achieving the advantage of expanding the operating temperature range thereof. The first panel 1 and the second panel 2 may be made of the same material or two different materials, whichever is appropriate.

The switching mechanism 6 is a mechanism provided between the first panel 1 and the second panel 2, and is configured to automatically switch the state of the thermal rectifier 90 from a state where the first panel 1 and the second panel 2 are thermally coupled together to a state where the first panel 1 and the second panel 2 are thermally isolated from each other, or vice versa. The switching mechanism 6 is configured to automatically switch the thermal conductivity between the first panel 1 and the second panel 2 according to the respective temperatures of the first panel 1 and the second panel 2. In other words, the switching mechanism 6 is configured to automatically switch the thermal conductance between the first panel 1 and the second panel 2 according to the respective temperatures of the first panel 1 and the second panel 2.

The switching mechanism 6 includes a first thermally conductive portion 61, a second thermally conductive portion 62, spacers 63, a sealant 64, and an intermediate panel 65. As will be described later for numerous variations, the switching mechanism 6 may be implemented without the sealant 64 or without the intermediate panel 65.

First, the intermediate panel 65, the spacers 63, and the sealant 64 will be described in this order.

The intermediate panel 65 is fixed between the first panel 1 and the second panel 2 with the sealant 64 interposed between them. The intermediate panel 65 is arranged to face the first panel 1 and to face the second panel 2. The intermediate panel 65 and the first panel 1 are parallel to each other, so are the intermediate panel 65 and the second panel 2. As used herein, being "parallel" refers to not only a situation where one thing and another are exactly parallel to each other but also a situation where these two things are generally parallel to each other.

The intermediate panel 65 may be made of any material selected from the group consisting of metallic, alloy, glass, and resin materials, and appropriate combinations thereof. The intermediate panel 65 suitably has high thermal conductivity and rigidity and suitably has low thermal expansion properties.

Examples of metallic materials for the intermediate panel 65 include aluminum, copper, and stainless steel. Examples of alloys for use as a material for the intermediate panel 65 include invar alloys such as Fe—Ni based alloys and Kovar alloys such as Fe—Ni—Co based alloys. The intermediate panel 65 suitably has a thermal expansion coefficient of 5 ppm/° C. or less, more suitably 2 ppm/° C. or less, and even more suitably 0.5 ppm/° C. or less.

A plurality of spacers 63 are provided between the first panel 1 and the second panel 2. The plurality of spacers 63 each have a columnar profile.

The spacers 63 may be made of any material selected from the group consisting of metallic, alloy, glass, and resin materials, and appropriate combinations thereof but are suitably made of an insulating material. The spacers 63 suitably have low thermal conductivity. The spacers 63 suitably have lower thermal conductivity than the first panel 1, second panel 2, or intermediate panel 65.

The plurality of spacers 63 includes a plurality of first spacers 631 interposed between the first panel 1 and the intermediate panel 65 and a plurality of second spacers 632 interposed between the second panel 2 and the intermediate panel 65. The shape, dimensions, and material of the first spacers 631 and second spacers 632 are just as described above for the spacers 63.

The plurality of first spacers 631 is in contact with a flat counter surface 11, facing the intermediate panel 65, of the first panel 1 and with a flat first counter surface 651, facing the first panel 1, of the intermediate panel 65. The plurality of first spacers 631 keeps the gap distance D1 between the first panel 1 and the intermediate panel 65 consistent. A first space S11 is created between the first panel 1 and the intermediate panel 65.

The plurality of second spacers 632 is in contact with a flat counter surface 21, facing the intermediate panel 65, of the second panel 2 and with a flat second counter surface 652, facing the second panel 2, of the intermediate panel 65. The plurality of second spacers 632 keeps the gap distance D2 between the second panel 2 and the intermediate panel 65 consistent. A second space S12 is created between the second panel 2 and the intermediate panel 65.

The sealant 64 includes a first sealant 641 interposed between the first panel 1 and the intermediate panel 65, and a second sealant 642 interposed between the second panel 2 and the intermediate panel 65.

The first sealant 641 is in contact with respective peripheral edge portions of the counter surface 11 of the first panel 1 and the first counter surface 651 of the intermediate panel 65 to surround the first space S11 entirely. The first space S11 is hermetically sealed with the first panel 1, the intermediate panel 65, and the first sealant 641 in the shape of a frame.

The second sealant 642 is in contact with respective peripheral edge portions of the counter surface 21 of the second panel 2 and the second counter surface 652 of the intermediate panel 65 to surround the second space S12 entirely. The second space S12 is hermetically sealed with the second panel 2, the intermediate panel 65, and the second sealant 642 in the shape of a frame.

The first space S11 and the second space S12 have their pressure reduced to increase the degree of heat insulation of the spaces. However, this is only an example and should not be construed as limiting. Alternatively, the first space S11 and the second space S12 may also be filled with a dry gas (which may be a rare gas such as argon or krypton gas or dried air, for example).

When the pressure in the first space S11 is reduced, the first space S11 suitably has its pressure reduced to the point of satisfying $\lambda 1/D1 > 0.3$, where $\lambda 1$ is a mean free path of the air in the first space S11. Likewise, when the pressure in the second space S12 is reduced, the second space S12 suitably has its pressure reduced to the point of satisfying $\lambda 2/D2 > 0.3$, where $\lambda 2$ is a mean free path of the air in the second space S12.

Satisfying these relationships turns each of the first space S11 and the second space S12 into a molecular flow region, makes the thermal conductance of the first space S11 independent of the gap distance D1, and also makes the thermal conductance of the second space S12 independent of the gap distance D2. This allows the thermal rectifier 90, enclosing the first and second spaces S11 and S12 with excellent thermal insulation properties, to be formed with a significantly reduced thickness.

Generally speaking, in both of solids and gases, the longer the conduction distance of heat is, the lower the thermal conductance becomes. Therefore, in general, the thinner the thermal rectifier 90 is, the less advantageous it is to increase the degree of heat insulation of the first space S11 and the second space S12. However, satisfying $\lambda 1/D1 > 0.3$ in the first space S11 and $\lambda 2/D2 > 0.3$ in the second space S12 allows the first space S11 and the second space S12 to have a high degree of heat insulation property while reducing the thickness of the thermal rectifier 90.

The thermal rectifier 90 with such a reduced thickness is able to exhibit a high degree of thermal conductivity due to the reduced thinness when the first panel 1 and the second panel 2 are thermally coupled together via the switching mechanism 6.

That is to say, satisfying $\lambda1/D1 > 0.3$ in the first space S11 and $\lambda2/D2 > 0.3$ in the second space S12 allows the thermal rectifier 90 to exhibit a high degree of thermal conductivity due to its reduced thickness when the first panel 1 and the second panel 2 are thermally coupled together via the switching mechanism 6. This also allows the thermal rectifier 90 to exhibit an excellent heat insulation property overall due to the heat insulation property of the first space S11 and the second space S12 when the first panel 1 and the second panel 2 are thermally isolated from each other.

In addition, satisfying $\lambda1/D1 > 0.3$ in the first space S11 turns the first space S11 into a molecular flow region, thus making the thermal conductance between the first thermally conductive portion 61 (i.e., respective bimetal members 71) and the intermediate panel 65 independent of the gap distance between the first thermally conductive portion 61 and the intermediate panel 65.

That is why this reduces the chances of the thermal conductance between the first thermally conductive portion 61 and the intermediate panel 65, which are out of contact with each other but are located very close to each other, increasing (which would eventually cause a decline in the operating accuracy of the thermal rectifier 90) irrespective of their contactless state.

Likewise, satisfying $\lambda2/D2 > 0.3$ in the second space S12 turns the second space S12 into a molecular flow region, thus making the thermal conductance between the second thermally conductive portion 62 (i.e., respective bimetal members 72) and the intermediate panel 65 independent of the gap distance between the second thermally conductive portion 62 and the intermediate panel 65.

That is why this reduces the chances of the thermal conductance between the second thermally conductive portion 62 and the intermediate panel 65, which are out of contact with each other but are located very close to each other, increasing (which would eventually cause a decline in the operating accuracy of the thermal rectifier 90) irrespective of their contactless state.

Next, the first thermally conductive portion 61 and the second thermally conductive portion 62 will be described.

The first thermally conductive portion 61 and the second thermally conductive portion 62 suitably have high thermal conductivity. The first thermally conductive portion 61 and the second thermally conductive portion 62 suitably have higher thermal conductivity than the spacers 63 (namely, the first spacers 631 and the second spacers 632), to say the least. The material for the first thermally conductive portion 61 and the second thermally conductive portion 62 is suitably an electrically conductive material such as a metal or an alloy.

In the thermal rectification unit 9 according to this exemplary embodiment, the first thermally conductive portion 61 includes a plurality of bimetal members 71 which are thermally connected to the first panel 1. The first thermally conductive portion 61 needs to include at least one bimetal member 71.

The respective bimetal members 71 are located in the first space S11 that is hermetically sealed. Each of the bimetal members 71 is configured as a flat plate bimetal so as to be deformed as its own temperature varies. The bimetal contained in each bimetal member 71 may be, for example, a bimetal in which a plate member of aluminum and a plate member of an Fe—Ni alloy are joined together.

A portion (i.e., a fixed end portion) of each bimetal member 71 is fixed onto the counter surface 11 of the first panel 1. Each bimetal member 71 is deformed in the facing directions A1 of the first panel 1 and the second panel 2 (hereinafter referred to as "first directions A1").

The plurality of bimetal members 71 included in the first thermally conductive portion 61 are arranged to be spaced apart from each other in directions A2 perpendicular to the first directions A1 (and hereinafter referred to as "second directions A2"). The second directions A2 are parallel to the first panel 1 and the second panel 2. The second directions A2 are parallel to the counter surface 11 of the first panel 1 and also parallel to the counter surface 21 of the second panel 2.

A free end portion of each bimetal member 71 constitutes a displaceable portion 615 of the first thermally conductive portion 61 (hereinafter referred to as a "first displaceable portion 615"). The first displaceable portion 615 is a portion to be displaced in the first directions A1 as the temperature of the first thermally conductive portion 61 varies.

The displacement of the first displaceable portion 615 in the first directions A1 means a change in the distance of the first displaceable portion 615 from the first panel 1 and a change in the gap distance between the first displaceable portion 615 and the intermediate panel 65.

In the thermal rectifier 90, as the temperature of the first panel 1 varies, the temperature of the first thermally conductive portion 61 that is thermally and mechanically connected to the first panel 1 (i.e., the temperature of the respective bimetal members 71) changes. The first thermally conductive portion 61 is configured to bring, as its own temperature varies, the first displaceable portions 615 toward, or away from, the intermediate panel 65.

More specifically, the first thermally conductive portion 61 (i.e., the respective bimetal members 71) is configured to, as its own temperature rises, switch from a state where the first displaceable portions 615 are in contact with the intermediate panel 65 (i.e., thermally connected to the intermediate panel 65) to a state where the first displaceable portions 615 are out of contact with the intermediate panel 65 (i.e., thermally isolated from the intermediate panel 65). As used herein, the phrase "being isolated" does not always refer to a state where something is perfectly isolated from something else but may also refer to a state where these two things are substantially isolated from each other via significant thermal resistance between them.

The second thermally conductive portion 62 includes a plurality of bimetal members 72 which are thermally connected to the second panel 2. These bimetal members 72 are arranged to be spaced apart from each other in the second directions A2. The second thermally conductive portion 62 needs to include at least one bimetal member 72.

The respective bimetal members 72 are located in the second space S12 that is hermetically sealed. Each of the bimetal members 72 is configured as a flat plate bimetal so as to be deformed as its own temperature varies. The bimetal contained in each bimetal member 72 may be a bimetal in which a plate member of aluminum and a plate member of an Fe—Ni alloy are joined together.

A portion (i.e., a fixed end portion) of each bimetal member 72 is fixed onto the counter surface 21 of the second panel 2. Each bimetal member 72 is deformed in the first directions A1.

A free end portion of each bimetal member 72 constitutes a displaceable portion 625 of the second thermally conductive portion 62 (hereinafter referred to as a "second displaceable portion 625"). The second displaceable portion 625 is a portion to be displaced in the first directions A1 as the temperature of the second thermally conductive portion 62 varies.

The displacement of the second displaceable portion 625 in the first directions A1 means a change in the distance of the second displaceable portion 625 from the second panel 2 and a change in the gap distance between the second displaceable portion 625 and the intermediate panel 65.

In the thermal rectifier 90, as the temperature of the second panel 2 varies, the temperature of the second thermally conductive portion 62 that is thermally and mechanically connected to the second panel 2 (i.e., the temperature of the respective bimetal members 72) changes as well. The second thermally conductive portion 62 is configured to bring, as its own temperature varies, the second displaceable portions 625 toward, or away from, the intermediate panel 65.

More specifically, the second thermally conductive portion 62 (i.e., the respective bimetal members 72) is configured to, as its own temperature rises, switch from a state where the second displaceable portions 625 are out of contact with the intermediate panel 65 (i.e., thermally isolated from the intermediate panel 65) to a state where the second displaceable portions 625 are in contact with the intermediate panel 65 (i.e., thermally connected to the intermediate panel 65).

The thermal rectifier 90 according to this exemplary embodiment, having such a configuration, is able to freely set, based on the properties of the first thermally conductive portion 61 and the second thermally conductive portion 62 (i.e., how they are deformed as their own temperature varies), the condition for switching the state of the first panel 1 and the second panel 2 from the heat radiation state to the heat insulation state, or vice versa.

Figure 3A:
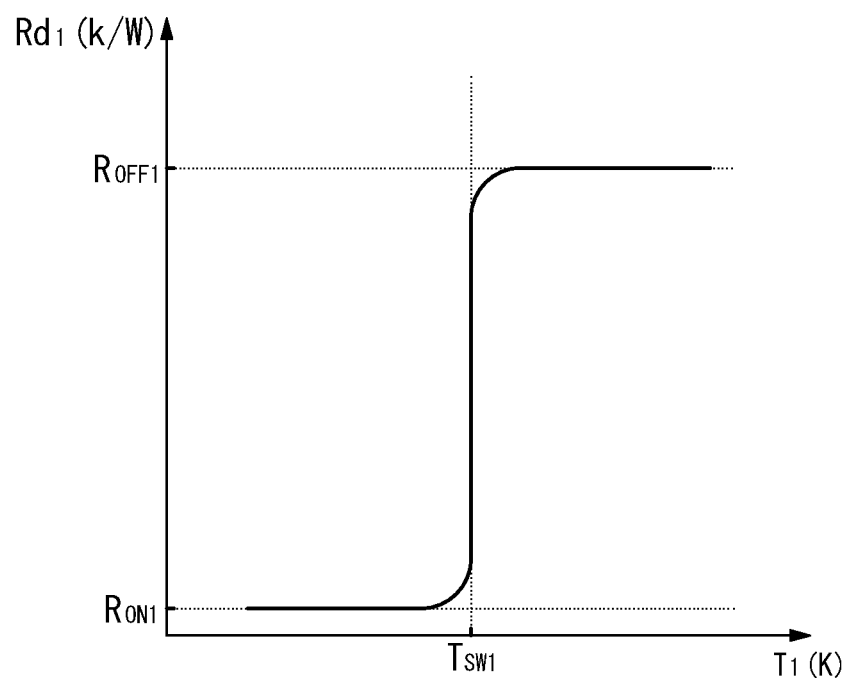
FIG. 3A is a graph schematically showing how the thermal resistance between a first thermally conductive portion and intermediate panel included in the thermal rectification unit changes with the temperature of the first thermally conductive portion.
Figure 3B:
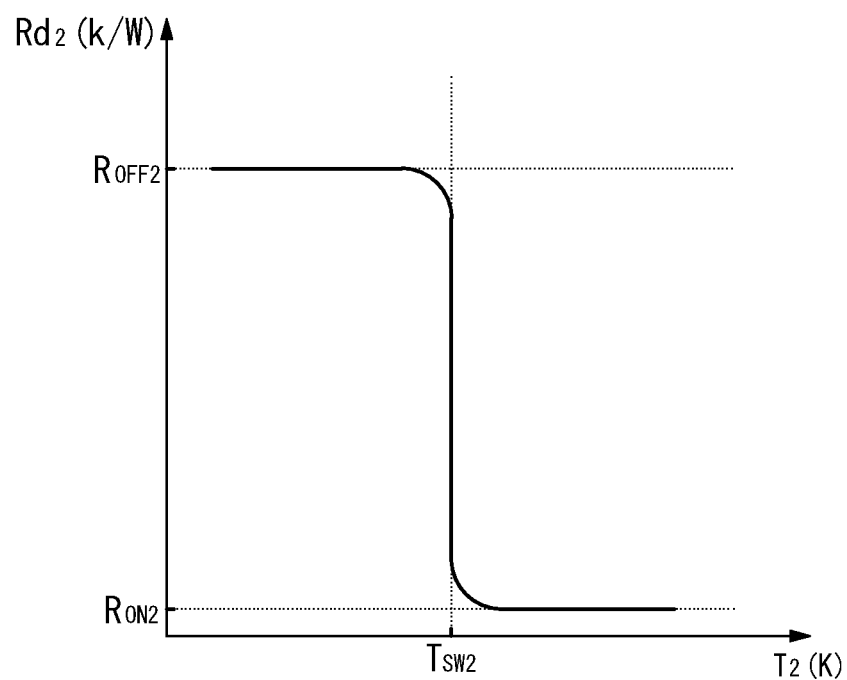
FIG. 3B is a graph schematically showing how the thermal resistance between a second thermally conductive portion and intermediate panel included in the thermal rectification unit changes with the temperature of the second thermally conductive portion.

FIGS. 2A-2D illustrate a principal part of the thermal rectifier 90 according to the exemplary embodiment. FIG. 3A shows, in a simplified form, how the thermal resistance $Rd_1$ between the first thermally conductive portion 61 and the intermediate panel 65 changes with the temperature $T_1$ of the first thermally conductive portion 61. FIG. 3B shows, in a simplified form, how the thermal resistance $Rd_2$ between the second thermally conductive portion 62 and the intermediate panel 65 changes with the temperature $T_2$ of the second thermally conductive portion 62.

Now, it will be described by reference to these simplified drawings how the switching mechanism 6 of the thermal rectifier 90 according to this exemplary embodiment operates.

The first thermally conductive portion 61 is configured to, when its temperature $T_1$ is lower than a predetermined first switching temperature $T_{SW1}$, keep a state in which $Rd_1=R_{ON1}$ (i.e., a state in which the first displaceable portion 615 is in contact with the intermediate panel 65) is satisfied as shown in FIG. 3A, where $Rd_1$ is the thermal resistance between the first thermally conductive portion 61 and the intermediate panel 65.

The first thermally conductive portion 61 is configured to, when its temperature $T_1$ is higher than the first switching temperature $T_{SW1}$, keep a state in which the thermal resistance $Rd_1=R_{OFF1}$ (i.e., a state in which the first displaceable portion 615 is out of contact with the intermediate panel 65) is satisfied.

The $R_{OFF1}$ and $R_{ON1}$ values satisfy the inequality $R_{OFF1} \gg R_{ON1}$. When $Rd_1=R_{ON1}$ is satisfied, the first thermally conductive portion 61 and the intermediate panel 65 are thermally connected to each other. When $Rd_1=R_{OFF1}$ is satisfied, the first thermally conductive portion 61 and the intermediate panel 65 are thermally isolated from each other.

The second thermally conductive portion 62 is configured to, when its temperature $T_2$ is lower than a predetermined second switching temperature $T_{SW2}$, keep a state in which $Rd_2=R_{OFF2}$ (i.e., a state in which the second displaceable portion 625 is out of contact with the intermediate panel 65) is satisfied as shown in FIG. 3B, where $Rd_2$ is the thermal resistance between the second thermally conductive portion 62 and the intermediate panel 65.

The second thermally conductive portion 62 is configured to, when its temperature $T_2$ is higher than the second switching temperature $T_{SW2}$, keep a state in which the thermal resistance $Rd_2=R_{ON2}$ (i.e., a state in which the second displaceable portion 625 is in contact with the intermediate panel 65) is satisfied.

The $R_{OFF2}$ and $R_{ON2}$ values satisfy the inequality $R_{OFF2} \gg R_{ON2}$. When $Rd_2=R_{OFF2}$ is satisfied, the second thermally conductive portion 62 and the intermediate panel 65 are thermally isolated from each other. When $Rd_2=R_{ON2}$ is satisfied, the second thermally conductive portion 62 and the intermediate panel 65 are thermally connected to each other.

As can be seen, the first thermally conductive portion 61 (i.e., the respective bimetal members 71) has the first switching temperature $T_{SW1}$ as a threshold value and is deformed in the first directions A1 so as to be in contact with the intermediate panel 65 when its own temperature $T_1$ is lower than the first switching temperature $T_{SW1}$ and be out of contact with the intermediate panel 65 when its own temperature $T_1$ is higher than the first switching temperature $T_{SW1}$. The first switching temperature $T_{SW1}$ may be set freely by selecting appropriate material, shape, and dimensions for the bimetal members 71, for example.

The second thermally conductive portion 62 (i.e., the respective bimetal members 72) has the second switching temperature $T_{SW2}$ as a threshold value and is deformed in the first directions A1 so as to be out of contact with the intermediate panel 65 when its own temperature $T_2$ is lower than the second switching temperature $T_{SW2}$ and be in contact with the intermediate panel 65 when its own temperature $T_2$ is higher than the second switching temperature $T_{SW2}$. The second switching temperature $T_{SW2}$ may be set freely by selecting appropriate material, shape, and dimensions for the bimetal members 72, for example.

In the thermal rectifier 90 according to this exemplary embodiment, the first switching temperature $T_{SW1}$ and the second switching temperature $T_{SW2}$ are set at the same temperature.

Only when the temperature $T_1$ of the first thermally conductive portion 61 is lower than the first switching temperature $T_{SW1}$ and the temperature $T_2$ of the second thermally conductive portion 62 is higher than the second switching temperature $T_{SW2}$ (i.e., the first switching temperature $T_{SW1}$), the switching mechanism 6 turns into the heat radiation state in which the first thermally conductive portion 61 and the second thermally conductive portion 62 are thermally coupled to each other via the intermediate panel 65 as shown in FIG. 2D. While the switching mechanism 6 is in the heat radiation state, the first panel 1 and the second panel 2 are able to radiate heat between themselves.

At this time, the temperature $T_1$ of the first thermally conductive portion 61 and the temperature $T_2$ of the second thermally conductive portion 62 satisfy the inequality $T_1 < T_{SW1} = T_{SW2} < T_2$, and therefore, heat is radiated in such a direction in which heat flows from the second thermally conductive portion 62 toward the first thermally conductive portion 61 (i.e., heat flows from the first panel 1 toward the second panel 2).

On the other hand, each of the states shown in FIGS. 2A, 2B, and 2C is the heat insulation state in which at least one of the first thermally conductive portion 61 or the second thermally conductive portion 62 is out of contact with the intermediate panel 65 and the first thermally conductive portion 61 and the second thermally conductive portion 62 are thermally isolated from each other.

In the state shown in FIG. 2A, the temperature $T_1$ of the first thermally conductive portion 61 is a low temperature $T_L$ lower than the first switching temperature $T_{SW1}$ and the temperature $T_2$ of the second thermally conductive portion 62 is a low temperature $T_L$ lower than the second switching temperature $T_{SW2}$ (=$T_{SW1}$). At this time, the first thermally conductive portion 61 is in contact with the intermediate panel 65 and the second thermally conductive portion 62 is out of contact with the intermediate panel 65, and therefore, the first thermally conductive portion 61 and the second thermally conductive portion 62 are thermally isolated from each other.

In the state shown in FIG. 2B, the temperature $T_1$ of the first thermally conductive portion 61 is a high temperature $T_H$ higher than the first switching temperature $T_{SW1}$ and the temperature $T_2$ of the second thermally conductive portion 62 is a high temperature $T_H$ higher than the second switching temperature $T_{SW2}$ (=$T_{SW1}$). At this time, the first thermally conductive portion 61 is out of contact with the intermediate panel 65 and the second thermally conductive portion 62 is in contact with the intermediate panel 65, and therefore, the first thermally conductive portion 61 and the second thermally conductive portion 62 are thermally isolated from each other.

In the state shown in FIG. 2C, the temperature $T_1$ of the first thermally conductive portion 61 is a high temperature $T_H$ higher than the first switching temperature $T_{SW1}$ and the temperature $T_2$ of the second thermally conductive portion 62 is a low temperature $T_L$ lower than the second switching temperature $T_{SW2}$ (=$T_{SW1}$). At this time, the first thermally conductive portion 61 and the second thermally conductive portion 62 are both out of contact with the intermediate panel 65, and therefore, the first thermally conductive portion 61 and the second thermally conductive portion 62 are thermally isolated from each other.

In the thermal rectifier 90 according to this exemplary embodiment, the temperatures of the first panel 1 and the second panel 2 determine the temperatures $T_1$ and $T_2$ of the first and second thermally conductive portions 61 and 62, on which the thermal conductivity between the first panel 1 and the second panel 2 switches.

For example, if the first panel 1, the second panel 2, and intermediate panel 65 are made of aluminum, the spacers 63 are made of a resin, and the bimetal for use as the bimetal members 71 and the bimetal members 72 is a bimetal in which a plate member of aluminum and a plate member of an Fe—Ni alloy are joined together, the thermal conductivity between the first panel 1 and the second panel 2 varies significantly.

In particular, the thermal rectifier 90 according to this exemplary embodiment rectifies the heat flow such that heat flows only from the second panel 2 toward the first panel 1, and is usable in various fields of applications.

Figure 4:
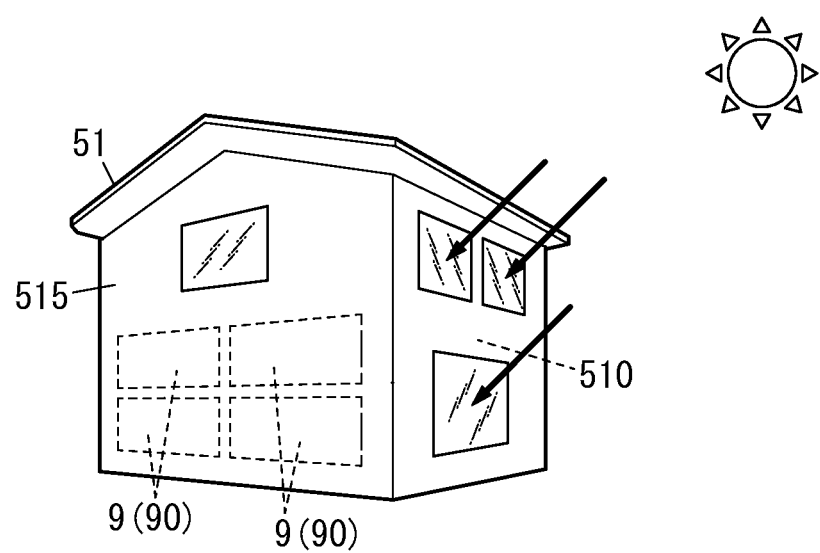
FIG. 4 diagrammatically illustrates an exemplary application of the thermal rectification unit.

FIG. 4 generally illustrates an exemplary application of the thermal rectification unit 9 (including a plurality of thermal rectifiers 90) according to this exemplary embodiment. In this exemplary application, part of a heat insulator provided as a wall material 515 for a building 51 is configured as the thermal rectification unit 9. The thermal rectification unit 9 is interposed between an interior space S10 formed inside of the building 51 and an exterior space outside of the building 51.

Each of the thermal rectifiers 90 of the thermal rectification unit 9 is configured such that the first panel 1 is located closer to the outside of the building 51 than the second panel 2 is. Therefore, if the first switching temperature $T_{SW1}$ and the second switching temperature $T_{SW2}$ are set at 30° C., then heat is radiated from the inside to the outside of the building 51 only when the building 51 is located in an environment with an indoor temperature higher than 30° C. and an outdoor temperature lower than 30° C. due to sunshine, for example. On the other hand, when the building 51 is located in any other environment, the thermal rectification unit 9 (including a plurality of thermal rectifiers 90) is maintained in the heat insulation state.

Figure 5:
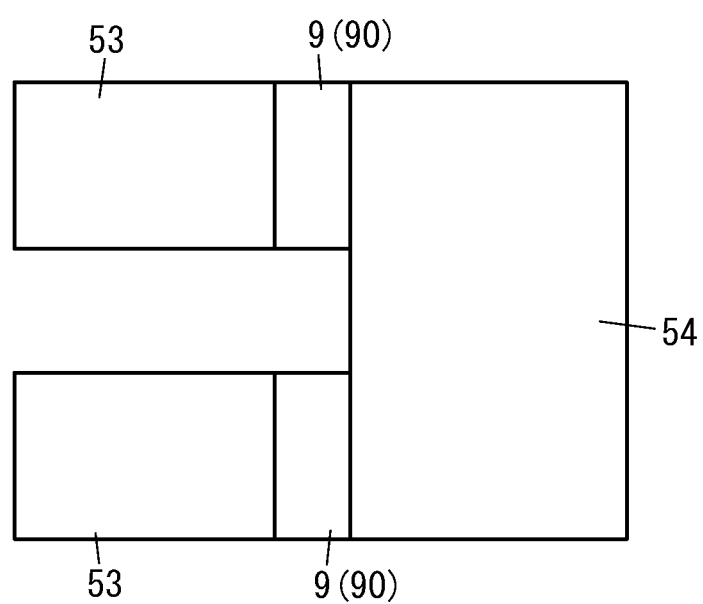
FIG. 5 diagrammatically illustrates another exemplary application of the thermal rectification unit.

FIG. 5 generally illustrates another exemplary application of the thermal rectification unit 9 (including a plurality of thermal rectifiers 90) according to this exemplary embodiment. In this exemplary application, the thermal rectification unit 9 is interposed between each of a plurality of heat sources 53 provided for a house, a commercial facility, a factory, or any other building, and a heat storage unit 54. In this example, two heat sources 53 are provided. However, this is only an example and should not be construed as limiting. Alternatively, three or more heat sources 53 may or provided or even a single heat source 53 may be provided.

Each of the thermal rectifiers 90 of the thermal rectification unit 9 is arranged such that the second panel 2 is located closer to its associated heat source 53 and the first panel 1 is located closer to the heat storage unit 54. Therefore, heat is radiated from the heat source 53 toward the heat storage unit 54 only when the building is located in an environment in which the heat source 53 has a temperature higher than a predetermined temperature and the heat storage unit 54 has a temperature lower than the predetermined temperature. On the other hand, when the building is located in any other environment, the thermal rectification unit 9 (including a plurality of thermal rectifiers 90) is maintained in the heat insulation state.

Alternatively, the thermal rectification unit 9 (including a plurality of thermal rectifiers 90) according to this exemplary embodiment is applicable to any other fields. Examples of alternative fields of application, other than the dwelling houses, factories, and commercial facilities described above, include aircrafts, automobiles, and clothing. In any of these fields of application, the use of the thermal rectification unit 9 according to this exemplary embodiment contributes to energy saving and increasing the degree of comfortableness.

Although an exemplary embodiment of the thermal rectification unit 9 has been described, the embodiment described above is only an example of the present invention and should not be construed as limiting. Rather, the constituent elements of the thermal rectification unit 9 described above may be readily modified as appropriate in various manners. Numerous variations of the thermal rectification unit 9 will be described one after another. Note that in the following description of variations, any constituent element, having the same function as a counterpart of the exemplary embodiment described above, will be designated by the same reference numeral as that counterpart's, and a detailed description thereof will be omitted herein.

(First Variation)

Figure 6A:
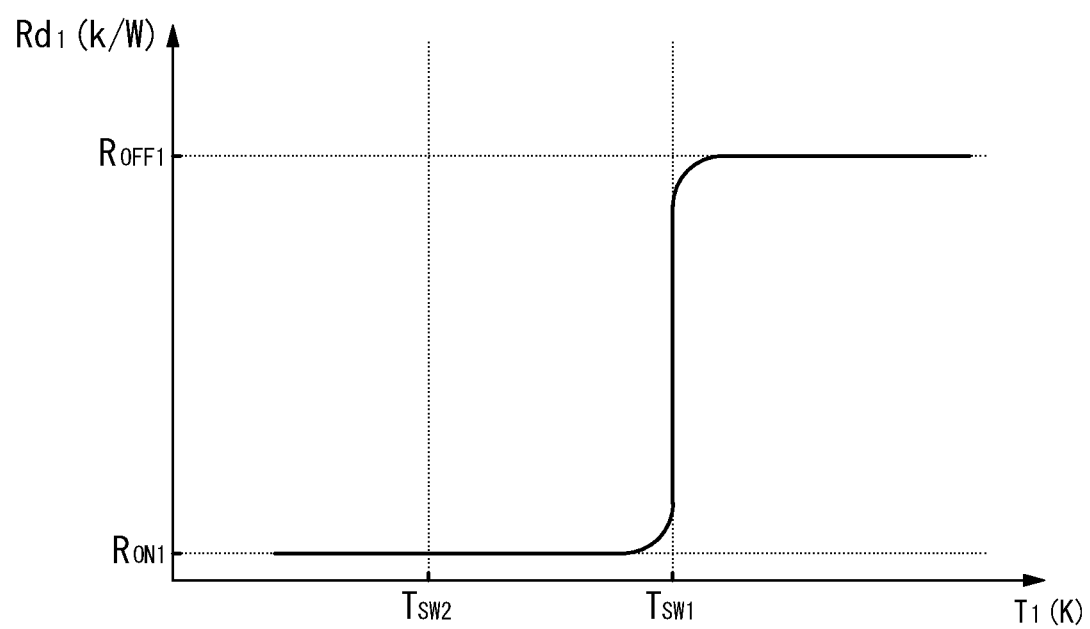
FIG. 6A is a graph schematically showing how the thermal resistance between a first thermally conductive portion and intermediate panel included in a first variation of the thermal rectification unit changes with the temperature of the first thermally conductive portion.
Figure 6B:
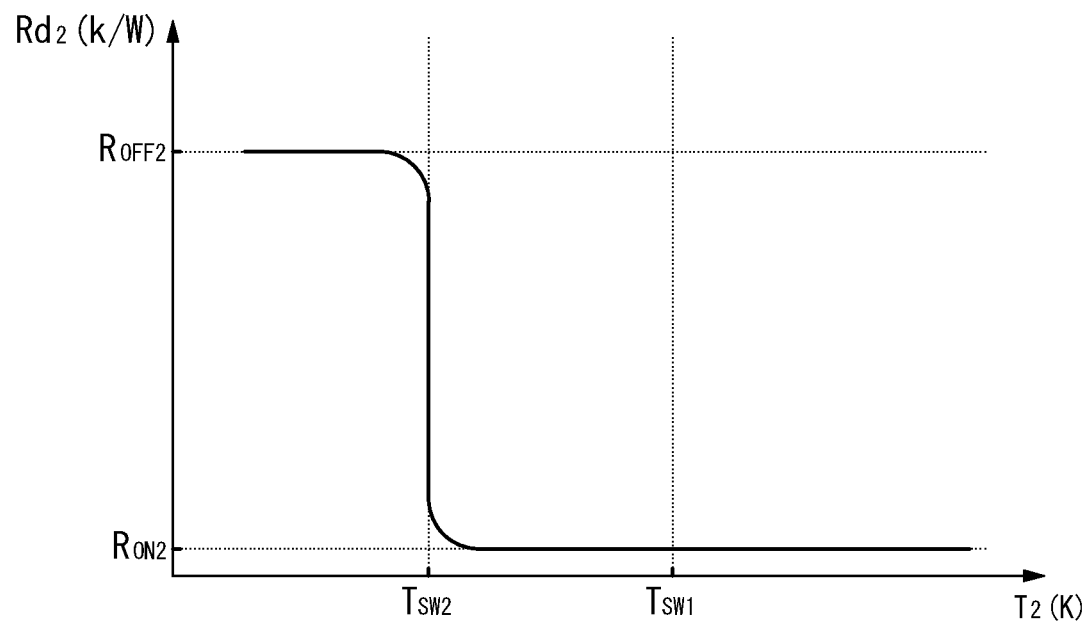
FIG. 6B is a graph schematically showing how the thermal resistance between a second thermally conductive portion and intermediate panel included in the first variation changes with the temperature of the second thermally conductive portion.

In a first variation of the thermal rectification unit 9, the first switching temperature $T_{SW1}$ and the second switching temperature $T_{SW2}$ are set at mutually different temperatures such that the first switching temperature $T_{SW1}$ is higher by a predetermined temperature difference than the second switching temperature $T_{SW2}$ as shown in FIGS. 6A and 6B.

As described above, the first switching temperature $T_{SW1}$ is a temperature at which the state where the first thermally conductive portion 61 is thermally connected to the intermediate panel 65 switches to the state where the first thermally conductive portion 61 is thermally isolated from the intermediate panel 65, or vice versa. The second switching temperature $T_{SW2}$ is a temperature at which the state where the second thermally conductive portion 62 is thermally connected to the intermediate panel 65 switches to the state where the second thermally conductive portion 62 is thermally isolated from the intermediate panel 65, or vice versa.

In this first variation, when the temperature $T_1$ of the first thermally conductive portion 61 is lower than the first switching temperature $T_{SW1}$ and the temperature $T_2$ of the second thermally conductive portion 62 is higher than the second switching temperature $T_{SW2}$ (<first switching temperature $T_{SW1}$), the switching mechanism 6 turns into the heat radiation state in which the first thermally conductive portion 61 and the second thermally conductive portion 62 are thermally coupled to each other via the intermediate panel 65. While the switching mechanism 6 is in the heat radiation state, the first panel 1 and the second panel 2 are ready to conduct heat (i.e., radiate heat) between them.

Also, in this first variation, when the respective temperatures $T_1$ and $T_2$ of the first and second thermally conductive portions 61 and 62 both fall within a temperature range that is higher than the second switching temperature $T_{SW2}$ and lower than the first switching temperature $T_{SW1}$, the first panel 1 and second panel 2 are ready to conduct heat (i.e., radiate heat) between themselves, no matter which of the temperatures $T_1$ and $T_2$ of the first and second thermally conductive portions 61 and 62 is higher or lower than the other.

Thus, this first variation reduces the chances of the conduction of heat between the first panel 1 and the second panel 2 being cut off at an unexpected timing.

(Second Variation)

Figure 7A:
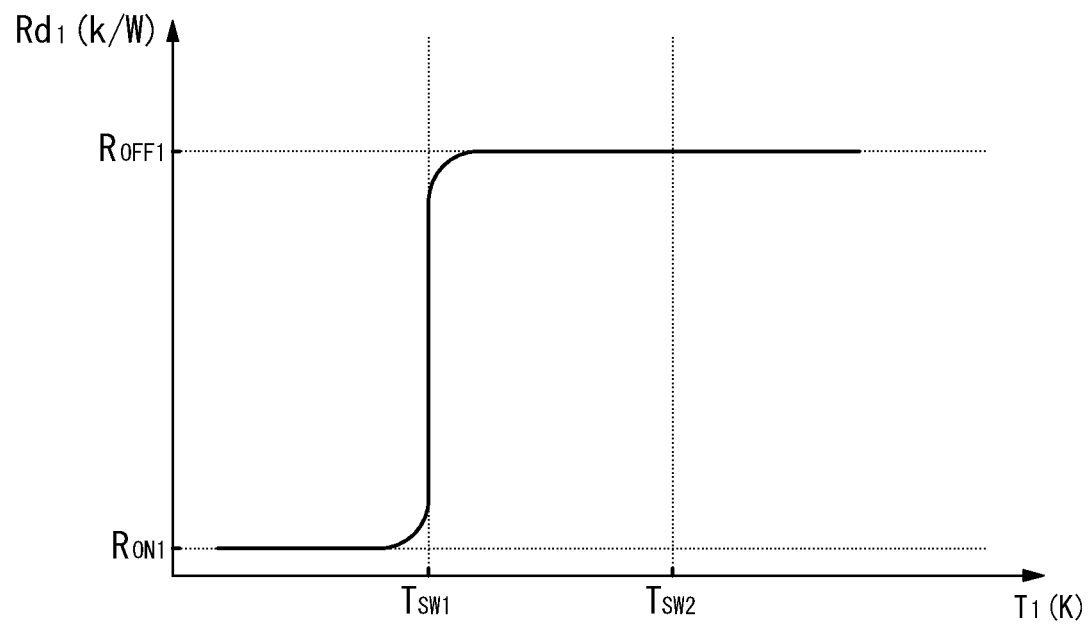
FIG. 7A is a graph schematically showing how the thermal resistance between a first thermally conductive portion and intermediate panel included in a second variation of the thermal rectification unit changes with the temperature of the first thermally conductive portion.
Figure 7B:
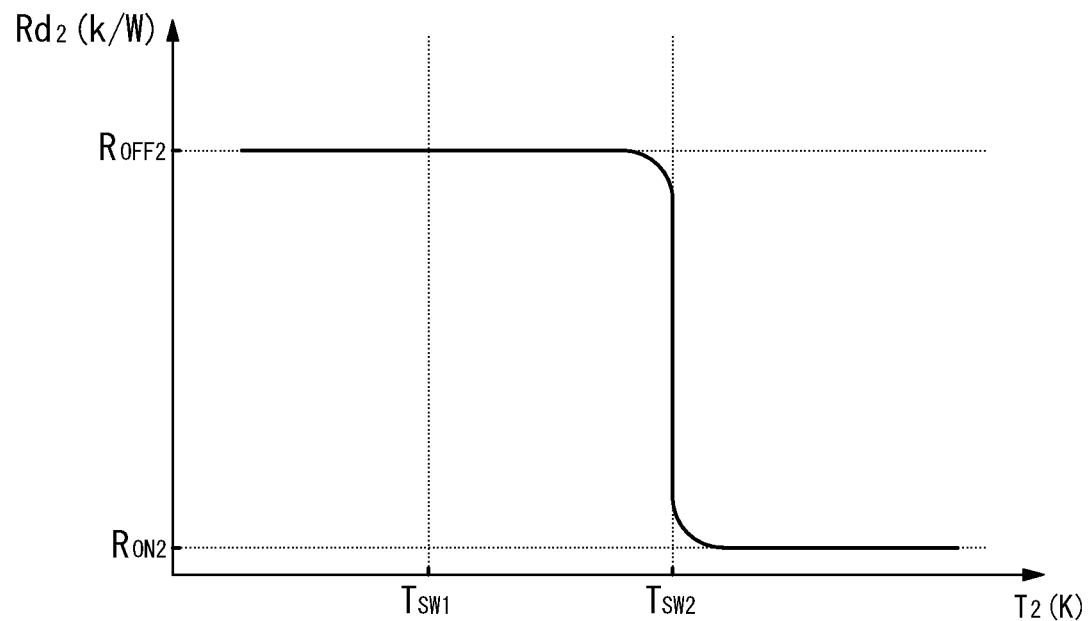
FIG. 7B is a graph schematically showing how the thermal resistance between a second thermally conductive portion and intermediate panel included in the second variation changes with the temperature of the second thermally conductive portion.

In a second variation of the thermal rectification unit 9, the first switching temperature $T_{SW1}$ and the second switching temperature $T_{SW2}$ are set at mutually different temperatures such that the first switching temperature $T_{SW1}$ is lower by a predetermined temperature difference than the second switching temperature $T_{SW2}$ as shown in FIGS. 7A and 7B.

In this second variation, when the temperature $T_1$ of the first thermally conductive portion 61 is lower than the first switching temperature $T_{SW1}$ and the temperature $T_2$ of the second thermally conductive portion 62 is higher than the second switching temperature $T_{SW2}$ (>first switching temperature $T_{SW1}$), the switching mechanism 6 turns into the heat radiation state in which the first thermally conductive portion 61 and the second thermally conductive portion 62 are thermally coupled to each other via the intermediate panel 65. While the switching mechanism 6 is in the heat radiation state, the first panel 1 and the second panel 2 are ready to conduct heat (i.e., radiate heat) between them.

Also, in this second variation, when the respective temperatures $T_1$ and $T_2$ of the first and second thermally conductive portions 61 and 62 both fall within a temperature range that is higher than the first switching temperature $T_{SW1}$ and lower than the second switching temperature $T_{SW2}$, the conduction of heat between the first panel 1 and second panel 2 is cut off, no matter which of the temperatures $T_1$ and $T_2$ of the first and second thermally conductive portions 61 and 62 is higher or lower than the other.

Thus, this second variation reduces the chances of the first panel 1 and the second panel 2 being thermally coupled to each other at an unexpected timing.

(Third Variation)

Figure 8:
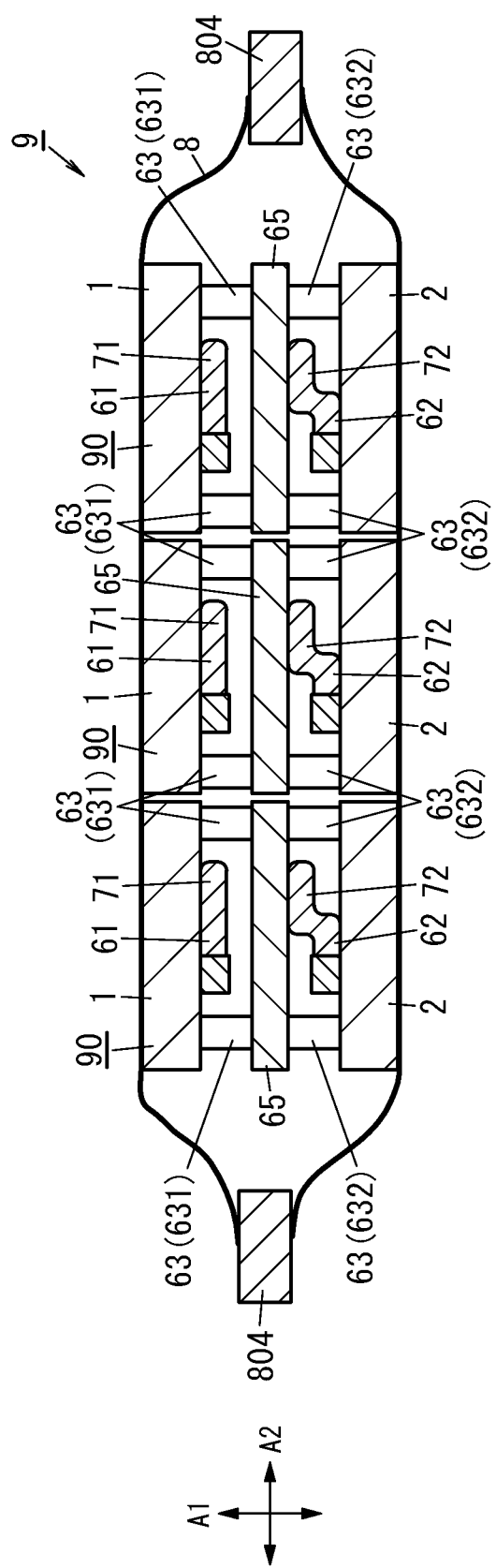
FIG. 8 is a cross-sectional view schematically illustrating a third variation of the thermal rectification unit.

In a third variation of the thermal rectification unit 9, a plurality of thermal rectifiers 90 are housed in a gas barrier film 8 as shown in FIG. 8. The plurality of thermal rectifiers 90 are arranged side by side in the second directions A2.

In this third variation, each thermal rectifier 90 includes neither the first sealant 641 nor the second sealant 642. Instead, the plurality of thermal rectifiers 90 are entirely enclosed hermetically in the gas barrier film 8.

In each of these thermal rectifiers 90, the first thermally conductive portion 61 thereof includes a single bimetal member 71. However, this is only an example and should not be construed as limiting. Alternatively, the first thermally conductive portion 61 may include a plurality of bimetal members 71 as well. Likewise, each second thermally conductive portion 62 thereof includes a single bimetal member 72. However, this is only an example and should not be construed as limiting. Alternatively, the second thermally conductive portion 62 may include a plurality of bimetal members 72 as well. The same statement applies to the other variations as well.

The space inside the gas barrier film 8 may have its pressure reduced to increase the degree of heat insulation or may be filled with a dry gas (which may be a dry rare gas such as argon or krypton gas or dried air, for example).

The gas barrier film 8 may be made of any material selected from the group consisting of metallic, alloy, resin and glass materials, and appropriate combinations thereof. The gas barrier film 8 suitably has high gas barrier properties and low thermal expansion properties.

Examples of low thermal expansion materials for use as a material for the gas barrier film 8 include invar alloys such as Fe—Ni based alloys and Kovar alloys such as Fe—Ni—Co based alloys. The gas barrier film 8 suitably has a thermal expansion coefficient of 5 ppm/° C. or less, more suitably 2 ppm/° C. or less, and even more suitably 0.5 ppm/° C. or less.

Forming the gas barrier film 8 of a material with low thermal expansion properties reduces the warp of the gas barrier film 8 to be caused due to a temperature difference between respective parts of the gas barrier film 8, thus expanding the operating temperature range of the thermal rectification unit 9.

According to the third variation, there is no need to hermetically enclose the thermal rectifiers 90 on a one-by-one basis, but housing the plurality of thermal rectifiers 90 in the gas barrier film 8 and forming a sealant 804 by locally heating an outer peripheral portion of the gas barrier film 8 allows all of the thermal rectifiers 90 to be hermetically enclosed at a time, thus simplifying the manufacturing process.

In the third variation, the sealant 804 is located in the outer peripheral portion of the gas barrier film 8. Thus, folding the outer peripheral portion of the gas barrier film 8 when arranging the plurality of thermal rectification units 9 in the second directions A2 prevents the respective sealants 804 of two adjacent ones of the thermal rectification units 9 from coming into contact with each other. This reduces the conduction of heat between adjacent ones of the thermal rectification units 9.

In the third variation, the plurality of thermal rectifiers 90 are arranged side by side in the gas barrier film 8, and therefore, the entire thermal rectification unit 9 may be bent.

In addition, in the third variation, the plurality of thermal rectifiers 90 are arranged side by side in the gas barrier film 8, thus reducing the chances of each thermal rectifier 90 coming to have an increased size. This also reduces the chances of a system for manufacturing the thermal rectifiers 90 becoming bulky in size.

Furthermore, reducing the size of each thermal rectifier 90 (i.e., reducing the size of the first panel 1 and the second panel 2) also reduces the chances of causing significant misalignment (i.e., misalignment around an axis of rotation extending in the first directions A1) between the first panel 1 and the second panel 2 during the manufacturing process of the thermal rectifiers 90.

Moreover, in the third variation, the plurality of thermal rectifiers 90 that have been manufactured separately are arranged side by side in the gas barrier film 8. Thus, even if one of the plurality of thermal rectifiers 90 turns out to be a defective one, only the defective product needs to be discarded, thus cutting down the loss significantly.

Besides, according to the third variation, changing the combination of the plurality of thermal rectifiers 90 to be housed in the gas barrier film 8 provides various specifications for the thermal rectification unit 9.

(Fourth Variation)

Figure 9:
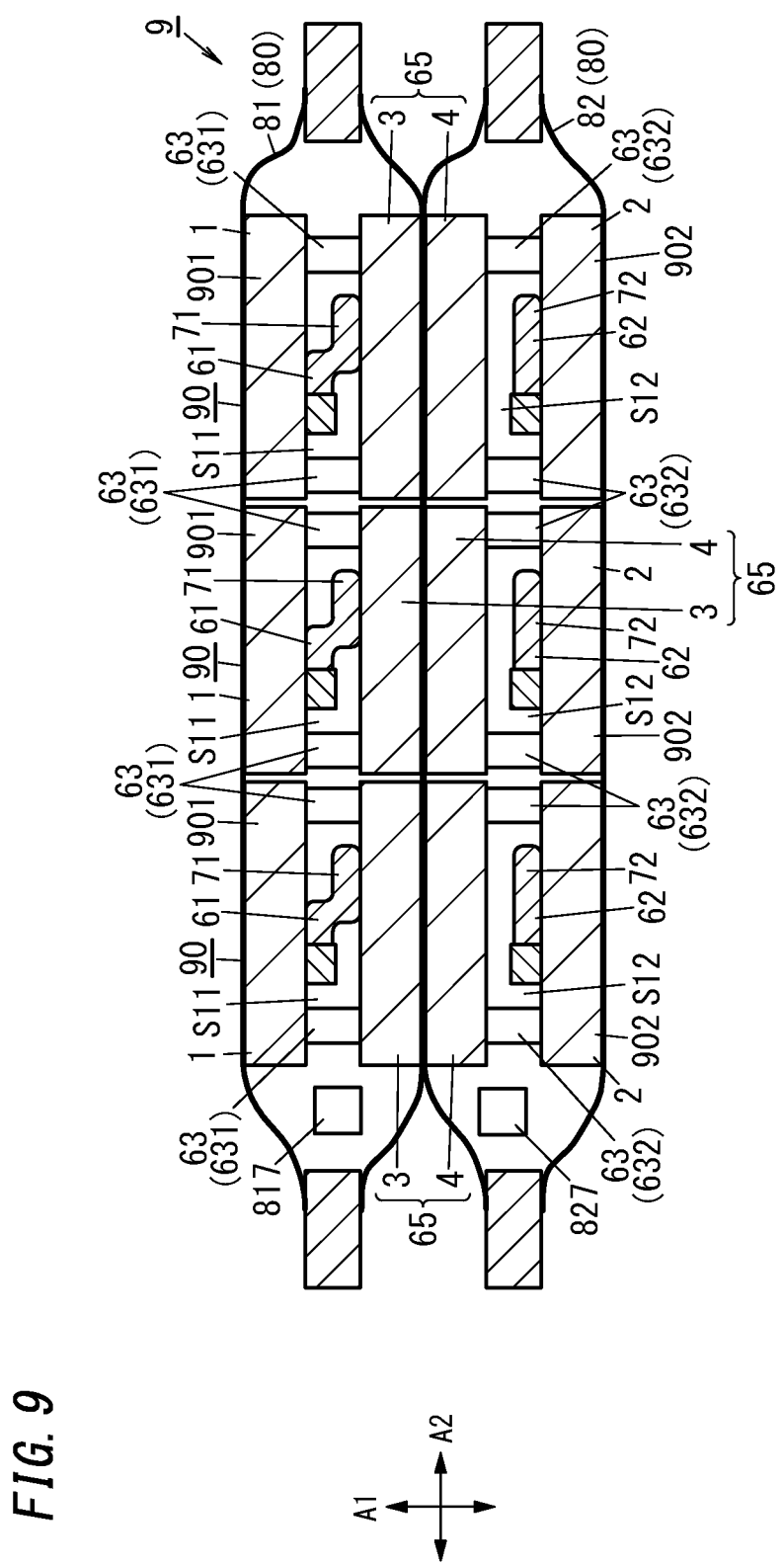
FIG. 9 is a cross-sectional view schematically illustrating a fourth variation of the thermal rectification unit.

In a fourth variation of the thermal rectification unit 9, the intermediate panel 65 of each thermal rectifier 90 includes a third panel 3 and a fourth panel 4, which are thermally coupled together, as shown in FIG. 9.

The third panel 3 is a thermally conductive panel arranged to face the first panel 1. The third panel 3 and the first panel 1 are arranged parallel to each other. A plurality of first spacers 631 are interposed between the third panel 3 and the first panel 1, and a first space S11 is created between the third panel 3 and the first panel 1.

The fourth panel 4 is a thermally conductive panel arranged to face the second panel 2. The fourth panel 4 and the second panel 2 are arranged parallel to each other. A plurality of second spacers 632 are interposed between the fourth panel 4 and the second panel 2, and a second space S12 is created between the fourth panel 4 and the second panel 2.

Each of the thermal rectifiers 90 included in the fourth variation of the thermal rectification unit 9 has a structure in which a first half 901 and a second half 902 are combined together. The first half 901 has a structure in which the first panel 1, the first thermally conductive portion 61, the third panel 3, and the plurality of first spacers 631 are integrated together. The second half 902 has a structure in which the second panel 2, the second thermally conductive portion 62, the fourth panel 4, and the plurality of second spacers 632 are integrated together.

The fourth variation of the thermal rectification unit 9 further includes two gas barrier films 80 with thermal conductivity. These two gas barrier films 80 are a first gas barrier film 81 and a second gas barrier film 82 with thermal conductivity.

In the first gas barrier film 81, the respective first halves 901 of the thermal rectifiers 90 (namely, the first panels 1, the first thermally conductive portions 61, the third panels 3, and the plurality of first spacers 631) and a getter 817 are housed hermetically.

In the second gas barrier film 82, the respective second halves 902 of the thermal rectifiers 90 (namely, the second panels 2, the second thermally conductive portions 62, the fourth panels 4, and the plurality of second spacers 632) and a getter 827 are housed hermetically.

Part of the first gas barrier film 81 and part of the second gas barrier film 82 are in contact with each other, thus thermally connecting the first gas barrier film 81 and second gas barrier film 82 together. The third panel 3 and fourth panel 4 of each thermal rectifier 90 are thermally coupled together via those contact parts of the first and second gas barrier films 81 and 82.

In each thermal rectifier 90, when thermally coupled together, the third panel 3 and the fourth panel 4 are parallel to each other. That is to say, in each thermal rectifier 90, the first panel 1, the second panel 2, the third panel 3, and the fourth panel 4 are parallel to each other.

This fourth variation eliminates the need to provide the first sealant 641 and the second sealant 642 for each thermal rectifier 90, thus simplifying the manufacturing process.

The space inside the first gas barrier film 81 and the space inside the second gas barrier film 82 may have their pressure reduced or may be filled with a dry gas (which may be a dry rare gas such as argon or krypton gas or dried air, for example).

The first and second gas barrier films 81 and 82 may be made of any material selected from the group consisting of metallic, alloy, resin and glass materials, and appropriate combinations thereof. The first and second gas barrier films 81 and 82 suitably have high gas barrier properties and low thermal expansion properties.

Examples of low thermal expansion materials for use as a material for the first and second gas barrier films 81 and 82 include invar alloys such as Fe—Ni based alloys and Kovar alloys such as Fe—Ni—Co based alloys. The first and second gas barrier films 81 and 82 suitably have a thermal expansion coefficient of 5 ppm/° C. or less, more suitably 2 ppm/° C. or less, and even more suitably 0.5 ppm/° C. or less.

This fourth variation allows the thermal rectification unit 9 to be provided with a broad variety of specifications by changing combinations of the properties of the first halves 901 housed in the first gas barrier film 81 and the properties of the second halves 902 housed in the second gas barrier film 82.

(Fifth Variation)

Figure 10:
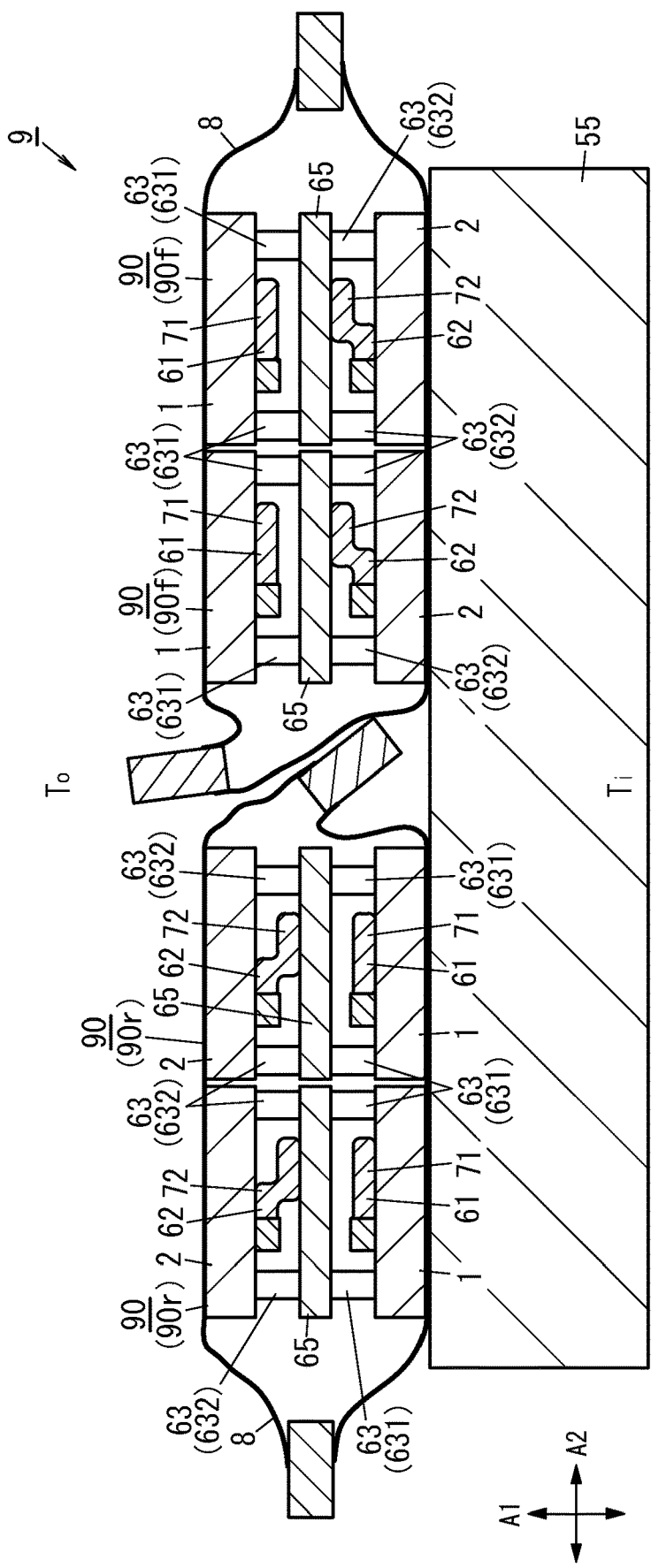
FIG. 10 is a cross-sectional view schematically illustrating a fifth variation of the thermal rectification unit.

A fifth variation of the thermal rectification unit 9 includes a plurality of gas barrier films 8, each of which houses a plurality of thermal rectifiers 90 therein, as shown in FIG. 10.

The fifth variation of the thermal rectification unit 9 includes a plurality of (e.g., two, in this variation) units (each including at least one thermal rectifier 90 housed in the gas barrier film 8) having the same configuration as the counterparts of the third variation of the thermal rectification unit 9. These two units are in contact with an object 55 so as to be arranged upside down with respect to each other. As used herein, "being arranged upside down" refers to an arrangement in which the respective outer surfaces of the second panels 2 face two opposite directions with respect to their first panel 1.

Specifically, in one gas barrier film 8 (the right one in FIG. 10) out of the two gas barrier films 8 that the fifth variation of the thermal rectification unit 9 includes, the first panel 1 of each thermal rectifier 90 thereof is located closer to the outside air (i.e., faces up in FIG. 10) and the second panel 2 thereof is located closer to the object 55 (faces down in FIG. 10). In the other gas barrier film 8 (the left one in FIG. 10) out of the two gas barrier films 8, the second panel 2 of each thermal rectifier 90 thereof is located closer to the outside air and the first panel 1 thereof is located closer to the object 55.

Thus, according to this fifth variation, at least one (e.g., each of the two according to this variation) of the plurality of thermal rectifiers 90 is arranged upside down with respect to the other thermal rectifier(s) 90. That is to say, if the second panel 2 faces one direction with respect to the first panel 1 in the one thermal rectifier 90, then the second panel 2 faces the opposite direction with respect to the first panel 1 in the other thermal rectifier(s) 90.

The plurality of thermal rectifiers 90 are arranged side by side in the second directions A2. According to the fifth variation, heat is conducted between the object 55 and the outside air such that the temperature of the object 55 comes closer to a predetermined temperature.

Specifically, the respective thermal rectifiers 90 housed in the gas barrier film 8 shown on the right-hand side of FIG. 10 (hereinafter referred to as "forward thermal rectifiers 90f") operate to radiate heat from the object 55 toward the outside air if the inequality $T_0 < T_1 < T_{SW1} = T_{SW2} < T_2 < T_i$ is satisfied, where $T_0$ represents the outside air temperature, and $T_i$ represents the temperature of the object 55. As described above, $T_1$ is the temperature of the first thermally conductive portion 61, $T_2$ is the temperature of the second thermally conductive portion 62, $T_{SW1}$ is the first switching temperature, and $T_{SW2}$ is the second switching temperature.

On the other hand, the respective thermal rectifiers 90 housed in the gas barrier film 8 shown on the left-hand side of FIG. 10 (hereinafter referred to as "reverse thermal rectifiers 90r") operate to radiate heat from the outside air toward the object 55 if the inequality $T_0 > T_2 > T_{SW2} = T_{SW1} > T_1 > T_i$ is satisfied.

Therefore, if the outside air temperature $T_0$ repeatedly rises and falls day and night, making the forward and reverse thermal rectifiers 90f, 90r perform their thermal rectification functions allows the temperature $T_i$ of the object 55 to approach the predetermined temperature ($T_{SW2} = T_{SW1}$).

In this fifth variation, the first switching temperature $T_{SW1}$ and the second switching temperature $T_{SW2}$ may be set to satisfy the inequality $T_{SW1} > T_{SW2}$ as in the first variation or to satisfy the inequality $T_{SW1} < T_{SW2}$ as in the second variation. Optionally, the first switching temperature $T_{SW1}$ and the second switching temperature $T_{SW2}$ may change their values from one thermal rectifier 90 to another.

(Sixth Variation)

Figure 11:
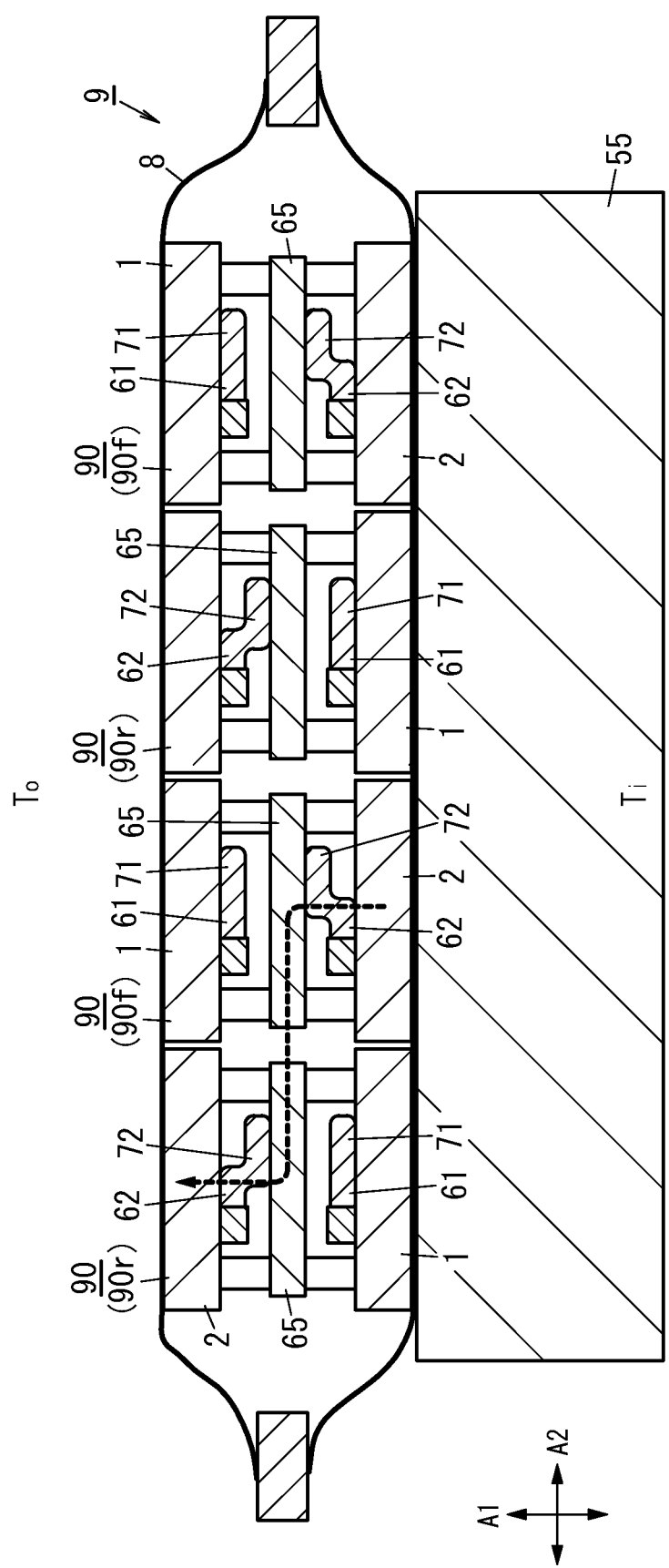
FIG. 11 is a cross-sectional view schematically illustrating a sixth variation of the thermal rectification unit.

In a sixth variation of the thermal rectification unit 9, a plurality of thermal rectifiers 90 are arranged side by side in the second directions A2 in the gas barrier film 8 as shown in FIG. 11.

This sixth variation, as well as the third variation and other variations, allows all of the thermal rectifiers 90 to be hermetically enclosed in the gas barrier film 8 at a time, without hermetically enclosing the thermal rectifiers 90 on a one-by-one basis.

In addition, according to the sixth variation, the forward and reverse thermal rectifiers 90f and 90r, having the same configuration as the counterparts of the fifth variation described above, are arranged side by side in the same gas barrier film 8. Thus, as already described for the fifth variation, switching the heat radiation state to the heat insulation state, or vice versa, in the forward and reverse thermal rectifiers 90f and 90r allows the temperature of the object 55 to approach the predetermined temperature ($T_{SW2} = T_{SW1}$).

Furthermore, according to the sixth variation, when each of the thermal rectifiers 90 (namely, the forward and reverse thermal rectifiers 90f and 90r) is viewed in any of the first directions A1, the profile of the intermediate panel 65 is located inside of the profile of the first and second panels 1 and 2.

Making the profile of the intermediate panel 65 somewhat smaller in size than the profile of the first and second panels 1 and 2 in this manner reduces the chances of the respective intermediate panels 65 of adjacent forward and reverse thermal rectifiers 90f and 90r coming into contact with each other.

If the respective intermediate panels 65 of the forward and reverse thermal rectifiers 90f and 90r are in contact with each other, then the second panel 2 of the forward thermal rectifier 90f could be thermally coupled to the second panel 2 of the reverse thermal rectifier 90r through the path schematically indicated by the dotted arrow in FIG. 11. In addition, the first panel 1 of the forward thermal rectifier 90f could also be thermally coupled to the first panel 1 of the reverse thermal rectifier 90r.

In any of these two cases, heat could be radiated at a timing when heat should be insulated, thus possibly causing some inconvenience.

In contrast, this sixth variation reduces the chances of causing such inconvenience. Increasing the degree of vacuum in the gas barrier film 8 by reducing the pressure allows adjacent intermediate panels 65 to be thermally isolated from each other even if there is only a narrow gap between the adjacent intermediate panels 65.

(Seventh Variation)

In a seventh variation of the thermal rectification unit 9, as can be seen from the principal part schematically illustrated in FIGS. 12A-12D, the switching mechanism 6 interposed between the first panel 1 and the second panel 2 includes the first thermally conductive portion 61, the second thermally conductive portion 62, and the spacer 63, but includes no intermediate panels 65.

The spacer 63 includes a plurality of spacers 63. Each of the plurality of spacers 63 is in contact with respective counter surfaces 11 and 21 of the first and second panels 1 and 2 to keep the gap D between the first and second panels 1 and 2 consistent. The space S1 is created between the first and second panels 1 and 2.

The space S1 may be sealed hermetically with either a member such as the sealant 64 described above or a member such as the gas barrier film 8 described above, whichever is appropriate.

The space S1 suitably has its pressure reduced to the point of satisfying $\lambda/D > 0.3$, where $\lambda 1$ is a mean free path of the air in the space S1. Satisfying this relationship turns the space S1 into a molecular flow region, and makes the thermal conductance of the space S1 independent of the gap distance D. This allows the thermal rectifier 90, enclosing the space S1 with excellent thermal insulation properties, to be formed with a significantly reduced thickness.

Generally speaking, in both of solids and gases, the longer the conduction distance of heat is, the lower the thermal conductance becomes. Therefore, in general, the thinner the thermal rectifier 90 is, the less advantageous it is to increase the degree of heat insulation of the space S1. However, satisfying $\lambda/D > 0.3$ in the space S1 allows the space S1 to have a high degree of heat insulation property while reducing the thickness of the thermal rectifier 90.

The thermal rectifier 90 with such a reduced thickness is able to exhibit a high degree of thermal conductivity due to the reduced thinness when the first panel 1 and the second panel 2 are thermally coupled together via the switching mechanism 6. That is to say, satisfying λ/D>0.3 in the space S1 allows the thermal rectifier 90 to exhibit a high degree of thermal conductivity due to the reduced thickness when the first panel 1 and the second panel 2 are thermally coupled together via the switching mechanism 6. This also allows the thermal rectifier 90 to exhibit an excellent heat insulation property overall due to the heat insulation property of the space S1 when the first panel 1 and the second panel 2 are thermally isolated from each other.

In addition, satisfying λ/D>0.3 in the space S1 turns the space S1 into a molecular flow region, thus making the thermal conductance between the first thermally conductive portion 61 (i.e., respective bimetal members 71) and the second thermally conductive portion 62 (i.e., respective intermediates 72) independent of the gap distance between the first thermally conductive portion 61 and the second thermally conductive portion 62.

That is why this reduces the chances of the thermal conductance between the first thermally conductive portion 61 and the second thermally conductive portion 62, which are out of contact with each other but are located very close to each other, increasing (which would eventually cause a decline in the operating accuracy of the thermal rectifier 90) irrespective of their contactless state.

The space S1 may be filled with a dry gas (which may be a dry rare gas such as argon or krypton gas or dried air, for example), instead of having its pressure reduced.

The first thermally conductive portion 61 is located in the space S1. The first thermally conductive portion 61 may include a plurality of bimetal members 71 which are thermally connected to the first panel 1. Nevertheless, the first thermally conductive portion 61 needs to include at least one bimetal member 71.

A portion (i.e., a fixed end portion) of each bimetal member 71 is fixed onto the counter surface 11 of the first panel 1. Each bimetal member 71 is deformed in the first directions A1 as its own temperature varies.

A free end portion of each bimetal member 71 constitutes a first displaceable portion 615 of the first thermally conductive portion 61. The first displaceable portion 615 is a portion to be displaced in the first directions A1 as the temperature of the first thermally conductive portion 61 varies, thus changing the distance to the first panel 1 (i.e., the distance to the second panel 2). The first thermally conductive portion 61 is configured such that as its temperature $T_1$ rises, the first displaceable portion 615 comes closer to the first panel 1 (i.e., goes away from the second panel 2).

The second thermally conductive portion 62 is located in the space S1. In the first directions A1, the second thermally conductive portion 62 is arranged to face the first thermally conductive portion 61. The second thermally conductive portion 62 may include a plurality of bimetal members 72 which are thermally connected to the second panel 2. Nevertheless, the second thermally conductive portion 62 needs to include at least one bimetal member 72.

A portion (i.e., a fixed end portion) of each bimetal member 72 is fixed onto the counter surface 21 of the second panel 2. Each bimetal member 72 is deformed in the first directions A1 as its own temperature varies.

A free end portion of each bimetal member 72 constitutes a second displaceable portion 625 of the second thermally conductive portion 62. The second displaceable portion 625 is a portion to be displaced in the first directions A1 as the temperature of the second thermally conductive portion 62 varies, thus changing the distance to the first panel 1 (i.e., the distance to the second panel 2). The second thermally conductive portion 62 is configured such that as its temperature $T_2$ rises, the second thermally conductive portion 62 comes closer to the first panel 1 (i.e., goes away from the second panel 2).

As the temperature of the first thermally conductive portion 61 and the second thermally conductive portion 62 rises, the first displaceable portion 615 and the second displaceable portion 625 are displaced toward the same end (i.e., toward the first panel 1) in one of the first directions A1.

The gap distance between the first displaceable portion 615 and the second displaceable portion 625 varies depending on a temperature difference ΔT between the first thermally conductive portion 61 and the second thermally conductive portion 62. That is to say, the temperature difference ΔT triggers a switch (transition) from the state where the first displaceable portion 615 and the second displaceable portion 625 are in contact with each other (i.e., the heat radiation state) to the state where the first displaceable portion 615 and the second displaceable portion 625 are out of contact with each other (i.e., the heat insulation state), or vice versa.

Figure 12B:
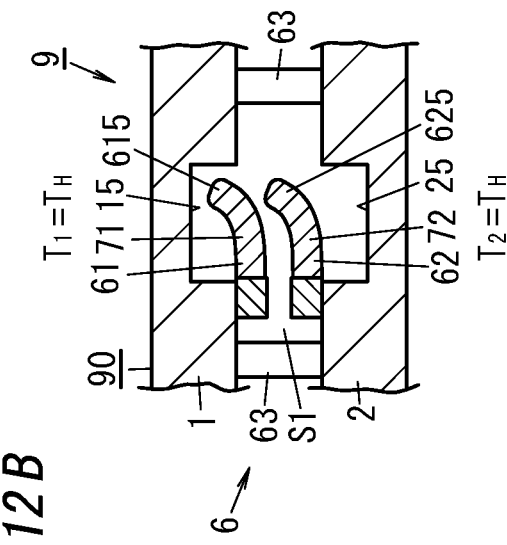
FIGS. 12A-12D are cross-sectional views of a principal part schematically illustrating changes depending on the temperature variation of a switching mechanism included in a seventh variation of the thermal rectification unit.
Figure 12D:
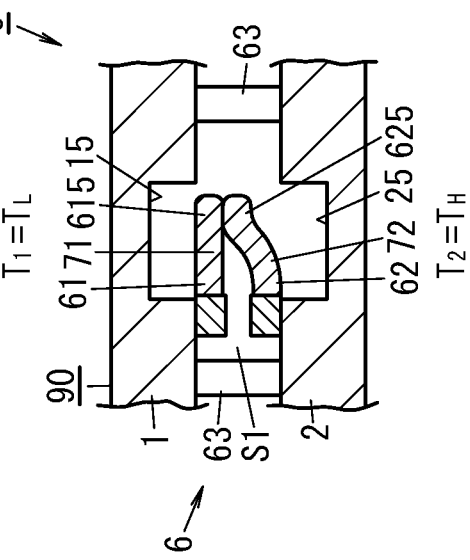
Figure 12A:
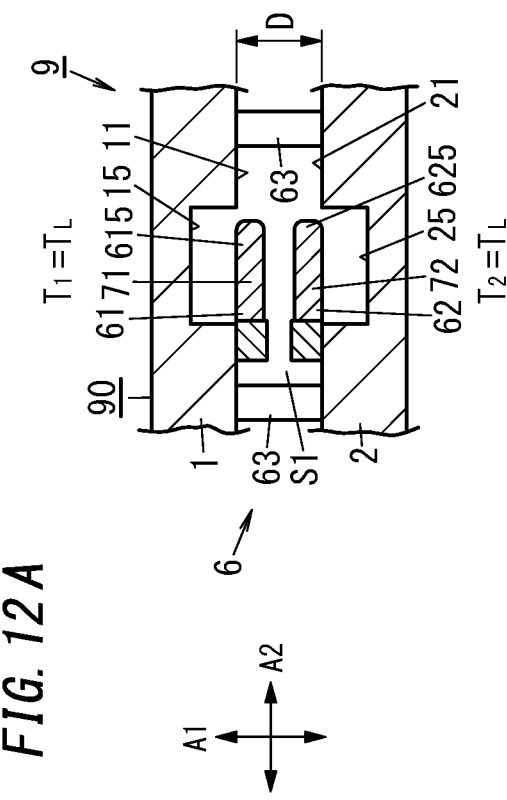

The state shown in FIG. 12A is a state where the temperature $T_1$ of the first thermally conductive portion 61 and the temperature $T_2$ of the second thermally conductive portion 62 are both a low temperature $T_L$. In this state, the first thermally conductive portion 61 and the second thermally conductive portion 62 both maintain a flat shape, and are parallel to each other. The gap distance between the first displaceable portion 615 and the second displaceable portion 625 is long enough to ensure heat insulation.

The state shown in FIG. 12B is a state where the temperature $T_1$ of the first thermally conductive portion 61 and the temperature $T_2$ of the second thermally conductive portion 62 are both a high temperature $T_H$ (>low temperature $T_L$). In this state, the first thermally conductive portion 61 is curved overall such that the first displaceable portion 615 comes closer toward the first panel 1 than when the temperatures $T_1$ and $T_2$ are the low temperature $T_L$. The second thermally conductive portion 62 is also curved overall such that the second displaceable portion 625 comes closer toward the first panel 1 than when the temperatures $T_1$ and $T_2$ are the low temperature $T_L$. The gap distance between the first displaceable portion 615 and the second displaceable portion 625 remains substantially the same as in the state shown in FIG. 12A and is still long enough to ensure heat insulation.

Figure 12C:
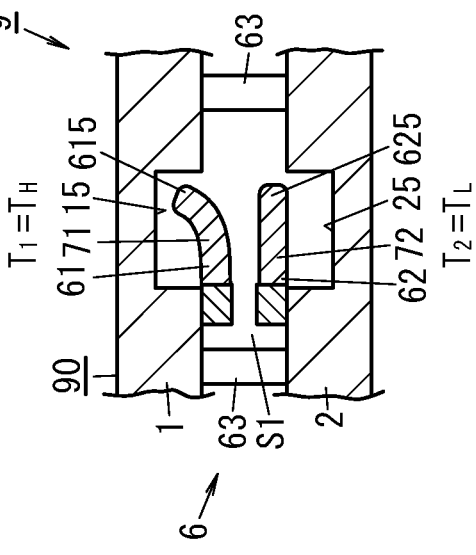
Figure 15:
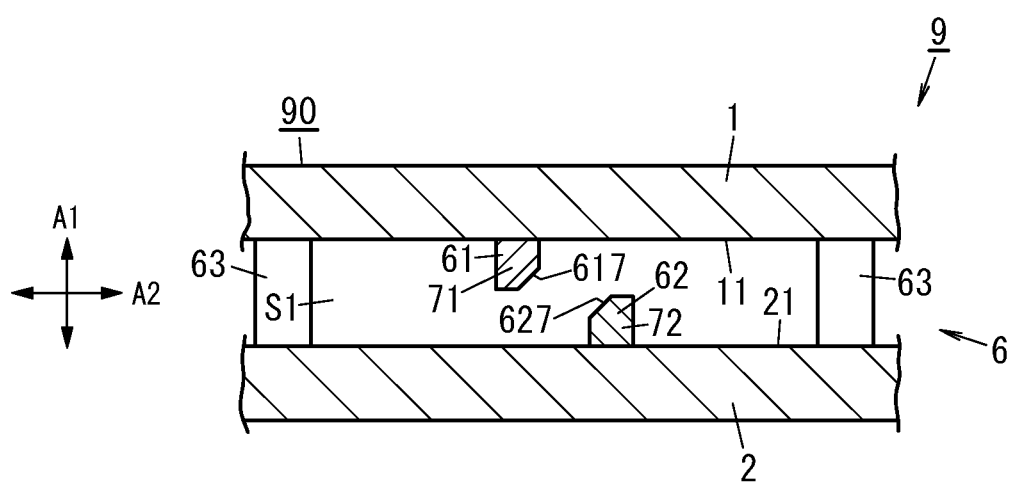
FIG. 15 is a cross-sectional view of a principal part schematically illustrating a tenth variation of the thermal rectification unit.

In the state shown in FIG. 12C, the temperature $T_1$ of the first thermally conductive portion 61 is a high temperature $T_H$ and the temperature $T_2$ of the second thermally conductive portion 62 is the low temperature $T_L$. In this state, the first displaceable portion 615 of the first thermally conductive portion 61 is curved toward the first panel 1, while the second thermally conductive portion 62 remains flat. The gap distance between the first displaceable portion 615 and the second displaceable portion 625 is longer than in the state shown in FIG. 12A. The increased gap distance is also long enough to ensure heat insulation.

In the state shown in FIG. 12D, the temperature $T_1$ of the first thermally conductive portion 61 is the low temperature $T_L$ and the temperature $T_2$ of the second thermally conductive portion 62 is the high temperature $T_H$. In this state, the first thermally conductive portion 61 remains flat, while the second displaceable portion 625 of the second thermally conductive portion 62 is curved toward the first panel 1. The gap distance between the first displaceable portion 615 and the second displaceable portion 625 is zero. Since the first displaceable portion 615 and the second displaceable portion 625 are in contact with each other, the switching mechanism 6 is in the heat radiation state in which the first thermally conductive portion 61 and the second thermally conductive portion 62 are thermally connected to each other.

In the seventh variation, the temperature difference between the first panel 1 and the second panel 2 determines the temperature difference ΔT between the first thermally conductive portion 61 and the second thermally conductive portion 62, on which the thermal conductivity between the first panel 1 and the second panel 2 switches as described above.

According to the seventh variation, only when the second panel 2 has a higher temperature than the first panel 1 and the temperature difference is greater than a predetermined value, heat flows from the second panel 2 toward the first panel 1.

The temperature difference $\Delta T$ ($=T_2-T_1$) that triggers the switch from the heat radiation state to the heat insulation state, or vice versa, is adjustable by selecting an appropriate configuration for the first thermally conductive portion 61 (including the arrangement, shape, dimensions, and material of the respective bimetal members 71) and an appropriate configuration for the second thermally conductive portion 62 (including the arrangement, shape, dimensions, and material of the respective bimetal members 72).

If the condition for causing the switching mechanism 6 to enter the heat radiation state is that the temperature difference ΔT between the first thermally conductive portion 61 and the second thermally conductive portion 62 should be greater than a constant value C (i.e., ΔT>C should be satisfied), then the constant value C is adjustable appropriately. For example, the constant value C may be adjusted by changing the gap distance between the bimetal member 71 and the bimetal member 72 that could come into contact with the bimetal member 71. In this variation, the constant value C is a positive value. However, this is only an example and should not be construed as limiting. Alternatively, the constant value C may also be a negative value.

Optionally, a plurality of thermal rectifiers 90, of which the temperature differences ΔT triggering the switch from the heat radiation state to the heat insulation state, or vice versa, are different from each other, may be provided and thermally connected together in series so as to be arranged in the first directions A1. Alternatively, the thermal rectifiers 90 may also be thermally connected together in parallel so as to be arranged in the second directions A2. This realizes a variety of heat control by changing the combination of series-parallel connections of the thermal rectifiers 90 in various manners.

For example, if the first panel 1 and second panel 2 are made of aluminum, the spacers 63 are made of a resin, and a bimetal as a material for the bimetal members 71 and the bimetal members 72 is a bimetal in which an aluminum thin plate and an Fe—Ni alloy thin plate are joined together, then the thermal conductivity between the first panel 1 and the second panel 2 varies significantly.

For example, the thermal conductivity between the first panel 1 and the second panel 2 is as small as 0.006 W/mK in the heat insulation state but is as large as 196 W/mK in the heat radiation state. In this example, the first panel 1 and second panel 2 have a thickness of 3 mm, the columnar spacers 63 have a diameter of 0.6 mm and an axial height of 0.2 mm and are arranged at a pitch of 20 mm, the aluminum thin plate included in the bimetal has a thickness of 0.05 mm, the Fe—Ni alloy thin plate included in the bimetal has a thickness of 0.05 mm, the bimetal has a length of 0.8 mm, the bimetal members 71 are arranged at a pitch of 1 mm, the bimetal members 72 are arranged at a pitch of 1 mm, and the space S1 has a degree of vacuum of 0.001 Pa.

As can be seen, if the first panel 1 and second panel 2 are made of an electrically conductive material and the spacers 63 are made of an electrically insulating material, the thermal conductivity between the first panel 1 and the second panel 2 varies significantly depending on whether the thermal rectifier 90 is in the heat insulation state or the heat radiation state.

The configuration of the first thermally conductive portion 61 (i.e., the configuration of the respective bimetal members 71) and the configuration of the second thermally conductive portion 62 (i.e., the configuration of the respective bimetal members 72) may be the same or different from each other. The bimetal members 71 may have a different coefficient of curvature from the bimetal members 72. For example, the temperature difference ΔT triggering a switch between the heat radiation state and the heat insulation state is adjustable by selecting appropriate coefficients of curvature for the bimetal members 71 and the bimetal members 72 and an appropriate gap distance in the first directions A1 between the bimetal members 71 and the bimetal members 72.

In this seventh variation, the counter surface 11 of the first panel 1 has a recess 15 to avoid contact with the first displaceable portion 615 of the first thermally conductive portion 61. The counter surface 21 of the second panel 2 has a recess 25 to avoid contact with the second displaceable portion 625 of the second thermally conductive portion 62.

However, these recesses 15 and 25 are not essential. Alternatively, the first panel 1 may have the recess 15 but the second panel 2 may have no recesses 25. Still alternatively, the first panel 1 may have no recesses 15 but the second panel 2 may have the recess 25.

(Eighth Variation)

An eighth variation of the thermal rectification unit 9 has the same basic configuration as the seventh variation described above. In the eighth variation of the thermal rectification unit 9, the first panel 1 and the second panel 2 each include a protrusion 17, 27, which is a major difference from the seventh variation. In the following description, any constituent element of this eighth variation of thermal rectification unit 9, having the same function as a counterpart of the seventh variation described above, will not be described all over again.

As shown in FIGS. 13A-13D schematically illustrating a principal part thereof, the counter surface 11 of the first panel 1 has a protrusion 17, which is raised from the surrounding portion to form a step. A part (i.e., a fixed end) of the first thermally conductive portion 61 is fixed to the protrusion 17. A gap is left between the rest of the counter surface 11, other than the protrusion 17, and the first thermally conductive portion 61 to prevent the first displaceable portion 615 of the first thermally conductive portion 61 from coming into contact with the counter surface 11.

Likewise, the counter surface 21 of the second panel 2 also has a protrusion 27, which is raised from the surrounding portion to form a step. A part (i.e., a fixed end) of the second thermally conductive portion 62 is fixed to the protrusion 27. A gap is left between the rest of the counter surface 21, other than the protrusion 27, and the second thermally conductive portion 62 to prevent the second displaceable portion 625 of the second thermally conductive portion 62 from coming into contact with the counter surface 21.

In other words, in the eighth variation, the recess 15 provided to avoid contact with the first displaceable portion 615 of the first thermally conductive portion 61 is provided for the rest of the counter surface 11 other than the protrusion 17. Likewise, the recess 25 provided to avoid contact with the second displaceable portion 625 of the second thermally conductive portion 62 is provided for the rest of the counter surface 21 other than the protrusion 27.

However, these protrusions 17 and 27 are not essential. Alternatively, the first panel 1 may have the protrusion 17 but the second panel 2 may have no protrusions 27. Still alternatively, the first panel 1 may have no protrusions 17 but the second panel 2 may have the protrusion 27.

(Ninth Variation)

A ninth variation of the thermal rectification unit 9 has the same basic configuration as the seventh and eighth variations described above. In the following description, any constituent element of this ninth variation, having the same function as a counterpart of the seventh and eighth variations described above, will not be described all over again.

In the ninth variation of the thermal rectification unit 9, the first panel 1 and second panel 2 do not have any recesses such as the recesses 15 and 25 of the seventh variation and have no protrusions such as the protrusions 17 and 27 of the eighth variation.

As shown in FIGS. 14A-14D schematically illustrating a principal part thereof, the counter surface 11 of the first panel 1 is flat in its entirety. A part (i.e., a fixed end) of the first thermally conductive portion 61 is fixed to a local area of the counter surface 11. Likewise, the counter surface 21 of the second panel 2 is flat in its entirety. A part (i.e., a fixed end) of the second thermally conductive portion 62 is fixed to a local area of the counter surface 21.

The first thermally conductive portion 61 and the second thermally conductive portion 62 do not maintain the flat shape at the low temperature $T_L$ as in the seventh and eighth variations but maintain a curved shape at the low temperature $T_L$.

As shown in FIG. 14A, when the temperature $T_1$ of the first thermally conductive portion 61 is the low temperature $T_L$, the first displaceable portion 615 has an arced curved shape to keep distance from the first panel 1. On the other hand, when the temperature $T_2$ of the second thermally conductive portion 62 is the low temperature $T_L$, the second displaceable portion 625 has an arced curved shape to keep distance from the second panel 2.

The first thermally conductive portion 61 and the second thermally conductive portion 62 are both curved in the first directions A1 so as to come closer toward each other. However, the gap distance between the first displaceable portion 615 of the first thermally conductive portion 61 and the first panel 1 and the gap distance between the second displaceable portion 625 of the second thermally conductive portion 62 and the second panel 2 are different from each other.

In the ninth variation, settings are made such that when the temperature $T_1$ of the first thermally conductive portion 61 and the temperature $T_2$ of the second thermally conductive portion 62 are both the low temperature $T_L$, the gap distance between the first displaceable portion 615 and the first panel 1 is greater than the gap distance between the second displaceable portion 625 and the second panel 2. In this case, the gap distance between the first displaceable portion 615 and the second displaceable portion 625 is long enough to ensure heat insulation.

As shown in FIG. 14B, when the temperature $T_1$ of the first thermally conductive portion 61 and the temperature $T_2$ of the second thermally conductive portion 62 are both the high temperature $T_H$, both of the first displaceable portion 615 and the second displaceable portion 625 come closer to the first panel 1 than when the temperatures $T_1$ and $T_2$ are the low temperature $T_L$.

At this time, the gap distance between the first displaceable portion 615 and the second displaceable portion 625 is substantially the same as in the state shown in FIG. 14A and long enough to ensure heat insulation. The first displaceable portion 615, the second displaceable portion 625, and the first panel 1 are kept out of contact with each other.

As shown in FIG. 14C, when the temperature $T_1$ of the first thermally conductive portion 61 is the high temperature $T_H$ and the temperature $T_2$ of the second thermally conductive portion 62 is the low temperature $T_L$, the gap distance between the first displaceable portion 615 and the second displaceable portion 625 increases compared to the state shown in FIG. 14A to maintain the heat insulation state. Although the first displaceable portion 615 comes closer to the first panel 1, the first displaceable portion 615 is still out of contact with the first panel 1 as in the state shown in FIG. 14B.

As shown in FIG. 14D, when the temperature $T_1$ of the first thermally conductive portion 61 is the low temperature $T_L$ and the temperature $T_2$ of the second thermally conductive portion 62 is the high temperature $T_H$, the second displaceable portion 625 comes closer toward the first panel 1 than in the state shown in FIG. 14A, and the gap distance between the first displaceable portion 615 and the second displaceable portion 625 goes zero. Bringing the first displaceable portion 615 and the second displaceable portion 625 into contact with each other turns the switching mechanism 6 into the heat radiation state in which the first thermally conductive portion 61 and the second thermally conductive portion 62 are thermally connected to each other.

(Tenth Variation)

A tenth variation of the thermal rectification unit 9 has the same basic configuration as the seventh and eighth variations described above. In the following description, any constituent element of this tenth variation, having the same function as a counterpart of the seventh and eighth variations described above, will not be described all over again.

In the tenth variation of the thermal rectification unit 9, at least one bimetal member 71 included in the first thermally conductive portion 61 and at least one bimetal member 72 included in the second thermally conductive portion 62 are configured to be deformed in the second directions A2 as their own temperature varies. As shown in FIG. 15 and FIGS. 16A-16D, the bimetal member 71 and its corresponding bimetal member 72 are arranged to be spaced from each other in the second directions A2.

A part (i.e., a fixed end) of each bimetal member 71 is fixed to the counter surface 11 of the first panel 1. A free end of each bimetal member 71 constitutes the first displaceable portion 615 of the first thermally conductive portion 61. The first displaceable portion 615 is a portion to be deformed in the second directions A2 as the temperature of the first thermally conductive portion 61 varies.

A part (i.e., a fixed end) of each bimetal member 72 is fixed to the counter surface 21 of the second panel 2. A free end of each bimetal member 72 constitutes the second displaceable portion 625 of the second thermally conductive portion 62. The second displaceable portion 625 is a portion to be deformed in the second directions A2 as the temperature of the second thermally conductive portion 62 varies.

As the temperature of the first thermally conductive portion 61 and the second thermally conductive portion 62 rises, the first displaceable portion 615 and the second displaceable portion 625 are displaced in one of the second directions A2 toward the same end.

The gap distance between the first displaceable portion 615 and the second displaceable portion 625 varies depending on a temperature difference ΔT between the first thermally conductive portion 61 and the second thermally conductive portion 62. That is to say, the temperature difference ΔT triggers a switch (transition) from the state where the first displaceable portion 615 and the second displaceable portion 625 are in contact with each other (i.e., the heat radiation state) to the state where the first displaceable portion 615 and the second displaceable portion 625 are out of contact with each other (i.e., the heat insulation state), or vice versa.

Figure 16A:
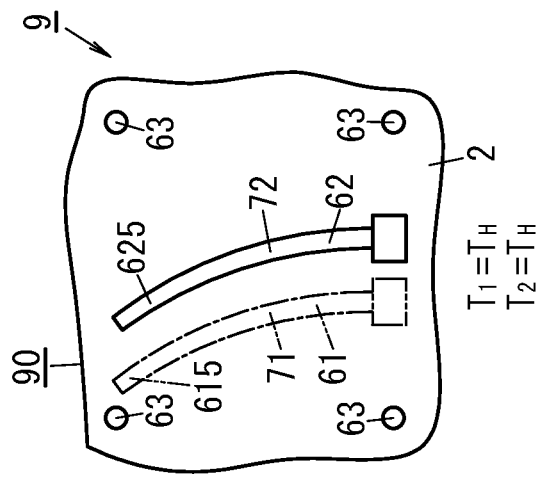
FIGS. 16A-16D are plan views of a principal part schematically illustrating changes depending on the temperature of a switching mechanism included in the tenth variation of the thermal rectification unit.

The state shown in FIG. 16A is a state where the temperature $T_1$ of the first thermally conductive portion 61 and the temperature $T_2$ of the second thermally conductive portion 62 are both the low temperature $T_L$. At this time, the first thermally conductive portion 61 and the second thermally conductive portion 62 are both straight and are parallel to each other. The gap distance between the first displaceable portion 615 and the second displaceable portion 625 is long enough to ensure heat insulation.

Figure 16B:
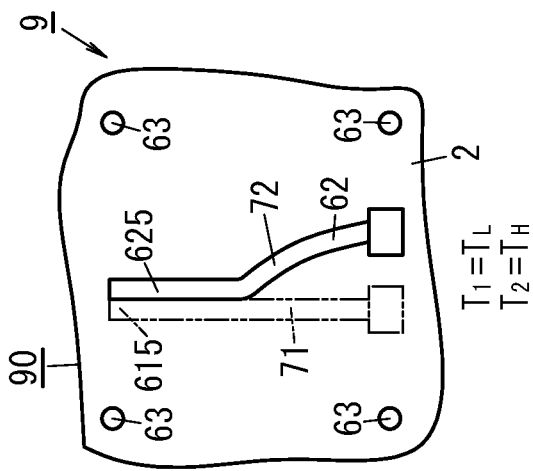

The state shown in FIG. 16B is a state where the temperature $T_1$ of the first thermally conductive portion 61 and the temperature $T_2$ of the second thermally conductive portion 62 are both the high temperature $T_H$ (>low temperature $T_L$). At this time, the first thermally conductive portion 61 and the second thermally conductive portion 62 are both curved toward the same end in one of the second directions A2, and the first displaceable portion 615 and the second displaceable portion 625 are displaced toward the same end in one of the second directions A2. The gap distance between the first displaceable portion 615 and the second displaceable portion 625 remains substantially as long as in the state shown in FIG. 12A, and is still long enough to ensure heat insulation.

Figure 16C:
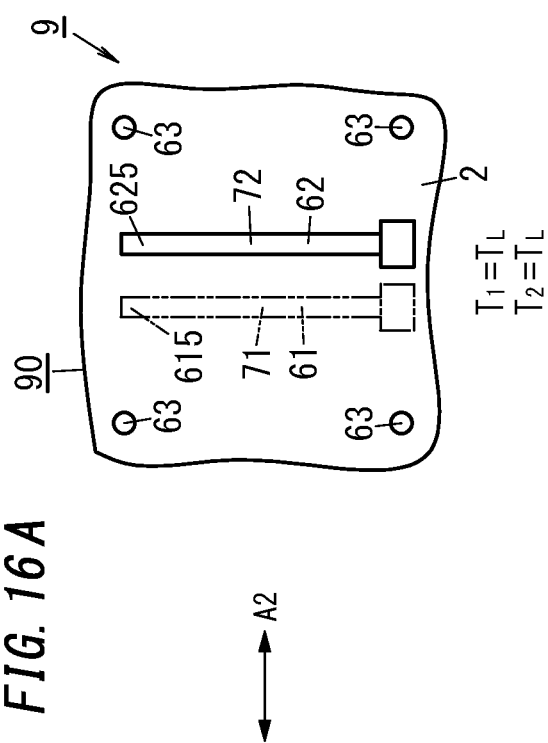

The state shown in FIG. 16C is a state where the temperature $T_1$ of the first thermally conductive portion 61 is the high temperature $T_H$ and the temperature $T_2$ of the second thermally conductive portion 62 is the low temperature $T_L$. At this time, the first thermally conductive portion 61 is curved such that the first displaceable portion 615 thereof goes away from the second thermally conductive portion 62, while the second thermally conductive portion 62 remains straight. The gap distance between the first displaceable portion 615 and the second displaceable portion 625 increases compared to the state shown in FIG. 16A. The increased gap distance is long enough to ensure heat insulation.

Figure 16D:
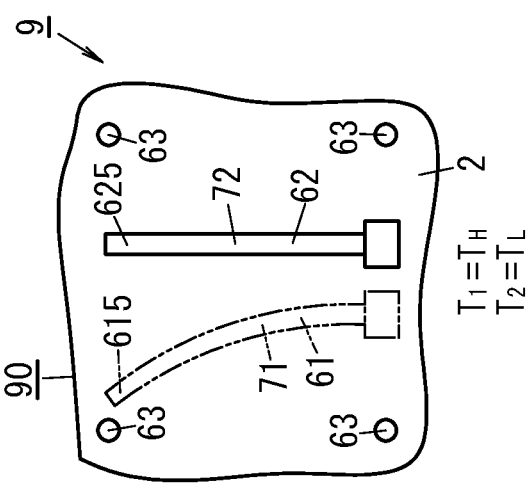

The state shown in FIG. 16D is a state where the temperature $T_1$ of the first thermally conductive portion 61 is the low temperature $T_L$ and the temperature $T_2$ of the second thermally conductive portion 62 is the high temperature $T_H$. At this time, the first thermally conductive portion 61 remains straight, while the second thermally conductive portion 62 is curved toward the first thermally conductive portion 61. The gap distance between the first displaceable portion 615 and the second displaceable portion 625 is zero. Bringing the first displaceable portion 615 and the second displaceable portion 625 into contact with each other turns the switching mechanism 6 into the heat radiation state in which the first thermally conductive portion 61 and the second thermally conductive portion 62 are thermally connected to each other.

In the tenth variation, the temperature difference between the first panel 1 and the second panel 2 determines the temperature difference ΔT between the first thermally conductive portion 61 and the second thermally conductive portion 62, on which the thermal conductivity between the first panel 1 and the second panel 2 switches as described above.

According to the tenth variation, only when the second panel 2 has a higher temperature than the first panel 1 and the temperature difference is greater than a predetermined value, heat flows from the second panel 2 toward the first panel 1.

The temperature difference ΔT that triggers a switch from the heat radiation state to the heat insulation state, or vice versa, is adjustable by selecting an appropriate coefficient of curvature for the bimetal members 71 and 72 and an appropriate gap distance in the second directions A2 between the bimetal members 71 and 72. Optionally, the bimetal members 71 and 72 may be made of the same material and may have the same structure.

In the tenth variation, a portion, coming into contact with the second thermally conductive portion 62, of the external surface of the first thermally conductive portion 61 (i.e., each bimetal member 71) has a sloped surface 617. Likewise, a portion, coming into contact with the first thermally conductive portion 61, of the external surface of the second thermally conductive portion 62 (i.e., each bimetal member 72) has a sloped surface 627. When first thermally conductive portion 61 and the second thermally conductive portion 62 come into contact with each other, these sloped surfaces 617 and 627 come into contact with each other while being parallel to each other. This brings the first thermally conductive portion 61 and the second thermally conductive portion 62 into contact with each other in a broad area.

In the tenth variation, the first thermally conductive portion 61 and the second thermally conductive portion 62 are deformed in the second directions A2 to displace the first displaceable portion 615 and the second displaceable portion 625 in the second directions A2. Thus, there is no need to provide any recesses such as the recess 15 of the seventh and eighth variations for the counter surface 11 of the first panel 1 or provide any recesses such as the recess 25 of the seventh and eighth variations for the counter surface 21 of the second panel 2. According to the tenth variation, it is relatively easy to set the gap distance between the first panel 1 and the second panel 2 at a relatively small value.

This tenth variation is configured to bring the first thermally conductive portion 61 and the second thermally conductive portion 62 into direct contact with each other in the heat radiation state. Optionally, a thermally conductive intermediate panel such as the intermediate panel 65 described above may be provided between the first panel 1 and the second panel 2.

In that case, bringing both of the first thermally conductive portion 61 and the second thermally conductive portion 62 into contact with the intermediate panel 65 turns the switching mechanism 6 into the heat radiation state, and bringing at least one of the first thermally conductive portion 61 or the second thermally conductive portion 62 out of contact with the intermediate panel 65 turns the switching mechanism 6 into the heat insulation state.

(Eleventh Variation)

FIGS. 17A-17D schematically illustrate a principal part of an eleventh variation of the thermal rectification unit 9.

In the eleventh variation of the thermal rectification unit 9, the first thermally conductive portion 61 and the second thermally conductive portion 62 have the property of changing their dimension in the first directions A1 as their temperature varies (i.e., have thermal expansion properties).

In the eleventh variation, the first thermally conductive portion 61 and the second thermally conductive portion 62 are made of a thermal expansion material.

Specifically, the first thermally conductive portion 61 includes a thermal expansion member 73 made of a negative thermal expansion material, and the second thermally conductive portion 62 includes a thermal expansion member 74 made of a positive thermal expansion material.

In FIGS. 17A-17D, the thermal rectification unit 9 (thermal rectifier 90) is illustrated as including only one thermal expansion member 73. However, this is only an example and should not be construed as limiting. Alternatively, the first thermally conductive portion 61 may include a plurality of thermal expansion members 73. Likewise, in FIGS. 17A-17D, the thermal rectification unit 9 is illustrated as including only one thermal expansion member 74. However, this is only an example and should not be construed as limiting. Alternatively, the second thermally conductive portion 62 may include a plurality of thermal expansion members 74. The same statement applies to the other variations to be described later.

The first thermally conductive portion 61 with negative thermal expansion properties (i.e., each thermal expansion member 73) is located in a first space S11 and has a part (i.e., a fixed end) thereof fixed to the counter surface 11 of the first panel 1.

In the eleventh variation, the other end, located opposite from the fixed end, of the first thermally conductive portion 61 constitutes the first displaceable portion 615. The first displaceable portion 615 is a portion to be displaced in the first directions A1 as the temperature of the first thermally conductive portion 61 varies.

The first thermally conductive portion 61 is configured to, as its own temperature rises, switch from the state where the first displaceable portion 615 is in contact with (i.e., thermally connected to) the intermediate panel 65 to the state where the first displaceable portion 615 is out of contact with (i.e., thermally isolated from) the intermediate panel 65.

The other end, located opposite from the fixed end, of the second thermally conductive portion 62 (i.e., each thermal expansion member 74) constitutes the second displaceable portion 625. The second displaceable portion 625 is a portion to be displaced in the first directions A1 as the temperature of the second thermally conductive portion 62 varies.

The second thermally conductive portion 62 is configured to, as its own temperature rises, switch from the state where the second displaceable portion 625 is out of contact with (i.e., thermally isolated from) the intermediate panel 65 to the state where the second displaceable portion 625 is in contact with (i.e., thermally connected to) the intermediate panel 65.

In the state shown in FIG. 17A, the temperature $T_1$ of the first thermally conductive portion 61 and the temperature $T_2$ of the second thermally conductive portion 62 are both the low temperature $T_L$. At this time, the first displaceable portion 615, which is the tip in one of the first directions A1 of the first thermally conductive portion 61, comes into contact with the intermediate panel 65, while the second displaceable portion 625, which is the tip in one of the first directions A1 of the second thermally conductive portion 62, comes out of contact with the intermediate panel 65. This turns the switching mechanism 6 into the heat insulation state in which the first thermally conductive portion 61 and the second thermally conductive portion 62 are thermally isolated from each other.

In the state shown in FIG. 17B, the temperature $T_1$ of the first thermally conductive portion 61 and the temperature $T_2$ of the second thermally conductive portion 62 are both the high temperature $T_H$ ($>T_L$). At this time, the first thermally conductive portion 61 shrinks in the first directions A1 compared to when the first thermally conductive portion 61 has the low temperature $T_L$, which brings the first displaceable portion 615 out of contact with the intermediate panel 65. Meanwhile, the second thermally conductive portion 62 expands in the first directions A1 compared to when the second thermally conductive portion 62 has the low temperature $T_L$, which brings the second displaceable portion 625 into contact with the intermediate panel 65. Thus, the switching mechanism 6 maintains the heat insulation state in which the first thermally conductive portion 61 and the second thermally conductive portion 62 are thermally isolated from each other.

In the state shown in FIG. 17C, the temperature $T_1$ of the first thermally conductive portion 61 is the high temperature $T_H$ and the temperature $T_2$ of the second thermally conductive portion 62 is the low temperature $T_L$. At this time, the first displaceable portion 615 and the second displaceable portion 625 are both out of contact with the intermediate panel 65. Thus, the switching mechanism 6 maintains the heat insulation state in which the first thermally conductive portion 61 and the second thermally conductive portion 62 are thermally isolated from each other.

In the state shown in FIG. 17D, the temperature $T_1$ of the first thermally conductive portion 61 is the low temperature $T_L$ and the temperature $T_2$ of the second thermally conductive portion 62 is the high temperature $T_H$. At this time, the first displaceable portion 615 and the second displaceable portion 625 both come into contact with the intermediate panel 65. Thus, the switching mechanism 6 switches to the heat radiation state in which the first thermally conductive portion 61 and the second thermally conductive portion 62 are thermally coupled together.

According to the eleventh variation, the temperature of the first thermally conductive portion 61 when the state of the first thermally conductive portion 61 and the intermediate panel 65 switches from the thermally connected state to the thermally isolated state, or vice versa (i.e., the first switching temperature $T_{SW1}$) and the temperature of the second thermally conductive portion 62 when the state of the second thermally conductive portion 62 and the intermediate panel 65 switches from the thermally connected state to the thermally isolated state, or vice versa (i.e., the second switching temperature $T_{SW2}$) may be set freely by selecting an appropriate thermal expansion coefficient, shape, dimensions, and arrangement for the first thermally conductive portion 61 and the second thermally conductive portion 62. The first switching temperature $T_{SW1}$ and the second switching temperature $T_{SW2}$ may be set at the same temperature or mutually different temperatures, whichever is appropriate. Changing the settings of the first switching temperature $T_{SW1}$ and second switching temperature $T_{SW2}$ appropriately may rectify the heat flow such that heat flows only from the second panel 2 toward the first panel 1.

The configuration of the first thermally conductive portion 61 and second thermally conductive portion 62 according to this tenth variation is applicable to the other variations described above. That is to say, the first thermally conductive portion 61 and second thermally conductive portion 62 according to any of the first through ninth variations described above may include at least one thermal expansion member 73, 74.

(Twelfth Variation)

FIGS. 18A-18D schematically illustrate a principal part of a twelfth variation of the thermal rectification unit 9.

The twelfth variation of the thermal rectification unit 9 includes no intermediate panel as in the seventh to ninth variations. In the twelfth variation, the first thermally conductive portion 61 includes at least one thermal expansion member 73 and the second thermally conductive portion 62 includes at least one thermal expansion member 74 as in the eleventh variation. In addition, according to this twelfth variation, the spacers 63 have thermal expansion properties.

In the twelfth variation, the respective dimensions in the first directions A1 of the first thermally conductive portion 61 (i.e., each thermal expansion member 73) and the second thermally conductive portion 62 (i.e., each thermal expansion member 74) change with their temperature. In addition, in the twelfth variation, the dimension of the spacers 63 (i.e., the gap distance D between the first panel 1 and the second panel 2) also changes with their temperature.

The first thermally conductive portion 61 is located in the space S1 created between the first panel 1 and the second panel 2 and has a part (i.e., a fixed end) thereof fixed to the counter surface 11 of the first panel 1. The other end, located opposite from the fixed end, of the first thermally conductive portion 61 constitutes the first displaceable portion 615. The first displaceable portion 615 is a portion to be displaced in the first directions A1 as the temperature of the first thermally conductive portion 61 varies.

Likewise, the second thermally conductive portion 62 is located in the space S1 and has a part (i.e., a fixed end) thereof fixed to the counter surface 21 of the second panel 2. The other end, located opposite from the fixed end, of the second thermally conductive portion 62 constitutes the second displaceable portion 625. The second displaceable portion 625 is a portion to be displaced in the first directions A1 as the temperature of the second thermally conductive portion 62 varies.

In the twelfth variation, the first thermally conductive portion 61, the second thermally conductive portion 62, and the spacers 63 have positive thermal expansion coefficients. If the respective thermal expansion coefficients of the first thermally conductive portion 61, second thermally conductive portion 62, and spacers 63 are designated by $\alpha 1$, $\alpha 2$, and $\alpha 3$, respectively, their magnitudes satisfy the inequality $\alpha 2 > \alpha 3 >> \alpha 1$. In the twelfth variation, the thermal expansion coefficient $\alpha 1$ is so small that the thermal expansion of the first thermally conductive portion 61 is substantially negligible.

Figure 18A:
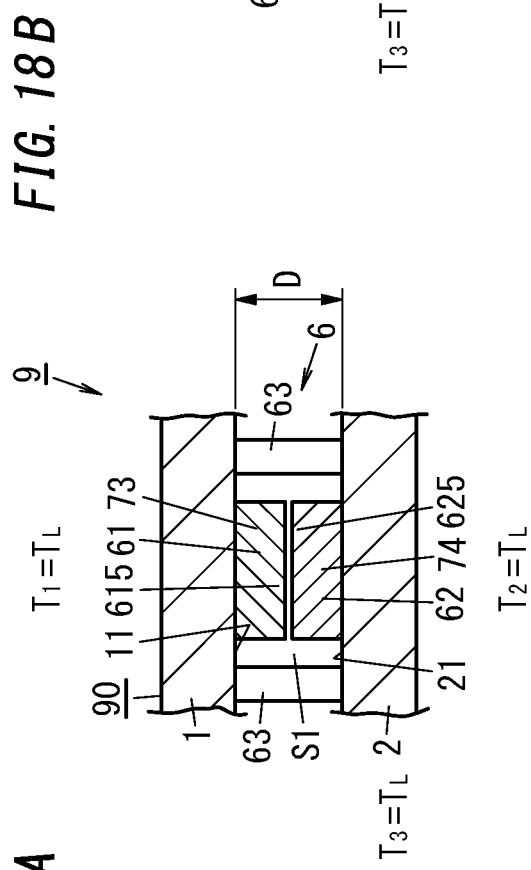
FIGS. 18A-18D are cross-sectional views of a principal part schematically illustrating changes depending on the temperature of a switching mechanism included in a twelfth variation of the thermal rectification unit.

In the state shown in FIG. 18A, the temperature $T_1$ of the first thermally conductive portion 61 and the temperature $T_2$ of the second thermally conductive portion 62 are both the low temperature $T_L$. The temperature $T_3$ of the spacers 63 is also the low temperature $T_L$, which is equal to that of the first and second thermally conductive portions 61 and 62.

At this time, the first displaceable portion 615 that is a tip portion in one of the first directions A1 of the first thermally conductive portion 61 and the second displaceable portion 625 that is a tip portion in one of the first directions A1 of the second thermally conductive portion 62 are spaced apart from each other in the first directions A1. Thus, the switching mechanism 6 is in the heat insulation state in which the first thermally conductive portion 61 and the second thermally conductive portion 62 are thermally isolated from each other.

Figure 18B:
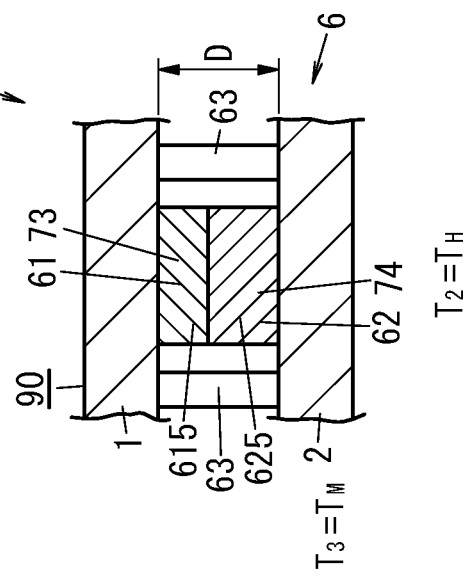

In the state shown in FIG. 18B, the temperature $T_1$ of the first thermally conductive portion 61 and the temperature $T_2$ of the second thermally conductive portion 62 are both the high temperature $T_H$ ($>T_L$). The temperature $T_3$ of the spacers 63 is also the high temperature $T_H$, which is equal to that of the first and second thermally conductive portions 61 and 62.

At this time, the expansion of the first thermally conductive portion 61 is substantially negligible, and therefore, the distance from the first panel 1 to the first displaceable portion 615 remains almost the same as when its temperature is the low temperature $T_L$.

The second thermally conductive portion 62 expands overall, and the distance from the second panel 2 to the second displaceable portion 625 increases, compared to when its temperature is the low temperature $T_L$. Likewise, the spacers 63 also expand in the first directions A1 to increase the gap distance D between the first panel 1 and the second panel 2, compared to when their temperature is the low temperature $T_L$. The values of the thermal expansion coefficients $\alpha 2$ and $\alpha 3$ are set such that the increase in the distance from the second panel 2 to the second displaceable portion 625 is almost as large as the increase in the gap distance D.

Thus, even in the state shown in FIG. 18B, the first displaceable portion 615 and the second displaceable portion 625 are also spaced apart from each other in the first directions A1 and the switching mechanism 6 is still in the heat insulation state.

Figure 18C:
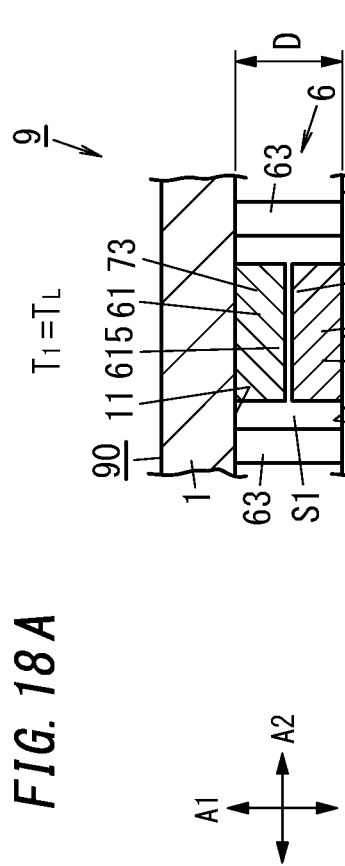

In the state shown in FIG. 18C, the temperature $T_1$ of the first thermally conductive portion 61 is the high temperature $T_H$, the temperature $T_2$ of the second thermally conductive portion 62 is the low temperature $T_L$, and the temperature $T_3$ of the spacers 63 is a medium temperature $T_M$, which is lower than the high temperature $T_H$ and higher than the low temperature $T_L$.

At this time, the distance from the first panel 1 to the first displaceable portion 615 of the first thermally conductive portion 61 at the high temperature $T_H$ remains substantially the same as when its temperature is the low temperature $T_L$. The spacers 63 at the medium temperature $T_M$ expand in the first directions A1 to increase the gap distance D between the first panel 1 and the second panel 2, compared to when their temperature is the low temperature $T_L$.

Thus, even in the state shown in FIG. 18C, the first displaceable portion 615 and the second displaceable portion 625 are also spaced apart from each other in the first directions A1 and the switching mechanism 6 is still in the heat insulation state.

Figure 18D:
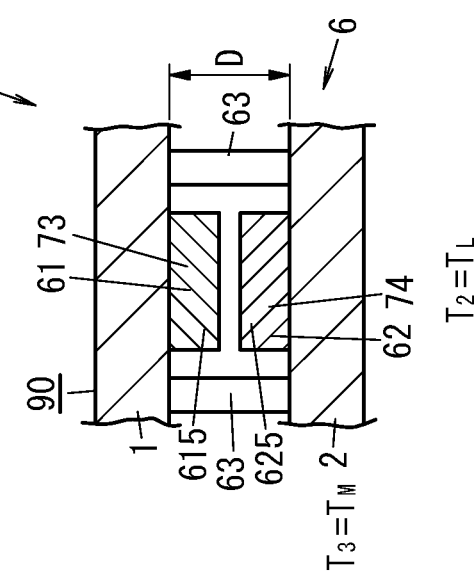

In the state shown in FIG. 18D, the temperature $T_1$ of the first thermally conductive portion 61 is the low temperature $T_L$, the temperature $T_2$ of the second thermally conductive portion 62 is the high temperature $T_H$, and the temperature $T_3$ of the spacers 63 is the medium temperature $T_M$.

The spacers 63 expand in the first directions A1 to increase the gap distance D between the first panel 1 and the second panel 2, compared to when their temperature is the low temperature $T_L$. The second thermally conductive portion 62 at the high temperature $T_H$ expands in the first directions A1 to increase the distance from the second panel 2 to the second displaceable portion 625, compared to when its temperature is the low temperature $T_L$.

The values of the thermal expansion coefficients $\alpha 2$ and $\alpha 3$ are set such that the increase in the distance from the second panel 2 to the second displaceable portion 625 is greater than the increase in the gap distance D. In the state shown in FIG. 18D, the first displaceable portion 615 and the second displaceable portion 625 are in contact with each other so as to conduct heat between them, and the switching mechanism 6 is in the heat radiation state in which the first thermally conductive portion 61 and the second thermally conductive portion 62 are thermally connected to each other.

This twelfth variation allows, by selecting appropriate thermal expansion coefficients, shapes, dimensions, arrangements and other parameters for the first thermally conductive portion 61, the second thermally conductive portion 62, and the spacers 63, a heat flow to be rectified such that the heat flows from the second panel 2 toward the first panel 1 only when a predetermined condition is satisfied.

In this twelfth variation, the first thermally conductive portion 61 is configured such that its thermal expansion is substantially negligible. However, this is only an example and should not be construed as limiting. Alternatively, the second thermally conductive portion 62 may be configured such that its thermal expansion is substantially negligible.

(Thirteenth Variation)

FIGS. 19A-19D and FIG. 20 illustrate a principal part of a thirteenth variation of the thermal rectification unit 9.

The thirteenth variation of the thermal rectification unit 9 includes no intermediate panels 65, the first thermally conductive portion 61 includes at least one thermal expansion member 73, and the second thermally conductive portion 62 includes at least one thermal expansion member 74, as in the eleventh and twelfth variations.

In the thirteenth variation, the first thermally conductive portion 61 and the second thermally conductive portion 62 each have the property of changing their dimension in the second directions A2 as their own temperature varies (i.e., have thermal expansion properties).

Specifically, the first thermally conductive portion 61 includes a thermal expansion member 73, which is formed in the shape of a sheet made of a positive thermal expansion material, and two raised connectors 735, which are fixed to the thermal expansion member 73. The first thermally conductive portion 61 may include at least one connector 735.

Figure 20:
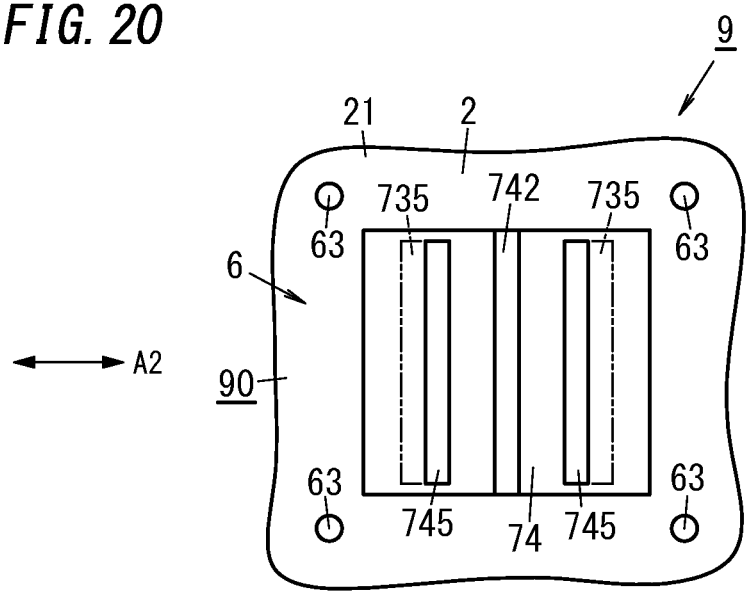
FIG. 20 is a plan view schematically illustrating a principal part of the switching mechanism included in the thirteenth variation of the thermal rectification unit.

In FIG. 20, illustration of the first panel 1 and the thermal expansion member 73 is omitted and the connectors 735 are indicated in phantom. When viewed in any of the first directions A1, the connectors 735 have a straight shape.

The thermal expansion member 73 and the connectors 735 both have thermal conductivity. The connectors 735 are thermally connected to the thermal expansion member 73.

The thermal expansion member 73 is a sheet-shaped member, of which the thickness is aligned with the first directions A1. A part in any of the second directions A2 of the thermal expansion member 73 is fixed to the counter surface 11 of the first panel 1. This part is a fixed portion 732 of the thermal expansion member 73. The thermal expansion member 73 expands and shrinks toward both sides of the fixed portion 732 in the second directions A2 as its own temperature varies.

The connectors 735 are located on both sides of the fixed portion 732 in the second directions A2. The two connectors 735 protrude from the thermal expansion member 73 toward the second panel 2. These two connectors 735 either come closer toward, or go away from, each other in the second directions A2 as the temperature of the thermal expansion member 73 varies.

The second thermally conductive portion 62 includes a thermal expansion member 74, which is formed in the shape of a sheet made of a positive thermal expansion material, and two raised connectors 745, which are fixed to the thermal expansion member 74. As shown in FIG. 20, when viewed in any of the first directions A1, the connectors 745 have a straight shape. The second thermally conductive portion 62 may include at least one connector 745.

The thermal expansion member 74 and the connectors 745 both have thermal conductivity. The connectors 745 are thermally connected to the thermal expansion member 74.

The thermal expansion member 74 is a sheet-shaped member, of which the thickness is aligned with the first directions A1. A part in any of the second directions A2 of the thermal expansion member 74 is fixed to the counter surface 21 of the second panel 2. This part is a fixed portion 742 of the thermal expansion member 74. The thermal expansion member 74 expands and shrinks toward both sides of the fixed portion 742 in the second directions A2 as its own temperature varies.

The two connectors 745 are located on both sides of the fixed portion 742 in the second directions A2. The two connectors 745 protrude from the thermal expansion member 74 toward the first panel 1. These two connectors 745 either come closer toward, or go away from, each other in the second directions A2 as the temperature of the thermal expansion member 74 varies.

In the second directions A2, the two connectors 745 included in the second thermally conductive portion 62 are located between the two connectors 735 included in the first thermally conductive portion 61. Each of the two connectors 745 is associated with a corresponding one of the two connectors 735.

The distance from each connector 745 to the fixed portion 742 is shorter than the distance from its corresponding connector 735 to the fixed portion 732. The fixed portion 742 included in the second thermally conductive portion 62 and the fixed portion 732 included in the first thermally conductive portion 61 face each other in the first directions A1.

Each connector 735 and its corresponding connector 745 are arranged so as to at least partially overlap with each other in the first directions A1.

The state shown in FIG. 19A is a state where the temperature $T_1$ of the first thermally conductive portion 61 and the temperature $T_2$ of the second thermally conductive portion 62 are both the low temperature $T_L$. At this time, each connector 735 included in the first thermally conductive portion 61 and its corresponding connector 745 included in the second thermally conductive portion 62 are spaced by some distance in the second directions A2. This distance is long enough to ensure heat insulation.

The state shown in FIG. 19B is a state where the temperature $T_1$ of the first thermally conductive portion 61 and the temperature $T_2$ of the second thermally conductive portion 62 are both the high temperature $T_H$ ($>T_L$). At this time, the thermal expansion member 73 included in the first thermally conductive portion 61 and the thermal expansion member 74 included in the second thermally conductive portion 62 have both expanded in the second directions A2 compared to when they have the low temperature $T_L$.

Each connector 735 of the first thermally conductive portion 61 and its corresponding connector 745 of the second thermally conductive portion 62 have moved toward the same end in one of the second directions A2 from their locations when they have the low temperature $T_L$. Nevertheless, the distance between each connector 735 and its corresponding connector 745 remains almost the same as in the state shown in FIG. 19A and is still long enough to ensure heat insulation.

The state shown in FIG. 19C is a state where the temperature $T_1$ of the first thermally conductive portion 61 is the high temperature $T_H$ and the temperature $T_2$ of the second thermally conductive portion 62 is the low temperature $T_L$. At this time, the thermal expansion member 73 included in the first thermally conductive portion 61 expands in the second directions A2 compared to when its temperature is the low temperature $T_L$.

The connector 735 of the first thermally conductive portion 61 moves from its location when its temperature is the low temperature $T_L$ so as to go away in the second directions A2 from the fixed portion 732. The distance between each connector 735 and its corresponding connector 745 increases compared to the state shown in FIG. 19A. The distance thus increased is long enough to ensure heat insulation.

The state shown in FIG. 19D is a state where the temperature $T_1$ of the first thermally conductive portion 61 is the low temperature $T_L$ and the temperature $T_2$ of the second thermally conductive portion 62 is the high temperature $T_H$. At this time, the thermal expansion member 74 included in the second thermally conductive portion 62 expands in the second directions A2 compared to when its temperature is the low temperature $T_L$.

The connector 745 of the second thermally conductive portion 62 moves from its location when its temperature is the low temperature $T_L$ so as to go away in the second directions A2 from the fixed portion 742.

In the state shown in FIG. 19D, each connector 735 and its corresponding connector 745 come into contact with each other. That is to say, the two connectors 735 included in the first thermally conductive portion 61 come into one-to-one contact with the two connectors 745 included in the second thermally conductive portion 62. The switching mechanism 6 is in the heat radiation state in which the first thermally conductive portion 61 and the second thermally conductive portion 62 are thermally connected together.

As can be seen, according to the thirteenth variation, in each combination of a connector 735 and its corresponding connector 745, the end toward which the connector 735 is displaced in one of the second directions A2 as the temperature of the first thermally conductive portion 61 rises is the same as the end toward which the connector 745 is displaced in one of the second directions A2 as the temperature of the second thermally conductive portion 62 rises.

In the thirteenth variation, each connector 735 included in the first thermally conductive portion 61 corresponds to the first displaceable portion 615 to be displaced in the second directions A2 as the temperature of the first thermally conductive portion 61 varies, and each connector 745 included in the second thermally conductive portion 62 corresponds to the second displaceable portion 625 to be displaced in the second directions A2 as the temperature of the second thermally conductive portion 62 varies In this thirteenth variation, the temperature difference between the first panel 1 and the second panel 2 determines the temperature difference $\Delta T$ between the first thermally conductive portion 61 and the second thermally conductive portion 62, on which the thermal conductivity between the first panel 1 and the second panel 2 switches as described above.

In this thirteenth variation, only when the second panel 2 has a higher temperature than the first panel 1 and their temperature difference is greater than a predetermined value, heat flows from the second panel 2 toward the first panel 1.

The temperature difference $\Delta T$ that triggers a switch from the heat radiation state to the heat insulation state, or vice versa, is adjustable by selecting an appropriate configuration for the first thermally conductive portion 61 (including the thermal expansion coefficient of the thermal expansion member 73 and the distance from the fixed portion 732 to each connector 735) and an appropriate configuration for the second thermally conductive portion 62 (including the thermal expansion coefficient of the thermal expansion member 74 and the distance from the fixed portion 742 to each connector 745). Optionally, the thermal expansion member 73 and the thermal expansion member 74 may be made of the same material (i.e., may have the same thermal expansion coefficient).

According to the thirteenth variation, the first thermally conductive portion 61 and the second thermally conductive portion 62 expand and shrink in the second directions A2, and therefore, there is no need to provide any recesses such as the recess 15 of the seventh and eighth variations for the counter surface 11 of the first panel 1 or provide any recesses such as the recess 25 of the seventh and eighth variations for the counter surface 21 of the second panel 2. According to the thirteenth variation, it is relatively easy to set the gap distance between the first panel 1 and the second panel 2 at a relatively small value.

In addition, according to the thirteenth variation, the thermal expansion members 73 and 74 expand and shrink in the second directions A2 perpendicular to their thickness, thus allowing the connectors 735 and 745 to move relatively significantly. Thus, this thirteenth variation reduces the chances of the dimensional accuracy required for the first thermally conductive portion 61 and the second thermally conductive portion 62 being too much stringent. The thirteenth variation allows the thermal rectifier 90 to operate with good stability by appropriately arranging the first thermally conductive portion 61 and the second thermally conductive portion 62.

In addition, according to the thirteenth variation, a portion, coming into contact with the second thermally conductive portion 62, of the external surface of each connector 735 (i.e., a portion of each connector 735 coming into contact with its corresponding connector 745) has a sloped surface 737. Likewise, a portion, coming into contact with the first thermally conductive portion 61, of the external surface of each connector 745 (i.e., a portion of each connector 745 coming into contact with its corresponding connector 735) has a sloped surface 747. When each connector 735 and its corresponding connector 745 come into contact with each other, these sloped surfaces 737 and 747, which are parallel to each other, come into contact with each other in a broad area.

The thirteenth variation is configured to bring the first thermally conductive portion 61 and the second thermally conductive portion 62 into direct contact with each other in the heat radiation state. Optionally, a thermally conductive intermediate panel such as the intermediate panel 65 described above may be provided between the first panel 1 and the second panel 2.

In that case, bringing both of the first thermally conductive portion 61 and the second thermally conductive portion 62 into contact with the intermediate panel turns the switching mechanism 6 into the heat radiation state. Bringing at least one of the first thermally conductive portion 61 or the second thermally conductive portion 62 out of contact with the intermediate panel turns the switching mechanism 6 into the heat insulation state.

(Fourteenth Variation)

Figure 21:
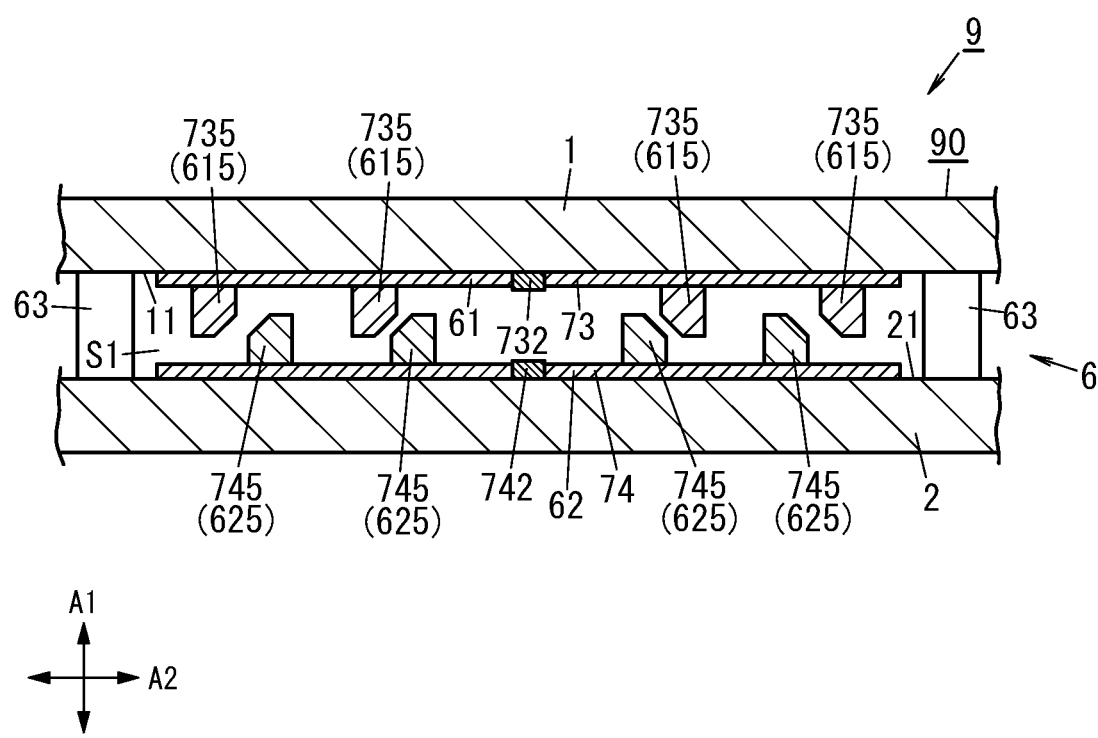
FIG. 21 is a cross-sectional view schematically illustrating a principal part of a switching mechanism included in a fourteenth variation of the thermal rectification unit.

FIG. 21 illustrates a fourteenth variation of the thermal rectification unit 9.

The fourteenth variation of the thermal rectification unit 9 has the same basic configuration as the thirteenth variation described above. In the following description, any constituent element of this fourteenth variation of the thermal rectification unit 9, having the same function as a counterpart of the thirteenth variation described above, will not be described all over again.

The first thermally conductive portion 61 includes a thermal expansion member 73 in the shape of a sheet, and four connectors 735 fixed to one surface of the thermal expansion member 73. Two of the four connectors 735 are located on each of the two sides of the fixed portion 732 in the second directions A2. In addition, on each side in the second directions A2, the two connectors 735 are located at mutually different distances from the fixed portion 732.

The second thermally conductive portion 62 includes a thermal expansion member 74 in the shape of a sheet, and four connectors 745 fixed to one surface of the thermal expansion member 74. Two of the four connectors 745 are located on each of the two sides of the fixed portion 742 in the second directions A2. In addition, on each side in the second directions A2, the two connectors 745 are located at mutually different distances from the fixed portion 742.

The four connectors 735 forming integral parts of the thermal expansion member 73 each correspond to an associated one of the four connectors 745 forming integral parts of the thermal expansion member 74. The in-contact and out-of-contact states between the connectors 735 and their corresponding connectors 745 may be switched by causing the thermal expansion members 73 and 74 to expand or shrink in the second directions A2.

The gap distance between each connector 735 and its corresponding connector 745 is set such that the more distant from the fixed portion 732 the connector 735 is, the wider the gap distance thereof is. That is to say, the gap distance between each connector 735 and its corresponding connector 745 is set such that the connector 735 located more distant from the fixed portion 732 has the wider gap distance than the connector 735 located less distant from the fixed portion 732.

This setting allows each of the four connectors 735 to come into one to one contact with an associated one of the four connectors 745 when the switching mechanism 6 is in the heat radiation state.

Note that the number and shape of the connectors 735 and 745 should not be construed as limiting. Alternatively, the connectors 735 may also have a ringlike or arced planar shape and the connectors 745 may also have a corresponding ringlike or arced planar shape. In that case, when viewed in any of the first directions A1, the connectors 735 and 745 will form concentric circles, thus allowing the in-contact and out-of-contact states between the connectors 735 and 745 to be switched by causing the thermal expansion members 73 and 74 to expand or shrink.

(Fifteenth Variation)

Figure 22:
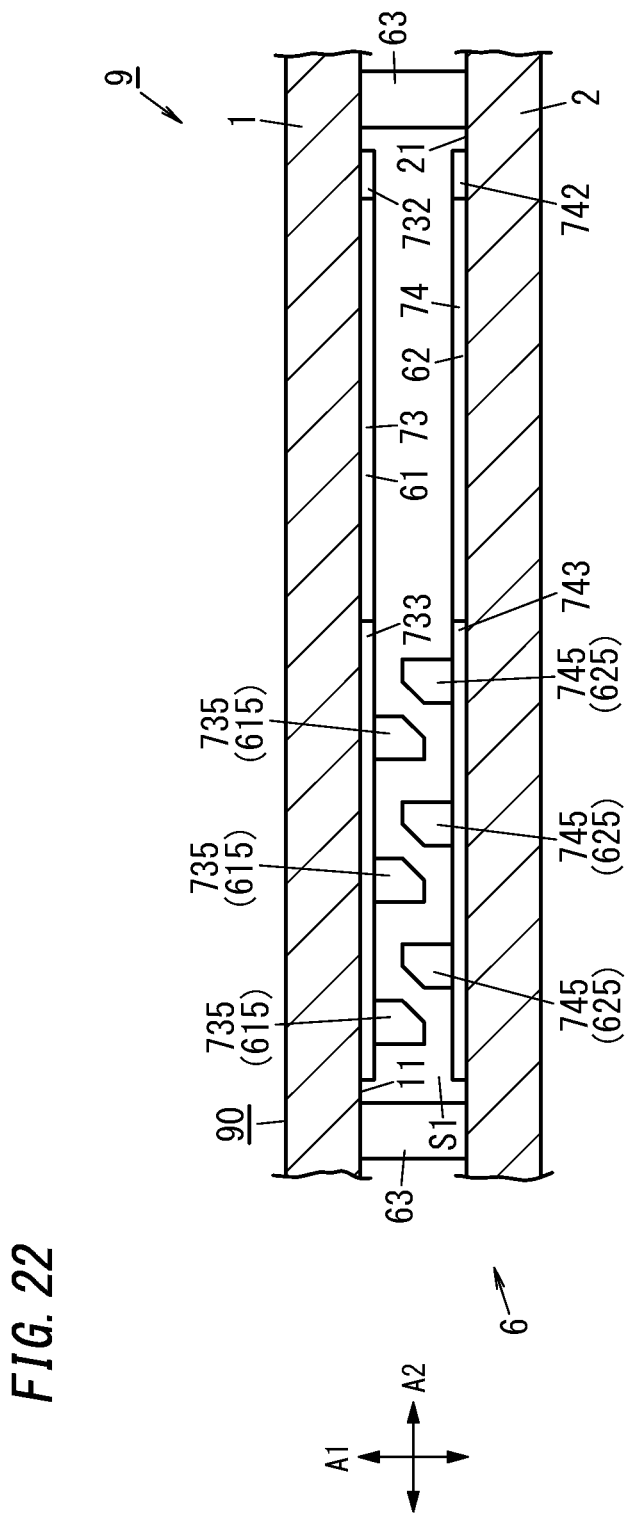
FIG. 22 is a cross-sectional view schematically illustrating a principal part of a fifteenth variation of the thermal rectification unit.
Figure 23:
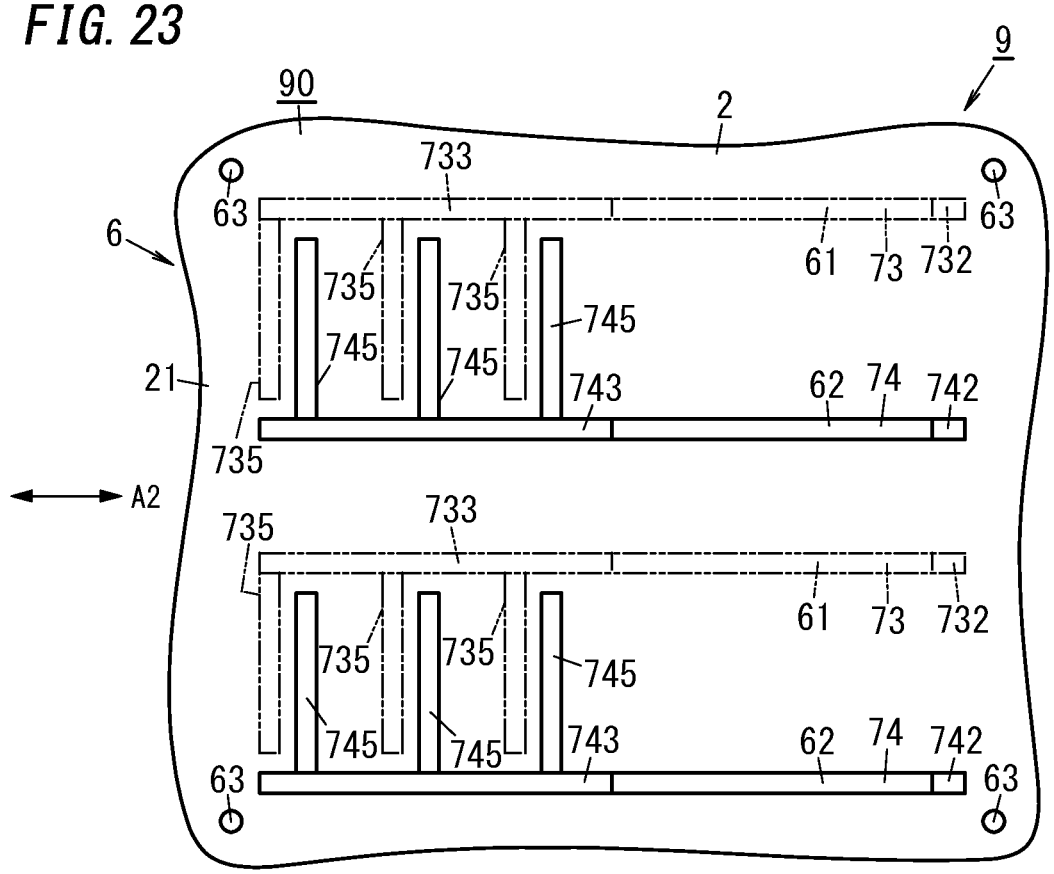
FIG. 23 is a plan view schematically illustrating a principal part of a switching mechanism included in the fifteenth variation of the thermal rectification unit.

FIGS. 22 and 23 illustrate a fifteenth variation of the thermal rectification unit 9. In FIG. 23, illustration of the first panel 1 is omitted, and the first thermally conductive portion 61 is indicated in phantom.

The fifteenth variation of the thermal rectification unit 9 has the same basic configuration as the thirteenth variation described above. In the following description, any constituent element of this fifteenth variation of the thermal rectification unit 9, having the same function as a counterpart of the thirteenth variation described above, will not be described all over again.

The first thermally conductive portion 61 includes a thermal expansion member 73 in the shape of a bar, a non-thermal expansion member 733 having a bar shape and connected to the thermal expansion member 73, and three connectors 735 connected to the non-thermal expansion member 733.

The thermal expansion member 73 has the shape of a bar extending straight in the second directions A2. One end in one of the second directions A2 of the thermal expansion member 73 is the fixed portion 732 to be fixed to the first panel 1. The non-thermal expansion member 733 is connected to the other end in the other of the second directions A2 of the thermal expansion member 73 (i.e., the end opposite from the fixed portion 732).

The non-thermal expansion member 733 also has the shape of a bar extending straight in the second directions A2. The thermal expansion member 73 and the non-thermal expansion member 733 are arranged to be aligned and continuous with each other. The non-thermal expansion member 733 has so small a thermal expansion coefficient that its thermal expansion caused by a variation in its own temperature is substantially negligible.

The three connectors 735 are arranged to be spaced apart from each other in the second directions A2. Each of these three connectors 735 has the shape of a bar extending straight. The three connectors 735 are arranged parallel to each other.

The second thermally conductive portion 62 includes a thermal expansion member 74 in the shape of a bar, a non-thermal expansion member 743 having a bar shape and connected to the thermal expansion member 74, and three connectors 745 connected to the non-thermal expansion member 743.

The thermal expansion member 74 has the shape of a bar extending straight in the second directions A2. One end in one of the second directions A2 of the thermal expansion member 74 is the fixed portion 742 to be fixed to the second panel 2. The non-thermal expansion member 743 is connected to the other end in the other of the second directions A2 of the thermal expansion member 74 (i.e., the end opposite from the fixed portion 742).

The non-thermal expansion member 743 also has the shape of a bar extending straight in the second directions A2. The thermal expansion member 74 and the non-thermal expansion member 743 are arranged to be aligned and continuous with each other. The non-thermal expansion member 743 has so small a thermal expansion coefficient that its thermal expansion caused by a variation in its own temperature is substantially negligible.

The three connectors 745 are arranged to be spaced apart from each other in the second directions A2. Each of these three connectors 745 has the shape of a bar extending straight. The three connectors 745 are arranged parallel to each other.

The three connectors 735 included in the first thermally conductive portion 61 each correspond to an associated one of the three connectors 745 included in the second thermally conductive portion 62. The in-contact and out-of-contact states between the connectors 735 and their corresponding connectors 745 may be switched by causing the thermal expansion members 73 and 74 to expand or shrink in the second directions A2. The gap distance between each of the three connectors 735 and its corresponding connector 745 is the same as the gap distance between any other one of the connectors 735 and its corresponding connector 745.

In the fifteenth variation, the temperature difference between the first panel 1 and the second panel 2 determines the temperature difference $\Delta T$ between the first thermally conductive portion 61 and the second thermally conductive portion 62, on which the thermal conductivity between the first panel 1 and the second panel 2 switches.

Specifically, when the temperature $T_2$ of the second thermally conductive portion 62 is higher than the temperature $T_1$ of the first thermally conductive portion 61 and the temperature difference $\Delta T$ is greater than a predetermined value, the three connectors 735 each come into one to one contact with a corresponding one of the three connectors 745. At this time, the switching mechanism 6 is in the heat radiation state in which the first thermally conductive portion 61 and the second thermally conductive portion 62 are thermally connected together. Otherwise, the switching mechanism 6 is in the heat insulation state in which the first thermally conductive portion 61 and the second thermally conductive portion 62 are thermally isolated from each other.

In the fifteenth variation of the thermal rectification unit 9, only when the second panel 2 has a higher temperature than the first panel 1 and the temperature difference is greater than a predetermined value, heat flows from the second panel 2 toward the first panel 1.

In the fifteenth variation, the first thermally conductive portion 61 expands and shrinks while keeping in contact with the counter surface 11 of the first panel 1, and therefore, a lubricant is suitably applied to the counter surface 11. Likewise, the second thermally conductive portion 62 expands and shrinks while keeping in contact with the counter surface 21 of the second panel 2, and therefore, a lubricant is suitably applied to the counter surface 21. If a vacuum is created in the space S1, then a vacuum lubricant made of $WS_2$ or $WMo_2$ is suitably applied onto the counter surfaces 11 and 21.

Note that the number and shape of the connectors 735 and 745 should not be construed as limiting. That is to say, the number of the connector(s) 735 provided may be either singular or plural, whichever is appropriate, so is the number of connector(s) 745 provided. In addition, the connectors 735 and 745 do not have to have a straight bar shape but may have any other shape as long as these connectors 735 and 745 are able to come into contact with each other.

Although an exemplary embodiment of the thermal rectification unit 9 (thermal rectifier 90) and numerous variations thereof have been described one after another, the embodiment and variations may be readily modified, replaced, changed, or combined in various manners depending on a design choice or any other factor.

(Implementations)

As can be seen from the foregoing description of the exemplary embodiment and the first through fifteenth variations, a first implementation of a thermal rectifier (90) has the following configuration:

Specifically, the first implementation of the thermal rectifier (90) includes a first panel (1), a second panel (2) arranged to face the first panel (1), and a switching mechanism (6). The switching mechanism (6) is provided between the first panel (1) and the second panel (2) and configured to switch, according to respective temperatures of the first panel (1) and the second panel (2), thermal conductivity between the first panel (1) and the second panel (2).

The switching mechanism (6) includes: a first thermally conductive portion (61) thermally connected to the first panel (1); and a second thermally conductive portion (62) thermally connected to the second panel (2). At least one of the first thermally conductive portion (61) or the second thermally conductive portion (62) has a property of changing their shape or dimensions as their own temperature varies.

The switching mechanism (6) is configured to, as at least one of the first thermally conductive portion (61) or the second thermally conductive portion (62) changes their shape or dimensions, switch from a heat radiation state to a heat insulation state, or vice versa. The heat radiation state is a state where the first thermally conductive portion (61) and the second thermally conductive portion (62) are thermally coupled together. The heat insulation state is a state where the first thermally conductive portion (61) and the second thermally conductive portion (62) are thermally isolated from each other.

The first implementation of the thermal rectifier (90) allows the heat radiation/insulation state switching temperature to be selected within a broad temperature range by appropriately setting the properties of the first thermally conductive portion (61) and the second thermally conductive portion (62). This provides a thermal rectifier (90) that switches from the heat insulation state to the heat radiation state, or vice versa, under an ordinary temperature environment, for example. Note that the first thermally conductive portion (61) and the second thermally conductive portion (62) suitably both have a property of changing their shape as their own temperature varies. In addition, the first thermally conductive portion (61) and the second thermally conductive portion (62) suitably both have a property of changing their dimensions as their own temperature varies (i.e., suitably both have thermal expansion properties). Alternatively, either the first thermally conductive portion (61) or the second thermally conductive portion (62) may have a property of changing their dimensions as their own temperature varies.

As can also be seen from the foregoing description of the exemplary embodiment and the first to sixth and eleventh variations thereof, a second implementation of the thermal rectifier (90) may have the following configuration in combination with the configuration of the first implementation:

In the second implementation of the thermal rectifier (90), the switching mechanism (6) further includes an intermediate panel (65) having thermal conductivity and located between the first thermally conductive portion (61) and the second thermally conductive portion (62). The heat radiation state is a state where the first thermally conductive portion (61) and the second thermally conductive portion (62) are both thermally connected to the intermediate panel (65). The heat insulation state is a state where at least one of the first thermally conductive portion (61) or the second thermally conductive portion (62) is thermally isolated from the intermediate panel (65).

The second implementation of the thermal rectifier (90) allows the thermal conductivity switching temperature of the thermal rectifier (90) to be selected freely by setting a temperature at which the first thermally conductive portion (61) switches from the state of being thermally connected to the intermediate panel (65) to the state of being thermally isolated from the intermediate panel (65) and a temperature at which the second thermally conductive portion (62) switches from the state of being thermally connected to the intermediate panel (65) to the state of being thermally isolated from the intermediate panel (65).

As can also be seen from the foregoing description of the exemplary embodiment and the first to sixth and eleventh variations thereof, a third implementation of the thermal rectifier (90) may have the following configuration in combination with the configuration of the second implementation:

In the third implementation of the thermal rectifier (90), the first thermally conductive portion (61) is configured to, as its own temperature falls, switch from the state of being thermally isolated from the intermediate panel (65) to the state of being thermally connected to the intermediate panel (65). The second thermally conductive portion (62) is configured to, as its own temperature rises, switch from the state of being thermally isolated from the intermediate panel (65) to the state of being thermally connected to the intermediate panel (65).

The third implementation of the thermal rectifier (90) allows a heat flow to be rectified such that heat is radiated from the second panel (2) toward the first panel (1).

As can also be seen from the foregoing description of the exemplary embodiment and the first to sixth and eleventh variations thereof, a fourth implementation of the thermal rectifier (90) may have the following configuration in combination with the configuration of the third implementation:

In the fourth implementation of the thermal rectifier (90), a first switching temperature ($T_{SW1}$) and a second switching temperature ($T_{SW2}$) are different from each other. The first switching temperature ($T_{SW1}$) is a temperature at which the first thermally conductive portion (61) switches from the state of being thermally connected to the intermediate panel (65) to the state of being thermally isolated from the intermediate panel (65), or vice versa. The second switching temperature ($T_{SW2}$) is a temperature at which the second thermally conductive portion (62) switches from the state of being thermally connected to the intermediate panel (65) to the state of being thermally isolated from the intermediate panel (65), or vice versa.

The fourth implementation of the thermal rectifier (90) allows the timing of switching the state of the first panel (1) and the second panel (2) from the thermally connected state to the thermally isolated state, or vice versa, to be adjusted freely into an appropriate one.

As can also be seen from the foregoing description of the exemplary embodiment and the first to sixth and eleventh variations thereof, a fifth implementation of the thermal rectifier (90) may have the following configuration in combination with the configuration of any one of the second to fourth implementations:

In the fifth implementation of the thermal rectifier (90), a first space (S11) created between the first panel (1) and the intermediate panel (65) has its pressure reduced so as to satisfy $\lambda 1/D1>0.3$, where D1 is a gap distance between the first panel (1) and the intermediate panel (65) and $\lambda 1$ is a mean free path of the air in the first space (S11). A second space (S12) created between the second panel (2) and the intermediate panel (65) has its pressure reduced so as to satisfy $\lambda 2/D2>0.3$, where D2 is a gap distance between the second panel (2) and the intermediate panel (65) and $\lambda 2$ is a mean free path of the air in the second space (S12).

The fifth implementation of the thermal rectifier (90) turns each of the first space (S11) and the second space (S12) into a molecular flow region, makes the thermal conductance of the first space (S11) independent of the gap distance (D1), and also makes the thermal conductance of the second space (S12) independent of the gap distance D2. This allows the thermal rectifier (90) to be formed with a reduced thickness.

As described above, in general, the thinner the thermal rectifier (90) is, the less advantageous it is to increase the degree of heat insulation between the first space (S11) and the second space (S12). However, satisfying $\lambda 1/D1>0.3$ in the first space (S11) and $\lambda 2/D2>0.3$ in the second space (S12) allows the first space (S11) and the second space (S12) to have an excellent heat insulation property while reducing the thickness of the thermal rectifier (90). A thermal rectifier (90) with a reduced thickness is able to exhibit a high degree of thermal conductivity when the switching mechanism (6) is in the heat radiation state.

That is to say, satisfying $\lambda 1/D1>0.3$ in the first space (S11) and $\lambda 2/D2>0.3$ in the second space (S12) allows the thermal rectifier (90) to exhibit a high degree of thermal conductivity due to its reduced thickness when the switching mechanism (6) is in the heat radiation state. This also allows the thermal rectifier (90) to exhibit an excellent heat insulation property overall due to the heat insulation property of the first space (S11) and the second space (S12) when the switching mechanism (6) is in the heat insulation state.

In addition, satisfying $\lambda 1/D1>0.3$ in the first space (S11) turns the first space (S11) into a molecular flow region, thus making the thermal conductance between the first thermally conductive portion (61) and the intermediate panel (65) independent of the gap distance between the first thermally conductive portion (61) and the intermediate panel (65). That is why this reduces the chances of the thermal conductance between the first thermally conductive portion (61) and the intermediate panel (65), which are out of contact with each other but are located very close to each other, increasing (which would eventually cause a decline in the operating accuracy of the thermal rectifier (90)) irrespective of their contactless state.

Likewise, satisfying $\lambda 2/D2>0.3$ in the second space (S12) turns the second space (S12) into a molecular flow region, thus making the thermal conductance between the second thermally conductive portion (62) and the intermediate panel (65) independent of the gap distance between the second thermally conductive portion (62) and the intermediate panel (65). That is why this reduces the chances of the thermal conductance between the second thermally conductive portion (62) and the intermediate panel (65), which are out of contact with each other but are located very close to each other, increasing (which would eventually cause a decline in the operating accuracy of the thermal rectifier (90)) irrespective of their contactless state.

As can also be seen from the foregoing description of the seventh to tenth and twelfth to fifteenth variations, a sixth implementation of the thermal rectifier (90) may have the following configuration in combination with the configuration of the first implementation:

In the sixth implementation of the thermal rectifier (90), the heat radiation state is a state where the first thermally conductive portion (61) and the second thermally conductive portion (62) are in contact with each other. The heat insulation state is a state where the first thermally conductive portion (61) and the second thermally conductive portion (62) are out of contact with each other.

The sixth implementation of the thermal rectifier (90) allows the thermal rectifier (90) to have a further reduced thickness by eliminating the need to provide the intermediate panel (65) that is required by the second to fifth implementations.

As can also be seen from the foregoing description of the seventh to tenth and twelfth to fifteenth variations, a seventh implementation of the thermal rectifier (90) may have the following configuration in combination with the configuration of the sixth implementation:

In the seventh implementation of the thermal rectifier (90), a space (S1) created between the first panel (1) and the second panel (2) has its pressure reduced so as to satisfy $\lambda 1/D>0.3$, where D is a gap distance from the first panel (1) to the second panel (2) and $\lambda$ is a mean free path of the air in the space (S1).

The seventh implementation of the thermal rectifier (90) turns the space (S1) into a molecular flow region and also makes the thermal conductance of the space (S1) independent of the distance (D). This allows the thermal rectifier (90) to be formed with a further reduced thickness.

As described above, in general, the thinner the thermal rectifier (90) is, the less advantageous it is to increase the degree of heat insulation in the space (S1). However, satisfying $\lambda/D>0.3$ in the space (S1) allows the space (S1) to have an excellent heat insulation property while reducing the thickness of the thermal rectifier (90). A thermal rectifier (90) with a reduced thickness is able to exhibit a high degree of thermal conductivity when the switching mechanism (6) is in the heat radiation state.

That is to say, satisfying $\lambda/D>0.3$ in the space (S1) allows the thermal rectifier (90) to exhibit a high degree of thermal conductivity due to its reduced thickness while the switching mechanism (6) is in the heat radiation state. This also allows the thermal rectifier (90) to exhibit an excellent heat insulation property overall due to the heat insulation property of the space (S1) while the switching mechanism (6) is in the heat insulation state.

In addition, satisfying $\lambda/D>0.3$ in the space (S1) turns the space (S1) into a molecular flow region, thus making the thermal conductance between the first thermally conductive portion (61) and the second thermally conductive portion (62) independent of the gap distance between the first thermally conductive portion (61) and the second thermally conductive portion (62). That is why this reduces the chances of the thermal conductance between the first thermally conductive portion (61) and the second thermally conductive portion (62), which are out of contact with each other but are located very close to each other, increasing (which would eventually cause a decline in the operating accuracy of the thermal rectifier (90)) irrespective of their contactless state.

As can also be seen from the foregoing description of the seventh to tenth and thirteenth to fifteenth variations, an eighth implementation of the thermal rectifier (90) may have the following configuration in combination with the configuration of the sixth or seventh implementation:

In the eighth implementation of the thermal rectifier (90), the first thermally conductive portion (61) includes a first displaceable portion (615) configured to be displaced as the temperature of the first thermally conductive portion (61) varies. The second thermally conductive portion (62) includes a second displaceable portion (625) configured to be displaced as the temperature of the second thermally conductive portion (62) varies. A direction in which the first displaceable portion (615) is displaced as the temperature of the first thermally conductive portion (61) rises is the same as a direction in which the second displaceable portion (625) is displaced as the temperature of the second thermally conductive portion (62) rises.

The eighth implementation of the thermal rectifier (90) allows the state of the first panel (1) and the second panel (2) to be switched from the heat insulation state to the heat radiation state, or vice versa, according to the difference in temperature between the first thermally conductive portion (61) and the second thermally conductive portion (62), i.e., the difference in temperature between the first panel (1) and the second panel (2).

As can also be seen from the foregoing description of the exemplary embodiment and the first to tenth variations thereof, a ninth implementation of the thermal rectifier (90) may have the following configuration in combination with the configuration of any one of the first to eighth implementations:

In the ninth implementation of the thermal rectifier (90), the first thermally conductive portion (61) and the second thermally conductive portion (62) each include one or more bimetal members (71, 72) configured to be deformed as their own temperature varies.

The ninth implementation of the thermal rectifier (90) allows the first thermally conductive portion (61) and the second thermally conductive portion (62) to be deformed highly accurately by utilizing the properties of the bimetal members as their own temperature varies.

As can also be seen from the foregoing description of the exemplary embodiment and the first to ninth variations thereof, a tenth implementation of the thermal rectifier (90) may have the following configuration in combination with the configuration of the ninth implementation:

In the tenth implementation of the thermal rectifier (90), the switching mechanism (6) is configured to switch from the heat radiation state to the heat insulation state, or vice versa, as at least one of the first thermally conductive portion (61) or the second thermally conductive portion (62) is deformed in at least one of facing directions (A1) of the first panel (1) and the second panel (2).

As can also be seen from the foregoing description of the tenth variation, an eleventh implementation of the thermal rectifier (90) may have the following configuration in combination with the configuration of the ninth implementation:

In the eleventh implementation of the thermal rectifier (90), the switching mechanism (6) is configured to switch from the heat radiation state to the heat insulation state, or vice versa, as at least one of the first thermally conductive portion (61) or the second thermally conductive portion (62) is deformed perpendicularly (A2) to facing directions (A1) of the first panel (1) and the second panel (2).

The eleventh implementation of the thermal rectifier (90) may be formed to have a further reduced thickness.

As can also be seen from the foregoing description of the eleventh and twelfth variations, a twelfth implementation of the thermal rectifier (90) may have the following configuration in combination with the configuration of any one of the first to eighth implementations:

In the twelfth implementation of the thermal rectifier (90), the first thermally conductive portion (61) and the second thermally conductive portion (62) each include one or more thermal expansion members (73, 74). The switching mechanism (6) is configured to switch from the heat radiation state to the heat insulation state, or vice versa, as at least one of the first thermally conductive portion (61) or the second thermally conductive portion (62) has their dimension changed in facing directions of the first panel (1) and the second panel (2).

The twelfth implementation of the thermal rectifier (90) may be formed to have a simple structure by utilizing the properties of a thermal expansion material and to be usable in a broad temperature range covering an ordinary temperature. Note that changing the dimension of at least one of the first thermally conductive portion (61) or the second thermally conductive portion (62) in at least one of the facing directions (A1) of the first panel (1) and the second panel (2) includes allowing at least one of the first thermally conductive portion (61) or the second thermally conductive portion (62) to expand or shrink in at least one of the facing directions (A1) of the first panel (1) and the second panel (2).

As can also be seen from the foregoing description of the thirteenth to fifteenth variations, a thirteenth implementation of the thermal rectifier (90) may have the following configuration in combination with the configuration of any one of the first to eighth implementations:

In the thirteenth implementation of the thermal rectifier (90), the first thermally conductive portion (61) and the second thermally conductive portion (62) each include one or more thermal expansion members (73, 74). The switching mechanism (6) is configured to switch from the heat radiation state to the heat insulation state, or vice versa, as at least one of the first thermally conductive portion (61) or the second thermally conductive portion (62) has their dimension changed perpendicularly (A2) to facing directions (A1) of the first panel (1) and the second panel (2).

The thirteenth implementation of the thermal rectifier (90) may be formed to have a simple structure by utilizing the properties of a thermal expansion material, to be usable in a broad temperature range covering an ordinary temperature, and to have a further reduced thickness. Note that changing the dimension of at least one of the first thermally conductive portion (61) or the second thermally conductive portion (62) perpendicularly (A2) to the facing directions (A1) of the first panel (1) and the second panel (2) includes allowing at least one of the first thermally conductive portion (61) or the second thermally conductive portion (62) to expand or shrink perpendicularly (A2) to at least one of the facing directions (A1) of the first panel (1) and the second panel (2).

As can also be seen from the foregoing description of the twelfth variation, a fourteenth implementation of the thermal rectifier (90) may have the following configuration in combination with the configuration of the sixth or seventh implementation:

In the fourteenth implementation of the thermal rectifier (90), the switching mechanism (6) further includes a spacer (63) interposed between the first panel (1) and the second panel (2) to ensure a certain gap distance (D) between the first and second panels (1, 2). The switching mechanism (6) is configured to switch from the heat radiation state to the heat insulation state, or vice versa, as the spacer (63) and at least one of the first thermally conductive portion (61) or the second thermally conductive portion (62) have their dimension changed in facing directions (A1) of the first panel (1) and the second panel (2).

The fourteenth implementation of the thermal rectifier (90) may be formed to have a simple structure by utilizing the properties of a thermal expansion material, and to be usable in a broad temperature range covering an ordinary temperature.

As can also be seen from the foregoing description of the third to sixth variations, a fifteenth implementation of the thermal rectifier (90) may have the following configuration in combination with the configuration of any one of the first to fourteenth implementations:

The fifteenth implementation of the thermal rectifier (90) further includes a gas barrier film (8, 81, 82) configured to hermetically enclose the first panel (1), the second panel (2), and switching mechanism (6).

The fifteenth implementation of the thermal rectifier (90) allows the space (S1, S11, S12) between the first panel (1) and the second panel (2) to be hermetically sealed with the gas barrier film (8, 81, 82).

As can also be seen from the foregoing description of the fourth variation, a first implementation of a thermal rectification unit (9) may have the following configuration:

The first implementation of the thermal rectification unit (9) includes any one of the second to fifth implementations of the thermal rectifier (90), a first gas barrier film (81) with thermal conductivity; and a second gas barrier film (82) with thermal conductivity.

The intermediate panel (65) of the thermal rectifier (90) includes a third panel (3) with thermal conductivity and a fourth panel (4) with thermal conductivity The third panel (3) is arranged to face the first panel (1). The fourth panel (4) is arranged to face the second panel (2).

The first gas barrier film (81) hermetically encloses the first panel (1), the first thermally conductive portion (61), and the third panel (3). The second gas barrier film (82) hermetically encloses the second panel (2), the second thermally conductive portion (62), and the fourth panel (4). The third panel (3) and the fourth panel (4) are thermally coupled together via a portion of the first gas barrier film (81) and a portion of the second gas barrier film (82).

The first implementation of the thermal rectification unit (9) may be formed as a combination of a block with the first gas barrier film (81) and a block with the second gas barrier film (82).

As can also be seen from the foregoing description of the fifth and sixth variations, a second implementation of a thermal rectification unit (9) may have the following configuration:

The second implementation of the thermal rectification unit (9) includes a plurality of the thermal rectifiers (90) with any one of the first to fifteenth implementations. At least one of the plurality of the thermal rectifiers (90) is arranged upside down alongside of the other thermal rectifiers (90).

The second implementation of the thermal rectification unit (9) allows each thermal rectifier (90) to switch from the heat radiation state to the heat insulation state, or vice versa, such that the temperature of an object (55) in contact with the thermal rectification unit (9) comes closer to a predetermined temperature.

As can also be seen from the foregoing description of the sixth variation, a third implementation of a thermal rectification unit (9) may have the following configuration:

The third implementation of the thermal rectification unit (9) includes a plurality of the thermal rectifiers (90) with any one of the second to fifth implementations. At least one of the plurality of the thermal rectifiers (90) is arranged upside down alongside of the other thermal rectifiers (90). When each of the thermal rectifiers (90) is viewed in any of facing directions (A1) of the first panel (1) and the second panel (2), a profile of the intermediate panel (65) is located inside of respective profiles of the first and second panels (1, 2).

The third implementation of the thermal rectification unit (9) allows each thermal rectifier (90) to switch from the heat radiation state to the heat insulation state, or vice versa, such that the temperature of an object (55) in contact with the thermal rectification unit (9) comes closer to a predetermined temperature.

REFERENCE SIGNS LIST

1 First Panel
15 Recess
2 Second Panel
25 Recess
3 Third Panel
4 Fourth Panel
6 Switching Mechanism
61 First Thermally Conductive Portion
615 Displaceable Portion
62 Second Thermally Conductive Portion
625 Displaceable Portion 63 Spacer
65 Intermediate Panel
71 Bimetal Member
72 Bimetal Member
73 Thermal Expansion Member
74 Thermal Expansion Member
8 Gas Barrier Film
81 First Gas Barrier Film
82 Second Gas Barrier Film
9 Thermal Rectification Unit
90 Thermal Rectifier
A1 First Directions
A2 Second Directions
D Gap Distance
D1 Gap Distance
D2 Gap Distance
S1 Space
S11 First Space
S12 Second Space
$T_1$ Temperature of First Thermally Conductive Portion
$T_2$ Temperature of Second Thermally Conductive Portion
ΔT Temperature Difference
$T_{SW1}$ First Switching temperature
$T_{SW2}$ Second Switching temperature
λ1 Mean Free Path
λ2 Mean Free Path

The invention claimed is:

1. A thermal rectifier comprising:
a first panel;
a second panel arranged to face the first panel; and
a switching mechanism provided between the first panel and the second panel and configured to switch, according to respective temperatures of the first panel and the second panel, thermal conductivity between the first panel and the second panel,
the switching mechanism including:
a first thermally conductive portion thermally connected to the first panel; and
a second thermally conductive portion thermally connected to the second panel,
at least one of the first thermally conductive portion or the second thermally conductive portion having a property of changing their shape or dimensions as their own temperature varies,
the switching mechanism being configured to, as at least one of the first thermally conductive portion or the second thermally conductive portion changes their shape or dimensions, switch from a heat radiation state where the first thermally conductive portion and the second thermally conductive portion are thermally coupled together to a heat insulation state where the first thermally conductive portion and the second thermally conductive portion are thermally isolated from each other, or vice versa,
the switching mechanism further includes an intermediate panel having thermal conductivity and located between the first thermally conductive portion and the second thermally conductive portion,
the heat radiation state is a state where the first thermally conductive portion and the second thermally conductive portion are both thermally connected to the intermediate panel,
the heat insulation state is a state where at least one of the first thermally conductive portion or the second thermally conductive portion is thermally isolated from the intermediate panel,
the first thermally conductive portion is configured to, as its own temperature falls, switch from the state of being thermally isolated from the intermediate panel to the state of being thermally connected to the intermediate panel, and
the second thermally conductive portion is configured to, as its own temperature rises, switch from the state of being thermally isolated from the intermediate panel to the state of being thermally connected to the intermediate panel.

2. The thermal rectifier of claim 1, wherein
a first switching temperature and a second switching temperature are different from each other,
the first switch temperature being a temperature at which the first thermally conductive portion switches from the state of being thermally connected to the intermediate panel to the state of being thermally isolated from the intermediate panel, or vice versa,
the second switching temperature being a temperature at which the second thermally conductive portion switches from the state of being thermally connected to the intermediate panel to the state of being thermally isolated from the intermediate panel, or vice versa.

3. A thermal rectifier comprising:
a first panel;
a second panel arranged to face the first panel; and
a switching mechanism provided between the first panel and the second panel and configured to switch, according to respective temperatures of the first panel and the second panel, thermal conductivity between the first panel and the second panel,
the switching mechanism including:
a first thermally conductive portion thermally connected to the first panel; and
a second thermally conductive portion thermally connected to the second panel,
at least one of the first thermally conductive portion or the second thermally conductive portion having a property of changing their shape or dimensions as their own temperature varies,
the switching mechanism being configured to, as at least one of the first thermally conductive portion or the second thermally conductive portion changes their shape or dimensions, switch from a heat radiation state where the first thermally conductive portion and the second thermally conductive portion are thermally coupled together to a heat insulation state where the first thermally conductive portion and the second thermally conductive portion are thermally isolated from each other, or vice versa,
the switching mechanism further includes an intermediate panel having thermal conductivity and located between the first thermally conductive portion and the second thermally conductive portion,
the heat radiation state is a state where the first thermally conductive portion and the second thermally conductive portion are both thermally connected to the intermediate panel,
the heat insulation state is a state where at least one of the first thermally conductive portion or the second thermally conductive portion is thermally isolated from the intermediate panel,
a first space created between the first panel and the intermediate panel has its pressure reduced so as to satisfy λ1/D1>0.3, where D1 is a gap distance between the first panel and the intermediate panel and λ1 is a mean free path of the air in the first space, and a second space created between the second panel and the intermediate panel has its pressure reduced so as to satisfy $\lambda 2/D2>0.3$, where $D2$ is a gap distance between the second panel and the intermediate panel and $\lambda 2$ is a mean free path of the air in the second space.

4. A thermal rectifier comprising:
a first panel;
a second panel arranged to face the first panel; and
a switching mechanism provided between the first panel and the second panel and configured to switch, according to respective temperatures of the first panel and the second panel, thermal conductivity between the first panel and the second panel,
the switching mechanism including:
a first thermally conductive portion thermally connected to the first panel; and
a second thermally conductive portion thermally connected to the second panel,
at least one of the first thermally conductive portion or the second thermally conductive portion having a property of changing their shape or dimensions as their own temperature varies,
the switching mechanism being configured to, as at least one of the first thermally conductive portion or the second thermally conductive portion changes their shape or dimensions, switch from a heat radiation state where the first thermally conductive portion and the second thermally conductive portion are thermally coupled together to a heat insulation state where the first thermally conductive portion and the second thermally conductive portion are thermally isolated from each other, or vice versa,
the heat radiation state is a state where the first thermally conductive portion and the second thermally conductive portion are in contact with each other,
the heat insulation state is a state where the first thermally conductive portion and the second thermally conductive portion are out of contact with each other,
a space created between the first panel and the second panel has its pressure reduced so as to satisfy $\lambda/D>0.3$, where $D$ is a gap distance between the first panel and the second panel and $\lambda$ is a mean free path of the air in the space.

5. A thermal rectifier comprising:
a first panel;
a second panel arranged to face the first panel; and
a switching mechanism provided between the first panel and the second panel and configured to switch, according to respective temperatures of the first panel and the second panel, thermal conductivity between the first panel and the second panel,
the switching mechanism including:
a first thermally conductive portion thermally connected to the first panel; and
a second thermally conductive portion thermally connected to the second panel,
at least one of the first thermally conductive portion or the second thermally conductive portion having a property of changing their shape or dimensions as their own temperature varies,
the switching mechanism being configured to, as at least one of the first thermally conductive portion or the second thermally conductive portion changes their shape or dimensions, switch from a heat radiation state where the first thermally conductive portion and the second thermally conductive portion are thermally coupled together to a heat insulation state where the first thermally conductive portion and the second thermally conductive portion are thermally isolated from each other, or vice versa,
the heat radiation state is a state where the first thermally conductive portion and the second thermally conductive portion are in contact with each other,
the heat insulation state is a state where the first thermally conductive portion and the second thermally conductive portion are out of contact with each other,
the first thermally conductive portion includes a first displaceable portion configured to be displaced as the temperature of the first thermally conductive portion varies,
the second thermally conductive portion includes a second displaceable portion configured to be displaced as the temperature of the second thermally conductive portion varies,
a direction in which the first displaceable portion is displaced as the temperature of the first thermally conductive portion rises is the same as a direction in which the second displaceable portion is displaced as the temperature of the second thermally conductive portion rises.

6. A thermal rectifier comprising:
a first panel;
a second panel arranged to face the first panel; and
a switching mechanism provided between the first panel and the second panel and configured to switch, according to respective temperatures of the first panel and the second panel, thermal conductivity between the first panel and the second panel,
the switching mechanism including:
a first thermally conductive portion thermally connected to the first panel; and
a second thermally conductive portion thermally connected to the second panel,
at least one of the first thermally conductive portion or the second thermally conductive portion having a property of changing their shape or dimensions as their own temperature varies,
the switching mechanism being configured to, as at least one of the first thermally conductive portion or the second thermally conductive portion changes their shape or dimensions, switch from a heat radiation state where the first thermally conductive portion and the second thermally conductive portion are thermally coupled together to a heat insulation state where the first thermally conductive portion and the second thermally conductive portion are thermally isolated from each other, or vice versa,
the first thermally conductive portion and the second thermally conductive portion each include one or more bimetal members configured to be deformed as their own temperature varies.

7. The thermal rectifier of claim 6, wherein
the switching mechanism is configured to switch from the heat radiation state to the heat insulation state, or vice versa, as at least one of the first thermally conductive portion or the second thermally conductive portion is deformed in at least one of facing directions of the first panel and the second panel.

8. The thermal rectifier of claim 6, wherein
the switching mechanism is configured to switch from the heat radiation state to the heat insulation state, or vice versa, as at least one of the first thermally conductive portion or the second thermally conductive portion is deformed perpendicularly to facing directions of the first panel and the second panel.

9. A thermal rectifier comprising:
a first panel;
a second panel arranged to face the first panel; and
a switching mechanism provided between the first panel and the second panel and configured to switch, according to respective temperatures of the first panel and the second panel, thermal conductivity between the first panel and the second panel,
the switching mechanism including:
a first thermally conductive portion thermally connected to the first panel; and
a second thermally conductive portion thermally connected to the second panel,
at least one of the first thermally conductive portion or the second thermally conductive portion having a property of changing their shape or dimensions as their own temperature varies,
the switching mechanism being configured to, as at least one of the first thermally conductive portion or the second thermally conductive portion changes their shape or dimensions, switch from a heat radiation state where the first thermally conductive portion and the second thermally conductive portion are thermally coupled together to a heat insulation state where the first thermally conductive portion and the second thermally conductive portion are thermally isolated from each other, or vice versa,
the first thermally conductive portion and the second thermally conductive portion each include one or more thermal expansion members, and
the switching mechanism is configured to switch from the heat radiation state to the heat insulation state, or vice versa, as at least one of the first thermally conductive portion or the second thermally conductive portion has their dimension changed in at least one of facing directions of the first panel and the second panel.

10. A thermal rectifier comprising:
a first panel;
a second panel arranged to face the first panel; and
a switching mechanism provided between the first panel and the second panel and configured to switch, according to respective temperatures of the first panel and the second panel, thermal conductivity between the first panel and the second panel,
the switching mechanism including:
a first thermally conductive portion thermally connected to the first panel; and
a second thermally conductive portion thermally connected to the second panel,
at least one of the first thermally conductive portion or the second thermally conductive portion having a property of changing their shape or dimensions as their own temperature varies,
the switching mechanism being configured to, as at least one of the first thermally conductive portion or the second thermally conductive portion changes their shape or dimensions, switch from a heat radiation state where the first thermally conductive portion and the second thermally conductive portion are thermally coupled together to a heat insulation state where the first thermally conductive portion and the second thermally conductive portion are thermally isolated from each other, or vice versa,
the first thermally conductive portion and the second thermally conductive portion each include one or more thermal expansion members, and
the switching mechanism is configured to switch from the heat radiation state to the heat insulation state, or vice versa, as at least one of the first thermally conductive portion or the second thermally conductive portion has their dimension changed perpendicularly to facing directions of the first panel and the second panel.

11. A thermal rectifier comprising:
a first panel;
a second panel arranged to face the first panel; and
a switching mechanism provided between the first panel and the second panel and configured to switch, according to respective temperatures of the first panel and the second panel, thermal conductivity between the first panel and the second panel,
the switching mechanism including:
a first thermally conductive portion thermally connected to the first panel; and
a second thermally conductive portion thermally connected to the second panel,
at least one of the first thermally conductive portion or the second thermally conductive portion having a property of changing their shape or dimensions as their own temperature varies,
the switching mechanism being configured to, as at least one of the first thermally conductive portion or the second thermally conductive portion changes their shape or dimensions, switch from a heat radiation state where the first thermally conductive portion and the second thermally conductive portion are thermally coupled together to a heat insulation state where the first thermally conductive portion and the second thermally conductive portion are thermally isolated from each other, or vice versa,
the heat radiation state is a state where the first thermally conductive portion and the second thermally conductive portion are in contact with each other,
the heat insulation state is a state where the first thermally conductive portion and the second thermally conductive portion are out of contact with each other,
the switching mechanism further includes a spacer interposed between the first panel and the second panel to ensure a certain gap distance between the first and second panels, and
the switching mechanism is configured to switch from the heat radiation state to the heat insulation state, or vice versa, as the spacer and at least one of the first thermally conductive portion or the second thermally conductive portion have their dimension changed in at least one of facing directions of the first panel and the second panel.

12. A thermal rectification unit comprising:
a thermal rectifier;
a first gas barrier film with thermal conductivity; and
a second gas barrier film with thermal conductivity,
the thermal rectifier comprising:
a first panel;
a second panel arranged to face the first panel; and
a switching mechanism provided between the first panel and the second panel and configured to switch, according to respective temperatures of the first panel and the second panel, thermal conductivity between the first panel and the second panel, the switching mechanism including:

a first thermally conductive portion thermally connected to the first panel; and a second thermally conductive portion thermally connected to the second panel, at least one of the first thermally conductive portion or the second thermally conductive portion having a property of changing their shape or dimensions as their own temperature varies, the switching mechanism being configured to, as at least one of the first thermally conductive portion or the second thermally conductive portion changes their shape or dimensions, switch from a heat radiation state where the first thermally conductive portion and the second thermally conductive portion are thermally coupled together to a heat insulation state where the first thermally conductive portion and the second thermally conductive portion are thermally isolated from each other, or vice versa, the switching mechanism further includes an intermediate panel having thermal conductivity and located between the first thermally conductive portion and the second thermally conductive portion, the heat radiation state is a state where the first thermally conductive portion and the second thermally conductive portion are both thermally connected to the intermediate panel, the heat insulation state is a state where at least one of the first thermally conductive portion or the second thermally conductive portion is thermally isolated from the intermediate panel, the intermediate panel of the thermal rectifier including a third panel with thermal conductivity and a fourth panel with thermal conductivity, the third panel being arranged to face the first panel, the fourth panel being arranged to face the second panel, the first gas barrier film being configured to hermetically enclose the first panel, the first thermally conductive portion, and the third panel, the second gas barrier film being configured to hermetically enclose the second panel, the second thermally conductive portion, and the fourth panel, the third panel and the fourth panel being thermally coupled together via a portion of the first gas barrier film and a portion of the second gas barrier film.

* * * * *